(12) United States Patent
Dai et al.

(10) Patent No.: US 11,097,954 B2
(45) Date of Patent: Aug. 24, 2021

(54) METHOD AND SYSTEM FOR PREPARING BATTERY GRADE AND HIGH PURITY GRADE LITHIUM HYDROXIDE AND LITHIUM CARBONATE FROM HIGH-IMPURITY LITHIUM SOURCES

(71) Applicants: CHENGDU CHEMPHYS CHEMICAL INDUSTRY CO., LTD, Sichuan (CN); Sinolithium Materials Limited, Hong Kong (HK)

(72) Inventors: Yihua Dai, Sichuan (CN); Rongfu Cai, Sichuan (CN); Wenjun Ban, Sichuan (CN); Chunhui Yang, Sichuan (CN); Xinglong Wang, Sichuan (CN); Yunfeng Li, Sichuan (CN); Yali Li, Sichuan (CN); Chuanyong Zheng, Sichuan (CN); Qiang Meng, Sichuan (CN); Hongjun Jiang, Sichuan (CN)

(73) Assignees: CHENGDU CHEMPHYS CHEMICAL INDUSTRY CO., LTD, Sichuan (CN); Sinolithium Materials Limited

( * ) Notice: Subject to any disclaimer, the term of this patent is extended or adjusted under 35 U.S.C. 154(b) by 0 days.

(21) Appl. No.: 16/760,725

(22) PCT Filed: May 16, 2019

(86) PCT No.: PCT/CN2019/087170
§ 371 (c)(1),
(2) Date: Apr. 30, 2020

(87) PCT Pub. No.: WO2020/147224
PCT Pub. Date: Jul. 23, 2020

(65) Prior Publication Data
US 2020/0385280 A1 Dec. 10, 2020

(30) Foreign Application Priority Data

Jan. 18, 2019 (CN) .......................... 201910048646.X

(51) Int. Cl.
*C01D 15/08* (2006.01)
*C01D 15/02* (2006.01)
(Continued)

(52) U.S. Cl.
CPC ............. *C01D 15/08* (2013.01); *C01D 15/02* (2013.01); *C25B 1/16* (2013.01); *C25B 9/23* (2021.01);
(Continued)

(58) Field of Classification Search
CPC ......... C01D 15/08; C01D 15/02; H01M 4/58; H01M 10/0525; C25B 9/23; C25B 1/16
(Continued)

(56) References Cited

U.S. PATENT DOCUMENTS 9,034,294 B1 5/2015 Harrison
2013/0251610 A1 9/2013 Kawata et al.

FOREIGN PATENT DOCUMENTS

CN 106315625 A 1/2017
CN 107298450 A * 10/2017
(Continued)

OTHER PUBLICATIONS

Department of Personnel and Education of Ministry of Chemical Industry, et al, "Electrodialysis", Jul. 31, 1997, pp. 34-49, Chemical Industry Press.
(Continued)

*Primary Examiner* — Melissa S Swain
(74) *Attorney, Agent, or Firm* — Novick, Kim & Lee, PLLC; Allen Xue

(57) ABSTRACT

A method for preparing battery grade and high purity grade lithium hydroxide and lithium carbonate from high-impurity
(Continued)

lithium sources includes steps for preparation of a refined lithium salt solution, preparation of battery grade lithium hydroxide, preparation of high purity grade lithium hydroxide, preparation of high purity grade lithium carbonate and preparation of battery grade lithium carbonate. The system to carry out the preparation includes a refined lithium salt solution preparation subsystem, a battery grade lithium hydroxide preparation subsystem, a high purity grade lithium hydroxide preparation subsystem, a high purity grade lithium carbonate preparation subsystem and a battery grade lithium carbonate preparation subsystem arranged in turn according to production sequence. A combination of physical and chemical treatment methods are used to treat the high-impurity lithium sources having variations in lithium contents, impurity categories, and impurity contents.

30 Claims, 5 Drawing Sheets

(51) Int. Cl.
C25B 1/16 (2006.01)
H01M 4/58 (2010.01)
H01M 10/0525 (2010.01)
C25B 9/23 (2021.01)

(52) U.S. Cl.
CPC ......... *H01M 4/58* (2013.01); *H01M 10/0525* (2013.01)

(58) Field of Classification Search
USPC .......................................................... 423/421
See application file for complete search history.

(56) References Cited

FOREIGN PATENT DOCUMENTS

| CN | 107298450 A | 10/2017 |
| CN | 108341420 A | 7/2018 |
| CN | 109650414 A | 4/2019 |
| CN | 109971977 A | 7/2019 |
| JP | 2011032151 A | 2/2011 |

OTHER PUBLICATIONS

Yang, Zuoguo, "Process and Theory of Membrane Science and Technology", Aug. 31, 2009, pp. 49-173, 298-311, East China University of Science and Technology Press.

Department of Personnel and Education of Ministry of Chemical Industry, et al, "Ion Exchange", Dec. 31, 1997, pp. 86 to 130, Chemical Industry Press.

* cited by examiner

METHOD AND SYSTEM FOR PREPARING BATTERY GRADE AND HIGH PURITY GRADE LITHIUM HYDROXIDE AND LITHIUM CARBONATE FROM HIGH-IMPURITY LITHIUM SOURCES

FIELD OF THE INVENTION

The invention belongs to the field of lithium resource extraction, refining and lithium salt preparation, in particular relates to preparation of lithium hydroxide and lithium carbonate from high-impurity lithium sources by removing impurities and refining, and specifically relates to a method and system for preparing battery grade and high purity grade lithium hydroxide and lithium carbonate from high-impurity lithium sources.

DESCRIPTION OF THE RELATED ART

At present, most lithium resource extraction technologies have difficulties to varying degrees in economically preparing high purity grade or battery grade lithium hydroxide and lithium carbonate products from high-impurity lithium raw materials.

At present, the technical solution for preparing battery grade lithium hydroxide from high-impurity lithium raw materials is as follows:

A high-impurity lithium source is subject to impurity removal and refined, and then converted into crude lithium carbonate by chemical precipitation of sodium carbonate. Finally the crude lithium carbonate is converted into battery grade lithium hydroxide by the following technical routes.

Technical route 1: The crude lithium carbonate reacts with sulfuric acid to form a lithium sulfate solution, and then the lithium sulfate solution is subject to impurity removal, refined, causticized with sodium hydroxide, and frozen at a low temperature to separate out sodium sulfate decahydrate crystals. After centrifugal separation, a mixed alkaline solution containing a large amount of lithium hydroxide and a small amount of sodium sulfate is obtained from the crystals. The mixed alkaline solution is evaporated and crystallized to separate out crude lithium hydroxide, and the crude lithium hydroxide is recrystallized for purification, centrifugated, washed and dried to obtain the battery grade lithium hydroxide.

Technical route 2: The crude lithium carbonate is converted into lithium sulfate or lithium chloride solution, and the lithium salt solution is subject to chemical impurity removal, deep resin impurity removal or concentrated and crystallized to obtain high-purity lithium sulfate, lithium chloride solution or crystals. The lithium sulfate or lithium chloride solution is subject to ion-exchange membrane electrodialysis to obtain lithium hydroxide solution, and then the lithium hydroxide solution is concentrated, crystallized, recrystallized and otherwise treated to obtain battery grade lithium hydroxide crystals.

Technical route 3: Crude lithium carbonate and lime cream are causticized to obtain insoluble calcium carbonate and lithium hydroxide solution, the solution is filtered to obtain lithium hydroxide solution, the lithium hydroxide solution is concentrated and crystallized to obtain crude lithium hydroxide, and finally the crude lithium hydroxide is recrystallized and purified to obtain the battery grade lithium hydroxide.

The technical routes for preparing the battery grade lithium hydroxide from high-impurity lithium sources faces a series of problems, including long process flow, multiple by-products, low recovery rate and high production cost.

b At present, the technical solution for preparing high purity grade lithium carbonate from high-impurity lithium raw materials is as follows:

Crude lithium carbonate is precipitated out from a high-impurity lithium source, and the crude lithium carbonate is converted into battery grade lithium carbonate or high purity grade lithium carbonate by the following technical routes.

Technical route 1: The crude lithium carbonate is converted into battery grade lithium hydroxide by a chemical process, and the battery grade lithium hydroxide is recrystallized and purified to obtain high-purity lithium hydroxide. Finally, high-purity lithium hydroxide reacts with carbon dioxide to prepare high-purity lithium carbonate.

Technical route 2: The crude lithium carbonate reacts with carbon dioxide and water to form soluble lithium bicarbonate solution, and the lithium bicarbonate solution is filtered to remove mechanical impurities and insolubles to obtain a filtrate. The filtrate is subject to impurity removal by ion exchange resin, the lithium bicarbonate is thermally decomposed at a high temperature of 80 to 90° C. to separate out lithium carbonate crystals to obtain lithium carbonate that meets battery grade requirements. The battery grade lithium carbonate reacts with carbon dioxide and water to form a lithium bicarbonate solution, and the lithium bicarbonate solution is chelated with resin to deeply remove impurities. Finally, the lithium bicarbonate solution is thermally decomposed and desorbed to obtain high-purity lithium carbonate.

The technical routes for preparing the high purity grade lithium carbonate from the high-impurity lithium source involve a lot of intermediate purification steps and also have disadvantages of long process flow, low recovery rate and high production cost.

SUMMARY OF THE INVENTION

In order to solve the problems in the prior art, the object of the invention is to provide a method and system for producing battery grade lithium hydroxide, high purity grade lithium carbonate and battery grade lithium carbonate by compounding high-impurity lithium raw materials so as to increase overall lithium yield, improve product quality, and achieve the objective of producing quality lithium hydroxide, high purity grade lithium carbonate and battery grade lithium carbonate products with the high-impurity lithium raw materials at low costs to meet market demand.

On one hand, the invention provides a method for preparing battery grade and high purity grade lithium hydroxide and lithium carbonate from high-impurity lithium sources, and the method comprises the following steps:

A. Preparation of a Refined Lithium Salt Solution a. Treatment of the High-Impurity Lithium Sources:

pre-treating the high-impurity lithium sources varying in quality by different combinations of physical and chemical impurity removal methods to obtain a purified lithium salt solution containing 7 to 24 g/L $Li^+$, 0.01 to 0.05 g/L $K^+$, 0.05 to 0.1 g/L $Na^+$, 0.01 to 0.02 g/L $Ca^{2+}$, 0.000 to 0.005 g/L $Mg^{2+}$, 0 to 200 g/L $SO_4^{2-}$, 0 to 200 g/L $Cl^-$ and 0.01 to 0.06 g/L B and having a pH of 9 to 11; and b. Refining of the Purified Lithium Salt Solution:

adjusting the pH of the purified lithium salt solution to 8 to 9 and deeply removing impurities from the solution by ion exchange chelating resin to obtain a refined lithium salt solution containing 7 to 24 g/L $Li^+$, ≤1 ppm Ca, ≤1 ppm Mg, ≤1 ppm Fe, ≤1 ppm Mn, ≤1 ppm Zn, ≤1 ppm Al, 0 to 200 g/L $SO_4^{2-}$, 0 to 200 g/L $Cl^-$ and ≤5 ppm B and having a pH of 8 to 9;

B. Preparation of Battery Grade Lithium Hydroxide a. Composite Electrodialysis:

treating the refined lithium salt solution by composite electrodialysis to obtain a lithium hydroxide solution with a LiOH concentration of 1 to 4 mol/L and a dilute acid solution with a $H^+$ concentration of 0.5 to 2 mol/L; and b. Concentration and Crystallization:

evaporating, concentrating and crystallizing the lithium hydroxide solution with the LiOH concentration of 1 to 4 mol/L to obtain lithium hydroxide magma, further cooling and crystallizing the lithium hydroxide magma and separating solid from liquid to obtain wet fine lithium hydroxide and a unacceptable high-impurity mother liquor, and post-treating the wet fine lithium hydroxide to obtain the battery grade lithium hydroxide;

C. Preparation of High Purity Grade Lithium Hydroxide dissolving the wet fine lithium hydroxide to form a 80 to 100° C. saturated lithium hydroxide solution, filtering the solution to obtain a filtrate, cooling & crystallizing the filtrate, separating solid from liquid and washing to obtain wet high purity grade lithium hydroxide and a crystallized mother liquor, and post-treating the wet high purity grade lithium hydroxide to obtain the high purity grade lithium hydroxide;

D. Preparation of High Purity Grade Lithium Carbonate dissolving the wet high purity grade lithium hydroxide to form a lithium hydroxide solution, filtering to obtain a filtrate, introducing carbon dioxide into the filtrate for carbonization reaction, and after the reaction, separating solid from liquid to obtain wet high purity grade lithium carbonate and a carbonization mother liquor, and post-treating the wet high purity grade lithium carbonate to obtain the high purity grade lithium carbonate; and E. Preparation of Battery Grade Lithium Carbonate adding battery grade lithium carbonate seed crystals to a base solution, mixing evenly and introducing carbon dioxide and the unacceptable lithium hydroxide solution composed of the unacceptable high-impurity mother liquor from the step B and the unacceptable carbonized mother liquor from the step D for reaction, aging a lithium carbonate slurry obtained from the reaction and separating solid from liquid to obtain a carbonized mother liquor and wet battery grade lithium carbonate, and finally post-treating the wet battery grade lithium carbonate to obtain the battery grade lithium carbonate.

Further, in the invention, the battery grade lithium carbonate can be prepared by reaction between the refined lithium salt solution obtained from the step A and a sodium carbonate solution.

On the other hand, the invention provides a system for preparing battery grade and high purity grade lithium hydroxide and lithium carbonate from high-impurity lithium sources. The system comprises a refined lithium salt solution preparation subsystem, a battery grade lithium hydroxide preparation subsystem, a high purity grade lithium hydroxide preparation subsystem, a high purity grade lithium carbonate preparation subsystem and a battery grade lithium carbonate preparation subsystem arranged in turn according to production sequence.

The refined lithium salt solution preparation subsystem comprises a filter module, a lithium extraction and adsorption module, a lithium enrichment and concentration module, a chemical impurity removal module, a lithium precipitation reaction module, an acidolysis and dissolution module and a purified lithium salt solution refining module; different combinations of the modules are selected for impurity pre-removal treatment according to different high-impurity lithium sources, and then the purified lithium salt solution refining module is used for refining to obtain a refined lithium salt solution meeting production requirements for battery grade and high purity grade lithium hydroxide and lithium carbonate;

The battery grade lithium hydroxide preparation subsystem comprises a composite electrodialysis device, an MVR evaporation concentration and crystallization device and a DTB cooling crystallizer or an OSLO cooling crystallizer connected in turn;

The high purity grade lithium hydroxide preparation subsystem comprises a dissolving tank, a filter and a DTB cooling crystallizer or an OLSO cooling crystallizer connected in turn;

The high purity grade lithium carbonate preparation subsystem comprises a dissolving tank, a filter and a first carbonization reactor connected in turn; and The battery grade lithium carbonate preparation subsystem comprises a second carbonization reactor and an aging cell.

Compared with the prior art, the invention has the following advantages:

1) The method for preparing battery grade and high purity grade lithium hydroxide and lithium carbonate from high-impurity lithium sources is applicable for lithium raw materials from more extensive sources. The method can be used to extract lithium from high-impurity lithium-containing solutions (e.g., salt lake brine and a lithium precipitation mother liquor) or other high-impurity low-lithium-containing solutions in a quick and efficient manner, and effectively separate lithium ions from potassium, sodium, calcium, magnesium and boron ions; and the method is further applicable for preparation of a lithium sulfate solution or a lithium chloride solution from a plurality of lithium ores.

2) To treat the high-impurity lithium sources varying in lithium contents, impurity categories and impurity contents, the invention proposes differentiated combinations of physical and chemical treatment methods to adapt to quality variation of the high-impurity lithium sources and meet quality requirements for production of the battery grade and high purity grade lithium hydroxide and lithium carbonate products.

3) Compared with the prior art, the invention has obvious advantages in environmental protection owing to less three wastes (waste gas, waste water and waste residue) and recyclable water, acid and mother liquor produced as byproducts in the process.

4) The invention provides a method and system solution for preparing the battery grade and high purity grade lithium hydroxide and lithium carbonate from high-impurity lithium sources in a low-cost and high-quality manner.

DESCRIPTION OF MARKS IN ATTACHED DRAWINGS

1—three-stage disc tube reverse osmosis unit, 2—two-chamber electrodialysis unit, 3—three-chamber bipolar membrane electrodialysis unit, 31—alkali chamber, 32—acid chamber, 33—salt chamber, 4—alkali-resistant electrodialysis unit, 41—alkali chamber, 42—concentrated alkali chamber, 5—acid-resistant electrodialysis unit, 51—salt chamber, 52—concentrated salt chamber.

DESCRIPTION OF THE PREFERRED EMBODIMENTS

All features or steps in all methods and procedures disclosed in the specification can be combined in any way, except mutually exclusive features and/or steps.

Any feature disclosed in the specification can be replaced with other equivalent or similar features, unless otherwise described, that is, each feature is only an example of series of equivalent or similar features, unless otherwise described.

The method for preparing battery grade and high purity grade lithium hydroxide and lithium carbonate from high-impurity lithium sources of the invention will be described in detail.

The invention is mainly directed to preparation and production from the following types of high-impurity lithium sources:

a first high-impurity lithium source is a high-impurity lithium source containing $Li^+$: 0.1 to 4 g/L $Li^+$, 2 to 110 g/L $Na^+$, 0.5 to 50 g/L $K^+$, 0 to 100 g/L $Mg^{2+}$, 0 to 20 g/L $Ca^{2+}$, 0 to 5 g/L B, 0 to 250 g/L $SO_4^{2-}$ and 0 to 200 g/L $Cl^-$ and having a pH of 6 to 12, or a lithium salt solution containing 1.5 to 2 g/L $Li^+$, 60 to 100 g/L $Na^+$, 0 to 220 g/L $SO_4^{2-}$, 0 to 200 g/L $Cl^-$ and 13 to 17 g/L $CO_3^{2-}$ and having a pH of 11 to 12;

a second high-impurity lithium source is a high-salt and high-impurity lithium solution containing 14 to 40 g/L $Li^+$, 20 to 80 g/L $Na^+$, 0 to 30 g/L $K^+$, 0 to 20 g/L $Mg^{2+}$, 0 to 10 g/L $Ca^{2+}$: and 0 to 15 g/L B or a high-salt and high-impurity lithium solution obtained by dissolving crude lithium sulfate and lithium chloride and reaching the specification range; and a high-impurity solid lithium salt is high-impurity lithium carbonate, lithium sulfate, lithium chloride or lithium sulfate and lithium chloride compound salt containing 0.5 to 1% Na, 0.1 to 0.5% K, 0.5 to 3% Ca and 0.3 to 5% Mg by mass.

For different high-impurity lithium sources vary in lithium contents, impurity contents and impurity categories, the invention prepares a purified lithium salt solution from the high-impurity lithium sources by combining different modules to adapt to nature variation of the lithium-containing solution and obtain a refined lithium salt solution meeting the production requirements for battery grade and high purity grade lithium hydroxide and lithium carbonate products. It should be noted that the term "containing" in the invention means "including", that is, there are other ions or components in addition to the listed key ions or components.

Figure 1:
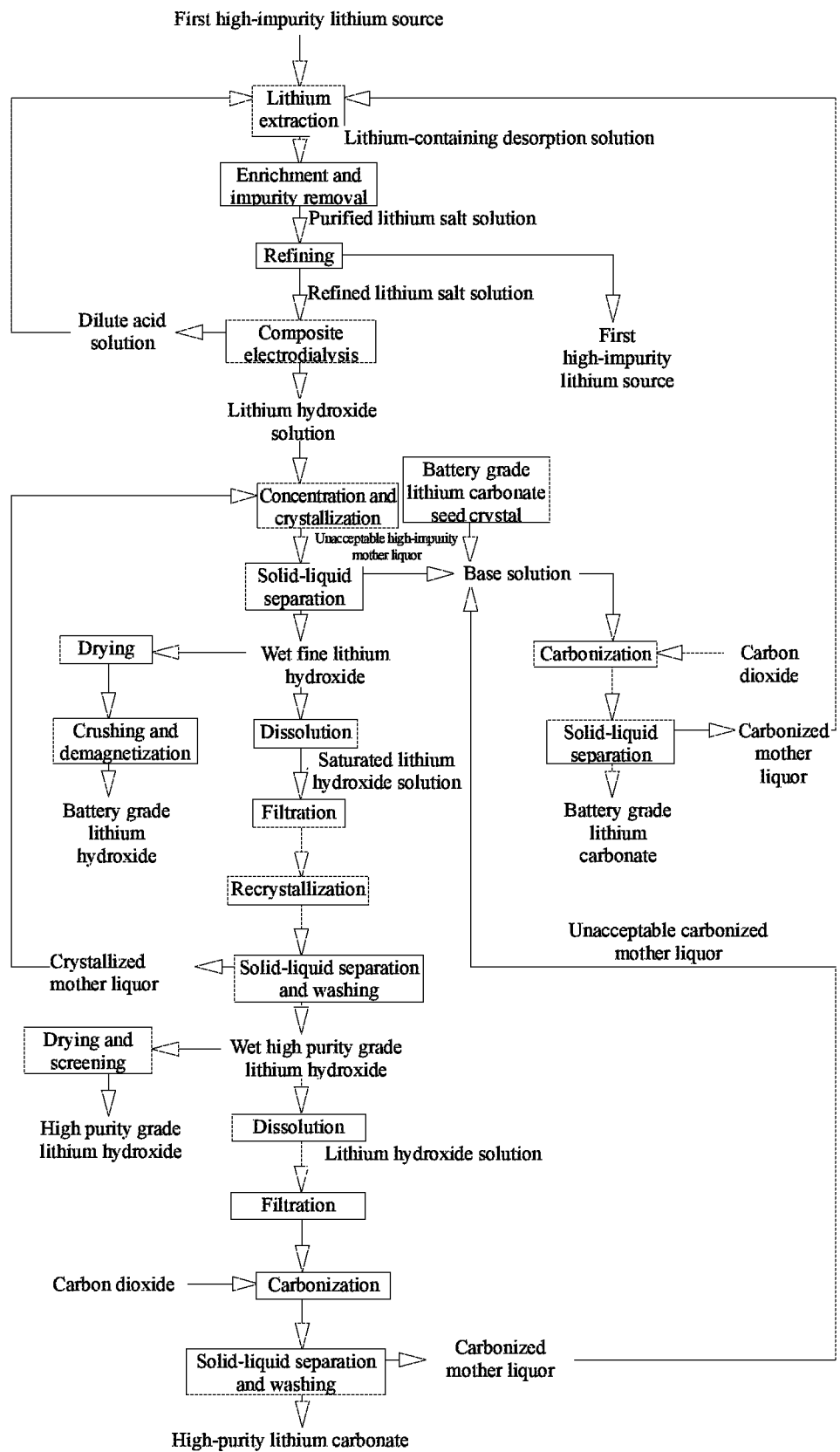
FIGS. 1, 2 and 3 show a flow chart of the method for preparing battery grade and high purity grade lithium hydroxide and lithium carbonate from high-impurity lithium sources according to an exemplary embodiment of the invention respectively, wherein FIG. 1 relates to a processing flow of the first high-impurity lithium source, FIG. 2 relates to a processing flow of the second high-impurity lithium source, and FIG. 3 relates to a processing flow of the high-impurity solid lithium salt.
Figure 2:
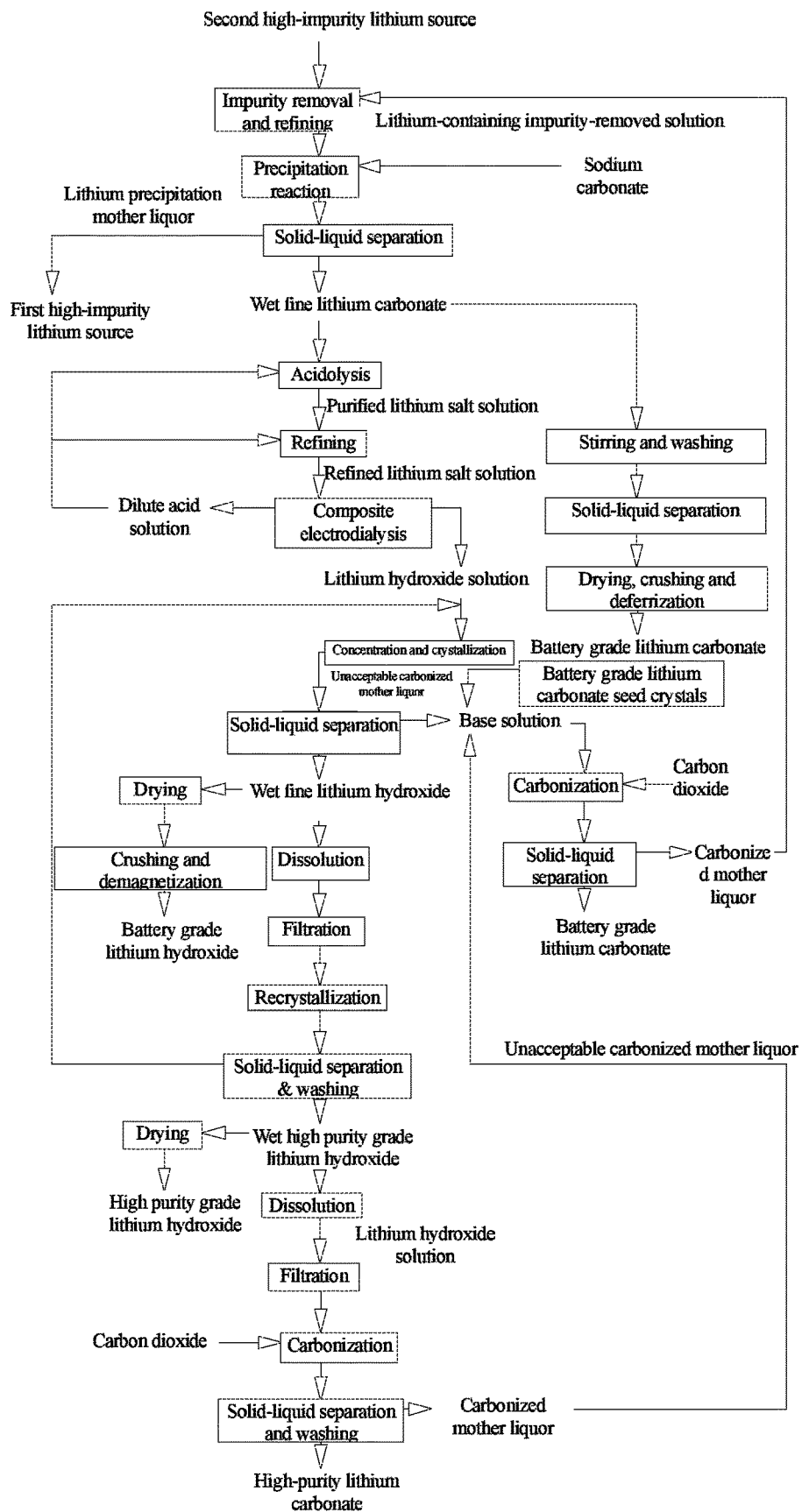
Figure 3:
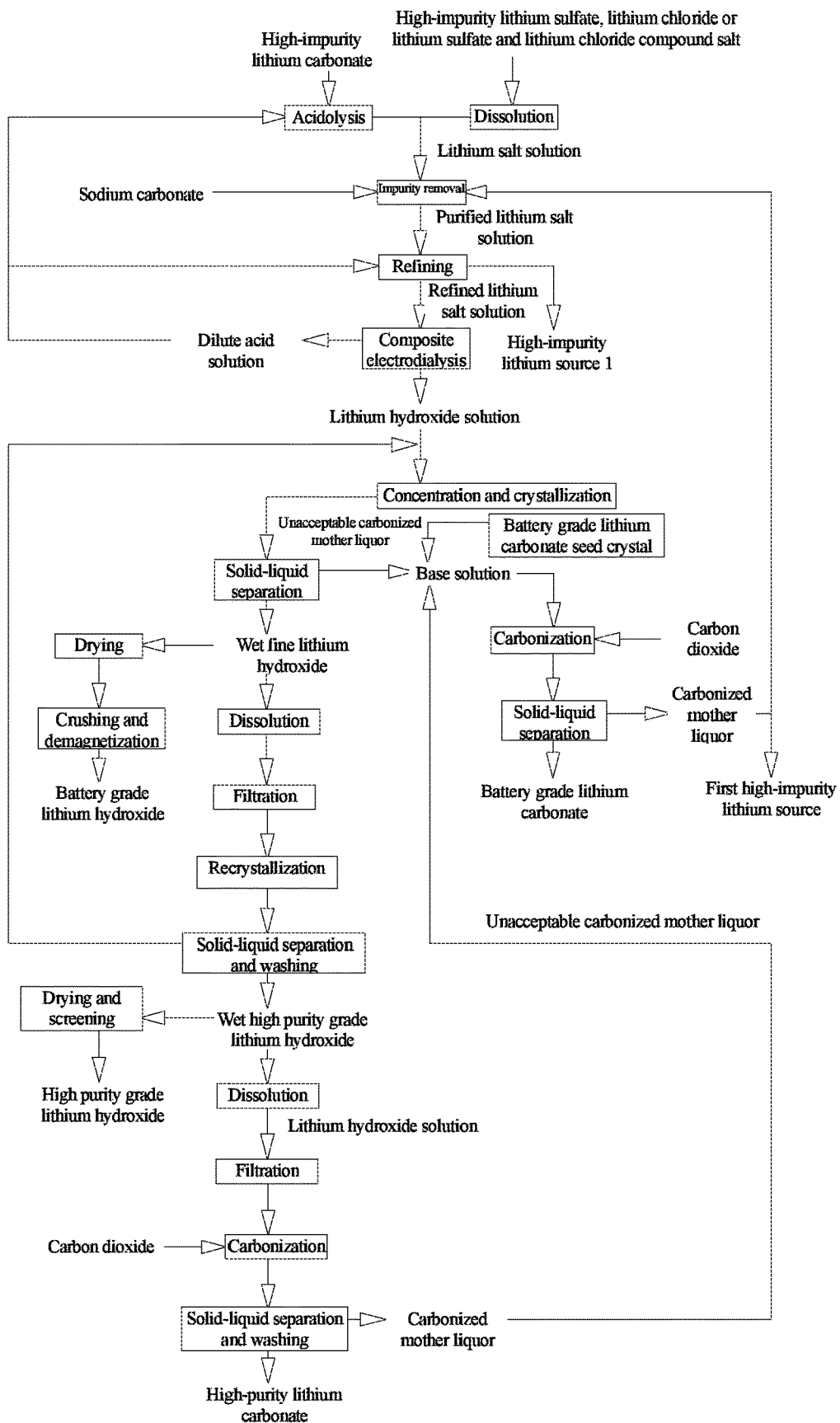

FIGS. 1 to 3 show flow charts of methods for preparing battery grade and high purity grade lithium hydroxide and lithium carbonate from different high-impurity lithium sources respectively. As shown in FIGS. 1 to 3, different processes and modules are combined according to different high-impurity lithium sources to meet quality requirements for production of the high purity grade and battery grade lithium hydroxide and lithium carbonate products.

According to an exemplary embodiment of the invention, the method for preparing battery grade and high purity grade lithium hydroxide and lithium carbonate from high-impurity lithium sources comprises the following steps:

Step A: Preparation of a Refined Lithium Salt Solution a. Treatment of High-Impurity Lithium Source:

pre-treating the high-impurity lithium sources varying in quality by different combinations of physical and chemical impurity removal methods to obtain a purified lithium salt solution containing 7 to 24 g/L $Li^+$, 0.01 to 0.02 g/L $Ca^{2+}$, 0.01 to 0.02 g/L $Mg^{2+}$, 0 to 200 g/L $SO_4^{2-}$, 0 to 200 g/L $Cl^-$ and 0.01 to 0.06 g/L B and having a pH of 9 to 11.

1) For the first high-impurity lithium source, i.e., the high-impurity lithium source contains 0.1 to 4 g/L $Li^+$, 2 to 110 g/L $Na^+$, 0.5 to 50 g/L $K^+$, 0 to 100 g/L $Mg^{2+}$, 0 to 20 g/L $Ca^{2+}$ and 0 to 5 g/L B and has the pH of 6 to 12, or contains 1.5 to 2 g/L $Li^+$, 60 to 100 g/L $Na^+$, 0 to 220 g/L $SO_4^{2-}$, 0 to 200 g/L $Cl^-$ and 13 to 17 g/L $CO_3^{2-}$ and has the pH of 11 to 12, the process flow is as shown in FIG. 1.

The first high-impurity lithium source with the pH adjusted to 6 to 8 is filtered to obtain a filtrate, a lithium ion exchange adsorbent is added to the filtrate to selectively adsorb lithium; the lithium ion exchange adsorbent saturated with lithium by adsorption is washed with water and cyclically desorbed with a dilute acid to obtain a lithium-containing desorption solution; the pH of the lithium-containing desorption solution is adjusted to 7 to 9 for 30 to 60 min reaction, and then the solution is filtered to obtain a filtrate; the filtrate is enriched and concentrated to obtain a lithium-rich solution; and the lithium-rich solution is subject to chemical impurity removal to obtain a purified lithium salt solution.

Specifically, the first high-impurity lithium source is filtered by one of a sand filter, a ceramic filter, a PA microporous tube filter and a PE microporous tube filter to obtain a filtrate. In addition, the filtrate of the first high-impurity lithium source is pumped into an adsorber packed with the lithium ion exchange adsorbent to selectively adsorb lithium so as to effectively separate lithium ions from calcium, magnesium, sodium, potassium and boron ions.

The lithium ion exchange adsorbent is a lithium ion sieve capable of remembering lithium ions and selectively adsorbing the lithium ions by exchanging with hydrogen ions among lattices. For example, $H_2Mn_2O_4$ or $H_2TiO_3$ are available lithium ion exchange adsorbents. The saturated lithium ion exchange adsorbent is washed with water, and after the washing water is drained out, the lithium ion exchange adsorbent saturated with lithium by adsorption is desorbed with a dilute acid to obtain the lithium-containing desorption solution.

Preferably, the washing water 3 to 5 times volume of the lithium ion exchange adsorbent is used to wash the lithium ion exchange adsorbent and residue of the high-impurity lithium source in the adsorber. In order to improve utilization ratio of pure water, the washing water of the first 1 to 2 times the volume of the lithium ion exchange adsorbent contain has relatively high impurity content and is drained out directly; the rest washing water 2 to 3 times the volume of the lithium ion exchange adsorbent is collected as the washing water of the first 1 to 2 times the volume of the lithium ion exchange adsorbent in a next adsorber; and all washing water in the adsorber is drained out after washing.

After the lithium ion exchange adsorbent saturated with lithium by adsorption is washed and the washing water is drained, a dilute acid is used to desorb the lithium adsorbed by the lithium ion sieve. Specifically, the lithium ion exchange adsorbent is desorbed with a dilute acid with an $H^+$ concentration of 0.2 to 0.5 mol/L for 0.5 h to 1 h to obtain the lithium-containing desorption solution; the dilute acid is preferably at least one of sulfuric acid and hydrochloric acid, wherein the $H^+$ concentration of the dilute acid is 0.2 to 0.5 mol/L and the desorption lasted for 0.5 to 1 h; the $H^+$ of the desorption solution exchange with the $Li^+$ of the lithium ion adsorbent in the desorption process, so the $H^+$ concentration of the desorption solution decreases with a desorption efficiency; and to keep an efficient desorption, the dilute acid needed to be added to maintain the $H^+$ concentration of the desorption solution at 0.2 to 0.5 mol/L. After the lithium ion exchange adsorbent is desorbed by the dilute acid, the water 1 to 2 times the volume of the lithium ion exchange adsorbent is used to wash the lithium ion exchange adsorbent and drained out with the desorption solution in the adsorber; the desorption solution is mixed with the washing water to obtain the lithium-containing desorption solution; and the washed adsorber is used for another cycle of selective lithium adsorption.

The dilute sulfuric acid is used for desorption to obtain a desorbed lithium sulfate solution, and dilute hydrochloric acid is used for desorption to obtain a desorbed lithium chloride solution; and the obtained lithium-containing desorption solution contains 1 to 3 g/L $Li^+$, 0.005 to 0.05 g/L $Na^+$, 0.000 to 0.005 g/L $K^+$, 0.0010 to 0.01 g/L $Ca^{2+}$, 0.000 to 0.005 g/L $Mg^{2+}$ and 0.000 to 0.005 g/L B and has the pH of 1 to 4.

Specifically, the lithium-containing desorption solution is enriched and concentrated to obtain a lithium-rich solution. The enrichment and concentration are reverse osmosis and electrodialysis coupling enrichment and concentration. Preferably, sodium hydroxide, lithium hydroxide or similar alkali is used to adjust the pH of the lithium-containing desorption solution to 7 to 9; one of the ceramic filter, the PA microporous tube filter and the PE microporous tube filter is used to filter the lithium-containing desorption solution after 30 to 60 min reaction to obtain a treated filtrate of the lithium-containing desorption solution; and the treated filtrate of the lithium-containing desorption solution is subject to the reverse osmosis and electrodialysis coupling enrichment and concentration to obtain a lithium-rich solution and desalted production water.

Figure 5:
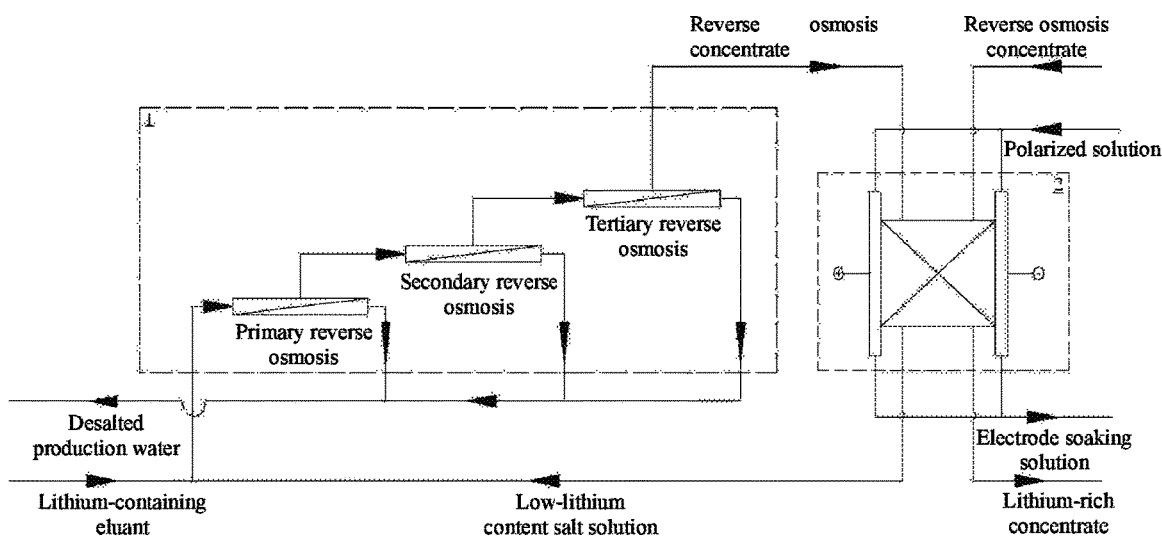
FIG. 5 shows a structural schematic diagram of the reverse osmosis and electrodialysis coupling device of the invention.

Specifically, the lithium-containing desorption solution is treated by a reverse osmosis and electrodialysis coupling device to obtain a filtrate; the filtrate is enriched and concentrated to obtain the lithium-rich solution and desalted production water. FIG. 5 shows a structural schematic diagram of a reverse osmosis and electrodialysis coupling device of the invention. As shown in FIG. 5, the reverse osmosis and electrodialysis coupling device of the invention comprises a three-stage disc tube reverse osmosis (DTRO) unit 1 coupled with a two-chamber electrodialysis unit 2 comprising a salt chamber and a concentrated salt chamber, wherein the filtrate obtained by treating the lithium-containing desorption solution is concentrated in the three-stage disc tube reverse osmosis unit 1 to obtain the reverse osmosis concentrate and the desalted production water; the reverse osmosis concentrate is fed to the salt chamber of the two-chamber electrodialysis unit 2, lithium ions migrate to the concentrated salt chamber in the presence of an electric field, a lithium-rich solution is obtained from the concentrated salt chamber, the lithium content in the salt chamber lowers, and the low-lithium-containing salt solution obtained from the salt chamber and the filtrate obtained by treating the lithium-containing desorption solution are fed to the three-stage disc tube reverse osmosis unit 1 for concentration treatment; and the system is subject to coupling operation. The obtained reverse osmosis concentrate contains 4 to 7 g/L. $Li^+$, 0.005 to 0.01 g/L $Ca^{2+}$ and 0.000 to 0.002 g/L $Mg^{2+}$ and has the pH of 7 to 9, the obtained desalted production water can be used as the washing water of the lithium ion exchange adsorbent, and the obtained lithium-rich solution contains 7 to 24 g/L $Li^+$, 0.01 to 0.02 g/L $Ca^{2+}$, 0.01 to 0.02 g/L $Mg^{2+}$, 0.000 to 0.002 g/L $Mn^{2+}$, 0.000 to 0.002 g/L $Fe^{2+}$ and 0.01 to 0.06 g/L B and has the pH of 7 to 9.

After chemical impurity removal, the lithium-rich solution is filtered to obtain the purified lithium salt solution.

Specifically, a sodium carbonate solution with a concentration of 200 to 300 g/L is added to the lithium-rich solution with sodium carbonate excess controlled at 0.3 to 0.5 g/L to react with the lithium-rich solution at 80° C. to 90° C. for 10 to 30 min and react at the temperature for 30 to 60 min after the pH of the lithium-rich solution is adjusted to 9 to 11 with alkali, and the lithium-rich solution is roughly filtered by one of a plate and frame filter, a candle filter and a microporous filter to obtain a filtrate, and the microporous filter or the ceramic filter with a filter precision of 0.1 to 0.2 μm is used for fine filtration of the filtrate to obtain a purified lithium salt solution containing 7 to 24 g/L $Li^+$, ≤10 ppm $Ca^{2+}$, ≤1 ppm $Mg^{2+}$, ≤5 ppm Mn, ≤1 ppm Fe, 0 to 200 g/L $SO_4^{2-}$, 0 to 200 g/L $Cl^-$ and 0.01 to 0.06 g/L B and having a pH of 9 to 11.

2) For the second high-impurity lithium source, i.e. the high-salt and high-impurity lithium solution contains 14 to 40 g/L $Li^+$, 20 to 80 g/L $Na^+$, 0 to 30 g/L $K^+$, 0 to 20 g/L $Mg^{2+}$, 0 to 10 g/L $Ca^{2+}$ and 0 to 15 g/L B or the high-salt and high-impurity lithium solution obtained by dissolving crude lithium sulfate and lithium chloride and reaching the specification ranges, the following pre-treatment steps are implemented to pre-treat the second high-impurity lithium source to obtain a purified lithium salt solution, and then the purified lithium salt solution is further used to prepare battery grade and high purity grade lithium hydroxide and lithium carbonate. The process flow is as shown in FIG. 2.

The specific pretreatment steps are described as follows:

① The second high-impurity lithium source is subject to chemical impurity removal to obtain a lithium-containing impurity-removed solution containing 14 to 40 g/L $Li^+$, 20 to 80 g/L $Na^+$, 0 to 30 g/L $K^t$, ≤1 ppm $Mg^{2+}$, ≤10 ppm $Ca^{2+}$ and 0 to 5 g/L B and having a pH of 9 to 11.

Specifically, a sodium carbonate solution with a concentration of 200 to 300 g/L is added to the second high-impurity lithium source with sodium carbonate excess controlled at 0.3 to 0.5 g/L to react with the second high-impurity lithium source at 80° C. to 90° C. for 10 to 30 min and react at the temperature for 30 to 60 min after the pH of the second high-impurity lithium source is adjusted to 9 to 11 with alkali, and second high-impurity lithium source is roughly filtered by one of the plate and frame filter, the candle filter and the microporous filter to obtain a filtrate, and the microporous filter or the ceramic filter with a filter precision of 0.1 to 0.2 μm is used for fine filtration of the filtrate to obtain an lithium-containing impurity-removed solution containing 14 to 40 g/L $Li^+$, 20 to 90 g/L $Na^+$, 0 to 30 g/L $K^+$, ≤1 ppm $Mg^{2+}$, ≤10 ppm $Ca^{2+}$ and 0 to 5 g/L B and having a pH of 9 to 11.

② The lithium-containing impurity-removed solution is precipitated with the sodium carbonate solution, lithium carbonate slurry obtained by continuous feeding and continuous separation is thickened to reach 20 to 40% solid content, and then the slurry is subject to solid-liquid separation to obtain wet fine lithium carbonate and a lithium precipitation mother liquor, wherein the lithium precipitation mother liquor is the first high-impurity lithium source containing 1.5 to 2 g/L $Li^+$, 60 to 100 g/L $Na^+$, 0 to 220 g/L $SO_4^{2-}$, 0 to 200 g/L $Cl^-$ and 13 to 17 g/L $CO_3^{2-}$ and having a pH of 11 to 12, and the lithium precipitation mother liquor is returned and subject to the treatment process for the first high-impurity solid lithium salt to obtain a purified lithium salt solution.

Specifically, the lithium-containing impurity-removed solution and a sodium carbonate solution with a concentration of 200 to 300 g/L are concurrently added to a continuous crystallization reactor for precipitation reaction, the temperature of the reaction system is controlled at 85 to 95° C., the feeding rate of the sodium carbonate solution and the lithium-containing impurity-removed solution is controlled to keep an instantaneous Li concentration of 3 to 7 g/L and a sodium carbonate concentration of 30 to 65 g/L when entering the reaction system; upon continuous feeding, lithium carbonate slurry is separated out continuously and introduced into a thickener to obtain lithium carbonate slurry with a solid content of 20 to 40%, the lithium carbonate slurry is subject to solid-liquid separation by a centrifuge to obtain wet fine lithium carbonate and a lithium precipitation mother liquor.

The invention uses a continuous operation mode, the sodium carbonate solution and the lithium-containing impurity-removed solution are continuously added to the continuous crystallization reactor to obtain the lithium carbonate slurry continuously, supersaturation degree of reactive crystallization of lithium carbonate is controlled by controlling the feeding speed of the sodium carbonate solution and the lithium-containing impurity-removed solution to avoid explosive nucleation, so as to obtain large-grained lithium carbonate with improved crystallinity, facilitate the solid-liquid separation and washing, and improve purity of the lithium carbonate. At the startup of the continuous crystallization reactor, the base solution can be pure water or the obtained lithium precipitation mother liquor.

The used continuous crystallization reactor comprises a reaction crystallizer with a draft tube and a thickener, feeding inlets of the lithium-containing impurity-removed solution and the sodium carbonate solution are aligned and disposed outside the draft tube. Part of a supernatant obtained from the thickener is forcibly returned to the reaction crystallizer by a pump; the lithium-containing impurity-removed solution is kept at an instantaneous Li concentration of 3 to 7 g/L independently or after being mixed with the supernatant returned from the thickener, and then sent to the draft tube of the reaction crystallizer to react with the sodium carbonate solution for precipitation; and the sodium carbonate solution is added to the continuous reaction crystallizer and mixed to maintain a sodium carbonate concentration of 30 to 65 g/L. The stirring of the reaction crystallizer makes the liquid in the draft tube flow upwards and form a flow field circulating up and down, so that the lithium-containing impurity-removed solution and the sodium carbonate solution are premixed with the solution in the reaction system to decrease the concentration before feeding to the draft tube for reaction. In this way, the reaction supersaturation degree is controlled; reactive crystallization rate of the lithium carbonate, crystal morphology and granularity are controlled; impurity entrainment is reduced; and solid-liquid separation and washing are facilitated to be conducive to the purity of obtained wet fine lithium carbonate.

③ The obtained wet fine lithium carbonate reacts with hydrochloric acid, sulfuric acid or a mixture of hydrochloric acid and sulfuric acid with an $H^+$ concentration of 2 to 3 mol/L to obtain a liquid with pH at reaction endpoint controlled at 4 to 6. Alkali is added to the liquid to adjust the pH to 9 to 11, and then the liquid is filtered to obtain a purified lithium salt solution containing 7 to 24 g/L $Li^+$, ≤10 ppm $Ca^{2+}$, ≤1 ppm $Mg^{2+}$, ≤5 ppm $Mg^{2+}$, ≤1 ppm $Fe^{3+}$, 0 to 200 g/L $SO_4^{2-}$, 0 to 200 g/L and 0.01 to 0.06 g/L B and having a pH of 9 to 11.

In addition, the wet fine lithium carbonate obtained from the pretreatment step can also be subject to subsequent treatment to obtain battery grade lithium carbonate. Specifically, the wet fine lithium carbonate is added to 60° C. to 80° C. pure water at a solid-liquid ratio of 1:3 to 5 for stirring and washing for 30 to 60 min, and was subject to solid-liquid separation, drying, crushing and deferrization to obtain a battery grade lithium carbonate product; and the water for stirring and washing was recycled for preparing sodium carbonate.

c) For the high-impurity solid lithium salt, i.e., high-impurity lithium carbonate, lithium sulfate, lithium chloride or lithium sulfate and lithium chloride compound salt containing 0.5 to 1% Na, 0.1 to 0.5% K, 0.5 to 3% Ca and 0.3 to 5% Mg by mass, the high-impurity solid lithium salt is dissolved in dilute acid or pure water to form a lithium salt solution; the lithium salt solution is filtered to obtain a filtrate without insoluble impurities, and the filtrate is subject to chemical impurity removal to obtain a purified lithium salt solution; and the obtained purified lithium salt solution is used to prepare battery grade and high purity grade lithium hydroxide and lithium carbonate. The process flow is shown in FIG. 3.

Specifically, the high-impurity lithium carbonate reacts with hydrochloric acid, sulfuric acid or a mixture of hydrochloric acid and sulfuric acid with the $H^+$ concentration of 2 to 3 mol/L to obtain a liquid with pH at reaction endpoint controlled at 4 to 6; the liquid is filtered to obtain a lithium salt solution; the high-impurity lithium sulfate, lithium chloride or lithium sulfate and lithium chloride compound salt is dissolved with pure water to obtain the lithium salt solution containing 7 to 24 g/L $Li^+$.

Subsequently, the sodium carbonate solution with a concentration of 200 to 300 g/L is added to the lithium salt solution with sodium carbonate excess controlled at 0.3 to 0.5 g/L to react with the lithium salt solution at 80° C. to 90° C. for 10 to 30 min and react at the temperature for 30 to 60 min after the pH of the lithium salt solution is adjusted to 9 to 11 with alkali, and the lithium salt solution is roughly filtered by one of a plate and frame filter, a candle filter and a microporous filter to obtain a filtrate, and the microporous filter or the ceramic filter with a filter precision of 0.1 to 0.2 μm is used for fine filtration of the filtrate to obtain a purified lithium salt solution containing 7 to 24 g/L $Li^+$, 0.01 to 0.05 g/L $K^+$, 0.05 to 0.1 g/L $Na^+$, 0.01 to 0.02 g/L $Ca^{2+}$, 0.000 to 0.005 g/L $Mg^{2+}$, 0 to 200 g/L $SO_4^{2-}$, 0 to 200 g/L $Cl^-$ and 0.01 to 0.06 g/L B and having a pH of 9 to 11.

b. Refining of the Purified Lithium Salt Solution:

The pH of the purified lithium salt solution obtained from the step a is adjusted to 8 to 9, and then subject to deep impurity removal treatment by ion exchange chelating resin to obtain a refined lithium salt solution containing 7 to 24 g/L Li+, ≤1 ppm $Ca^{2+}$, ≤1 ppm $Mg^{2+}$, ≤1 ppm $Fe^{2+}$, ≤1 ppm $Mn^{2+}$, ≤1 ppm $Zn^{2+}$, ≤1 ppm $Al^{3+}$, 0 to 200 g/L $SO_4^{2-}$, 0 to 200 g/L $Cl^-$ and ≤5 ppm B and having a pH of 8 to 9.

The purified lithium salt solution with a temperature of 50 to 60° C. and pH of 8 to 9 is controlled to enter a chelating resin ion exchange column packed with chelating resin for deep impurity removal treatment. The chelating resin is cation chelating resin, preferably iminodiacetic acid chelating resin. The chelating resin ion exchange column of the invention uses triple-column (A/B/C) mode, the column A and the column B operate in series, and the column C is for off-line regeneration, the column A serves as a primary column and the column B is a secondary column and serves as a secure column; when the column A is saturated by adsorption, the column B rises and serves as the primary column, and the column C is connected with the column B and serves as the secondary column; and the chelating resin ion exchange column always uses A→B, B→C and C→A serial operation mode to ensure the lithium salt solution subject to impurity removal treatment containing ≤1 ppm Ca, ≤1 ppm Mg, ≤1 ppm Fe, ≤1 ppm Mn, ≤1 ppm Zn and ≤1 ppm Al.

After saturation with the chelating resin by adsorption, the chelating resin is subject to acid regeneration with hydrochloric acid or sulfuric acid, and then subject to alkali regeneration with lithium hydroxide solution. The lithium-containing solution produced in the regeneration processes is returned and subject to the treatment process of the first high-impurity lithium source to obtain the purified lithium salt solution.

Step B: Preparation of Battery Grade Lithium Hydroxide
a. Composite Electrodialysis:

The refined lithium salt solution obtained from the step A is subject to composite electrodialysis to obtain a lithium hydroxide solution with a LiOH concentration of 1 to 4 mol/L and a dilute acid solution with an $H^+$ concentration of 0.5 to 2 mol/L. The dilute acid solution generated by the composite electrodialysis can be used for adsorption and desorption, pH adjustment and/or resin regeneration or lithium carbonate dissolution in the step A, and the lithium hydroxide solution is treated in the next step.

Figure 6:
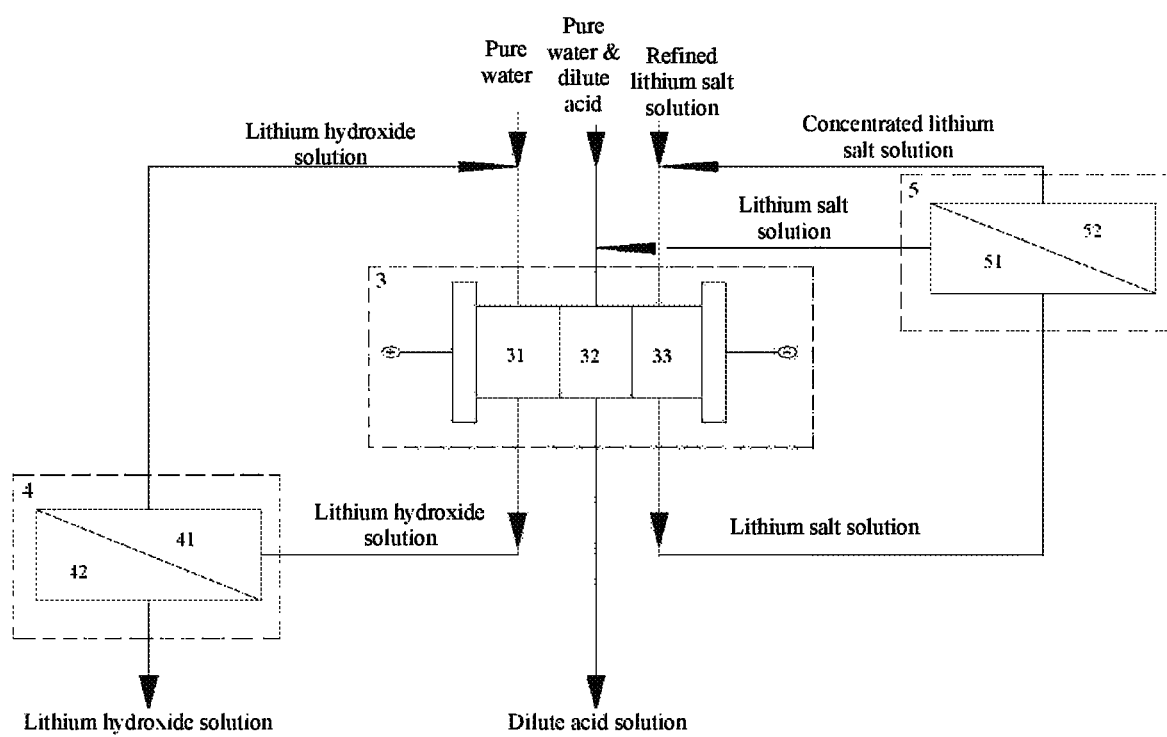
FIG. 6 shows a structural schematic diagram of the composite electrodialysis device of the invention.

Specifically, the refined lithium salt solution is pumped into a composite electrodialysis device for composite electrodialysis. FIG. 6 shows a structural schematic diagram of the composite electrodialysis device of the invention. As shown in FIG. 6, the composite electrodialysis device used in the invention is formed by coupling a three-chamber bipolar membrane electrodialysis unit 3, an alkali-resistant electrodialysis unit 4 and an acid-resistant electrodialysis unit 5, and used to obtain a lithium hydroxide solution with a concentration of 1 to 4 mol/L. Meanwhile, the composite electrodialysis is used to effectively recover lithium from a light salt solution generated by the bipolar membrane electrodialysis unit and improve recovery rate.

The bipolar membrane electrodialysis unit 3 of the invention comprises an anode chamber, a cathode chamber, and an alkali chamber 31, an acid chamber 32 and a salt chamber 33 separated by a membrane stack between the anode chamber and the cathode chamber; the anode chamber is connected with a positive electrode of a power supply, and the cathode chamber is connected with a negative electrode of the power supply; the membrane stack comprises bipolar membranes, cation exchange membranes and anion exchange membranes arranged alternately; the bipolar membrane is composed of a cation exchange membrane, an anion exchange membrane and a catalytic layer interposed therebetween; the alkali chamber 31 is formed between the anion exchange membrane and the cation exchange membrane of the bipolar membrane, the acid chamber 32 is formed between the cation exchange membrane and the anion exchange membrane of the bipolar membrane, and the salt chamber 33 is formed between the anion exchange membrane and the cation exchange membrane.

During operation, the lithium hydroxide solution or pure water is introduced into the alkali chamber 31, the dilute acid or pure water is introduced into the acid chamber 32, the refined lithium salt solution obtained from the step A is introduced into the salt chamber 33, and an electrode soaking solution is introduced into the anode chamber and the cathode chamber concurrently. The electrode soaking solution plays the role of electric conduction. In the presence of a DC electric field, $Li^+$ in the salt chamber 33 is fed to the alkali chamber 31 via the cation exchange membrane; water molecules on the surface of the bipolar membrane are electrolyzed under the catalysis of the catalytic layer of the bipolar membrane to generate $H^+$ and $OH^-$; in the presence of the electric field, $OH^-$ is fed to the alkali chamber 31 via the anion exchange membrane of the bipolar membrane, and forms LiOH with the $Li^+$ feeding to the alkali chamber 31 via the cation exchange membrane; and LiOH continues circulation to obtain a lithium hydroxide solution. Meanwhile, $SO_4^{2-}$, $Cl^-$ or other anions in the salt chamber 33 are fed to the acid chamber 32 via the anion exchange membrane, the $H^+$ generated by the bipolar membrane is fed to the acid chamber 32 via the cation exchange membrane of the bipolar membrane in the presence of the electric field, and then forms a corresponding acid solution with anions such as $SO_4^{2-}$ or $Cl^-$ to obtain a lithium hydroxide solution from the alkali chamber 31, a dilute acid solution from the acid chamber 32, and a lithium salt solution from the salt chamber 33.

The alkali-resistant electrodialysis unit 4 is a two-chamber electrodialyzer and comprises an anode chamber, a cathode chamber and an alkali chamber 41 and a concentrated alkali chamber 42 separated by a membrane stack between the anode chamber and the cathode chamber; the anode chamber is connected with a positive electrode of a power supply, and the cathode chamber is connected with a negative electrode of the power supply; the membrane stack comprises cation exchange membranes and anion exchange membranes arranged alternately; the alkali chamber 41 is formed between the anion exchange membrane and the cation exchange membrane, and the concentrated alkali chamber 42 is formed between the cation exchange membrane and the anion exchange membrane; and both the cation exchange membrane and the anion exchange membrane are alkali-resistant homogeneous membranes.

The lithium hydroxide solution obtained from the alkali chamber 41 of the bipolar membrane electrodialysis unit is introduced into the alkali chamber 41 of the alkali-resistant electrodialysis unit; in the presence of a DC electric field, the lithium hydroxide solution with the LiOH concentration of 1 to 4 mol/L is obtained from the concentrated alkali chamber 42, and the lithium hydroxide solution with decreased concentration in the alkali chamber 41 is returned to the alkali chamber of the bipolar membrane electrodialysis unit for cyclic treatment.

The acid-resistant electrodialysis unit 5 is a two-chamber electrodialyzer and comprises an anode chamber, a cathode chamber and an salt chamber 51 and a concentrated salt chamber 52 separated by a membrane stack between the anode chamber and the cathode chamber; the anode chamber is connected with a positive electrode of a power supply, and the cathode chamber is connected with a negative electrode of the power supply; the membrane stack comprises cation exchange membranes and anion exchange membranes arranged alternately; the salt chamber 51 is formed between the anion exchange membrane and the cation exchange membrane, and the concentrated salt chamber 52 is formed between the cation exchange membrane and the anion exchange membrane; and both the cation exchange membrane and the anion exchange membrane are acid-resistant homogeneous membranes.

The lithium salt solution obtained from the salt chamber 33 of the bipolar membrane electrodialysis unit 3 is introduced into the salt chamber 51; in the presence of the DC electric field, the concentrated lithium salt solution obtained from the concentrated salt chamber 52 is introduced into the salt chamber 33 of the bipolar membrane electrodialysis unit 3 with the refined lithium salt solution for cyclic treatment; and the lithium salt solution with decreased concentration in the salt chamber 51 is returned to the acid chamber 32 of the bipolar membrane electrodialysis unit 3 for cyclic treatment.

After the composite electrodialysis treatment, the LiOH concentration of the lithium hydroxide solutions in the alkali chamber 31 of the bipolar membrane electrodialysis unit 3 and the alkali chamber 41 of the alkali-resistant electrodialysis unit 4 is 0.5 to 2 mol/L, the $Li^+$ concentration of the lithium salt solutions in the salt chamber 33 of the bipolar membrane electrodialysis unit 3 and the concentrated salt chamber 52 of the acid-resistant electrodialysis unit 5 is 7 to 17 g/L, the concentration of $Li^+$ in the lithium salt solution with decreased concentration discharged from the salt chamber 51 of the acid-resistant electrodialysis unit 5 is 0.5 to 3 g/L, the concentration of $H^+$ in the dilute acid solution discharged from the acid chamber 32 of the bipolar membrane electrodialysis unit 3 is 0.5 to 2 mol/L, and the concentration of $Li^+$ in the lithium salt solution discharged from the salt chamber 33 of the bipolar membrane electrodialysis unit 3 is 3 to 5 g/L.

A lithium hydroxide solution with the LiOH concentration of 0.8 to 1.5 mol/L is used as an electrode soaking solution of the bipolar membrane electrodialysis unit 3 and the alkali-resistant electrodialysis unit 4, and a lithium salt solution with the $Li^+$ concentration of 0.8 to 1.5 mol/L is correspondingly used as an electrode soaking solution of the acid-resistant electrodialysis unit 5.

b. Concentration and Crystallization:

The lithium hydroxide solution with the LiOH concentration of 1 to 4 mol/L obtained by the composite electrodialysis is evaporated, concentrated and crystallized to obtain lithium hydroxide magma; the lithium hydroxide magma is further cooled and crystallized in a cooling crystallizer, and then subject to solid-liquid separation and washing to obtain wet fine lithium hydroxide; and the wet fine lithium hydroxide is subject to drying, crushing, demagnetization and other post-treatment to obtain the battery grade lithium hydroxide.

Specifically, a mechanical vapor recompression (MVR) continuous evaporation, concentration and crystallization device is used to evaporate and concentrate the lithium hydroxide solution with the LiOH concentration of 1 to 4 mol/L with an evaporation chamber controlled at 75 to 80° C. to separate out crystals with crystal growth and retention time lasting 3 to 5 h to obtain magma. The obtained lithium hydroxide magma is fed to the cooling crystallizer for recrystallization. During the process of MVR concentration and crystallization, the impurities in the mother liquor gradually enrich. When the impurities in the mother liquor contains ▯10 g/L K, ▯20 g/L Na or ▯40 g/L $SO_4$, the unacceptable high-impurity mother liquor needed to be returned for subsequent preparation of the battery grade lithium carbonate.

Specifically, an MVR evaporation, concentration and crystallization device is used to separate out lithium hydroxide, and the magma temperature is still maintained at 60 to 80° C. In order to obtain the lithium hydroxide particles with more uniform particle size and avoid generation of undersize lithium hydroxide particles during the centrifugal separation process at low temperature, the lithium hydroxide magma discharged from the MVR evaporation, concentration and crystallization device is fed to a DTB or an OLSO for continuous cooling crystallization with crystallization temperature controlled at 35 to 40° C. and crystal growth and retention time lasting 2 to 4 h to obtain lithium hydroxide having large particle size and uniform particle distribution, and easy to be filtered, washed and dried to obtain high-purity products.

The battery grade lithium hydroxide prepared by the invention can meet the lithium hydroxide quality requirements superior to requirements for $LiOH.H_2O-D_1$ in GB/T8766-2013.

Step C: Preparation of High Purity Grade Lithium Hydroxide

The wet fine lithium hydroxide obtained from the step B is dissolved to form a 80 to 100° C. saturated lithium hydroxide solution, and then the solution is filtered to obtain a filtrate; the filtrate is cooled for crystallization and then subject to solid-liquid separation to obtain wet high purity grade lithium hydroxide and a crystallization mother liquor; and the wet high purity grade lithium hydroxide is subject to washing, drying, screening and other post-treatment to obtain high purity grade lithium hydroxide. The wet fine lithium hydroxide can be dissolved in heated pure water, the evaporating condensate water obtained from the step B or the crystallization mother liquor obtained from the step C.

Specifically, one of a stainless steel microporous stick filter, a titanium microporous filter and a candle filter is used to filter the saturated lithium hydroxide solution.

For cooling crystallization, a DTB crystallizer or an OSLO crystallizer is preferably used to cool and crystallize the filtered saturated lithium hydroxide solution in a continuous cooling crystallization manner with crystallization temperature controlled at 30 to 40° C., and crystal growth and retention time lasting 3 to 5 h. In addition, a vacuum flash chamber is added to the backing stage of the DTB crystallizer or the OSLO crystallizer, and vacuum degree of the flash chamber is controlled −0.06 to −0.084 MPa by a vacuum pump. The 80 to 100° C. filtered saturated lithium hydroxide solution is fed to the flash chamber for vacuum flashing and pre-cooling to 65 to 75° C., then fed to the DTB crystallizer or the OSLO crystallizer for cooling crystallization; steam in the flash chamber is fed to a heat exchanger in the presence of a vacuum pump for heat exchange with cooling water; and the steam is cooled and condensed into water, and the cooling water is heated and takes away the system heat after the heat exchange, so that the feed liquid fed to the flash system is cooled. With the additional vacuum flash chamber at the backing stage, the cooling water is not directly subject to heat exchange with the materials to avoid scaling in the heat exchanger. Meanwhile, the vacuum flash chamber at the backing stage is used to reduce the temperature to 65 to 75° C. to relieve heat load of the DTB or the OSLO cooling crystallizer at a rear end, reduce the risk of scaling and blocking in the heat exchanger of the DTB or the OSLO cooling crystallizer, and make the equipment run continuously and stably for a long time. The steam condensate water of the flash system can be discharged from or returned to the flash chamber according to the system conditions.

The purity of the high purity grade lithium hydroxide prepared by the invention is higher than 99.99%.

Step D: Preparation of High Purity Grade Lithium Carbonate

The wet high purity grade lithium hydroxide obtained from the step C is dissolved to form a lithium hydroxide solution, and then the solution is filtered to obtain a filtrate; carbon dioxide is introduced into the filtrate for carbonization reaction to obtain lithium carbonate precipitate; after reaction, the solid-liquid separation is performed to obtain wet high purity grade lithium carbonate and a carbonized mother liquor; and the wet high purity grade lithium carbonate is subject to washing, drying, screening and other post-treatment to obtain high purity grade lithium carbonate.

The wet high purity grade lithium hydroxide is dissolved in pure water or evaporating condensate water or the acceptable carbonized mother liquor obtained from the step D. The acceptable carbonized mother liquor refers to the carbonized mother liquor containing □20 ppm Na or □20 ppm K or □2 ppm Mg or □5 ppm Ca.

Specifically, the wet high purity grade lithium hydroxide is dissolved into a lithium hydroxide solution with a conductivity of 300 to 380 ms/cm. The lithium hydroxide solution with the conductivity of 300 to 380 ms/cm is filtered by a bag filter, a candle filter or a stainless steel microporous filter to obtain a filtrate. The filtrate is added to a first carbonization reactor for stirring at a controlled speed of 30 to 80 rmp. While stirring, carbon dioxide is introduced into the reactor for carbonization. A PLC unit is used to judge introduction rate of carbon dioxide according to the conductivity data fed back by a conductivity meter, and then outputs instructions to a carbon dioxide control valve actuator. The actuator controls the valve's opening to control the introduction flow of carbon dioxide, and further controls decrease rate of conductivity of the carbonization reaction system at 2 to 7 ms/cm per minute. The control valve is turned off automatically to stop the introduction of carbon dioxide when the conductivity decreases to 100 to 150 ms/cm. After continuous stirring for 20 to 30 min reaction to obtain a liquid, the liquid is subject to solid-liquid separation, pure water washing, drying, screening and packaging to obtain the high purity grade lithium carbonate.

The purity of the high purity grade lithium carbonate prepared by the invention is higher than 99.995%.

Step E: Preparation of Battery Grade Lithium Carbonate

Battery grade lithium carbonate seed crystals are added to a base solution to obtain a homogenous mixture, carbon dioxide and an unacceptable lithium hydroxide solution containing the unacceptable high-impurity mother liquor obtained from the step B and the unacceptable carbonized mother liquor obtained by the solid-liquid separation from the step D are continuously introduced into the mixture to continuously separate out lithium carbonate slurry. The lithium carbonate slurry is aged and subject to the solid-liquid separation to obtain a carbonized mother liquor and wet battery grade lithium carbonate. The wet battery grade lithium carbonate is washed, dried and crushed to obtain battery grade lithium carbonate. The pure water or the unacceptable carbonized mother liquor obtained from the step D or the carbonized mother liquor obtained from the step E can be used as the base solution.

Specifically, the pure water or the unacceptable carbonized mother liquor obtained from the step D or the carbonized mother liquor obtained from the step E is added to a second carbonization reactor as the base solution and is heated to 60 to 80° C. Battery grade lithium carbonate seed crystals with a particle size range of 20 to 40 μm are added to the base solution at a volume concentration of 1 to 5‰. According to the conductivity change of the reaction system, the PLC control system is used to control the opening of the carbon dioxide control valve and the opening of a charging valve of the unacceptable lithium hydroxide solution to maintain the conductivity of the reaction system to be 60 to 90 ms/cm and maintain a reaction temperature at 60 to 80° C. The lithium carbonate slurry is continuously separated out under continuous feeding, and then added to an aging cell for continuous reaction for 30 to 60 min. The reacted slurry is subject to the solid-liquid separation to obtain a carbonized mother liquor and wet battery grade lithium carbonate. The wet battery grade lithium carbonate is washed, dried, crushed, deferrized and otherwise post-treated to obtain the battery grade lithium carbonate. The carbonized mother liquor obtained by the solid-liquid separation can be used for pH adjustment in the step A.

Further, the invention can make the refined lithium salt solution obtained from the step A react with a sodium carbonate solution to prepare the battery grade lithium carbonate.

The specific steps are as follows: the refined lithium salt solution is continuously precipitated with a sodium carbonate solution to obtain a lithium carbonate slurry continuously; the lithium carbonate slurry is thickened and then subject to the solid-liquid separation and washing to obtain wet fine lithium carbonate and a lithium precipitation mother liquor; the lithium precipitation mother liquor is the first high-impurity lithium source containing 1.5 to 2 g/L $Li^+$, 60 to 100 g/L $Na^+$, 0 to 220 g/L $SO_4^{2-}$, 0 to 200 g/L $Cl^-$ and 13 to 17 g/L $CO_3^{2-}$ and having a pH of 11 to 12, and the lithium precipitation mother liquor can be returned and subject to the treatment process of the first high-impurity solid lithium salt to obtain the purified lithium salt solution; and the obtained wet fine lithium carbonate can be subject to stirring and washing, solid-liquid separation, washing, drying, crushing and demagnetization to obtain the battery grade lithium carbonate. The water for stirring and washing can be reused for dissolving sodium carbonate.

Specifically, the refined lithium salt solution and a sodium carbonate solution with a concentration of 250 to 300 g/L are concurrently added to a continuous crystallization reactor for precipitation, the temperature of the reaction system is controlled at 85 to 95° C., the feeding rate of the sodium carbonate solution and the refined lithium salt solution is controlled to keep an instantaneous Li concentration of 3 to 7 g/L and a sodium carbonate concentration of 30 to 65 g/L when entering the reaction system; upon continuous feeding, lithium carbonate slurry is separated out continuously and is introduced into a thickener to obtain a lithium carbonate slurry with a solid content of 20 to 40%, the lithium carbonate slurry with the solid content of 20 to 40% is centrifuged to obtain wet fine lithium carbonate and a lithium precipitation mother liquor. The wet fine lithium carbonate is washed and then added to 60 to 80° C. pure water or evaporating condensate water at a solid-liquid ratio of 1:3 to 5 for stirring and washing for 10 to 30 min, and is subject to the solid-liquid separation, washing, drying, crushing and demagnetization to obtain the battery grade lithium carbonate. The lithium precipitation mother liquor can be returned for lithium adsorption and extraction.

The sodium carbonate solution used in the invention is a filtrate obtained by mixing sodium carbonate with one of pure water, water for stirring and washing and evaporating condensate water to obtain a solution with a concentration of 200 to 300 g/L, adding 1 to 3 kg sodium hydroxide per cubic meter of the solution for impurity removal for 10 to 30 min, and then filtering the solution. The sodium hydroxide solution or the lithium hydroxide solution can be used as alkali.

The battery grade lithium carbonate prepared by the invention can meet the requirements of YS/T 582-2013, the battery grade lithium carbonate industry standard. Specifically, the battery grade lithium carbonate contains ≥99.5% $Li_2CO_3$, ≤0.025% Na, ≤0.001% K, ≤0.008% Mg, ≤0.005% Ca, ≤0.001% Fe, ≤0.0003% Zn, ≤0.0003% Cu, Pb≤0.0003%, ≤0.003% Si, ≤0.001% Al, ≤0.0003 Mn, ≤0.001% Ni, ≤0.08% $SO_4^{2-}$, ≤0.003% $Cl^-$ and ≤3 ppm magnetic substance.

Figure 4:
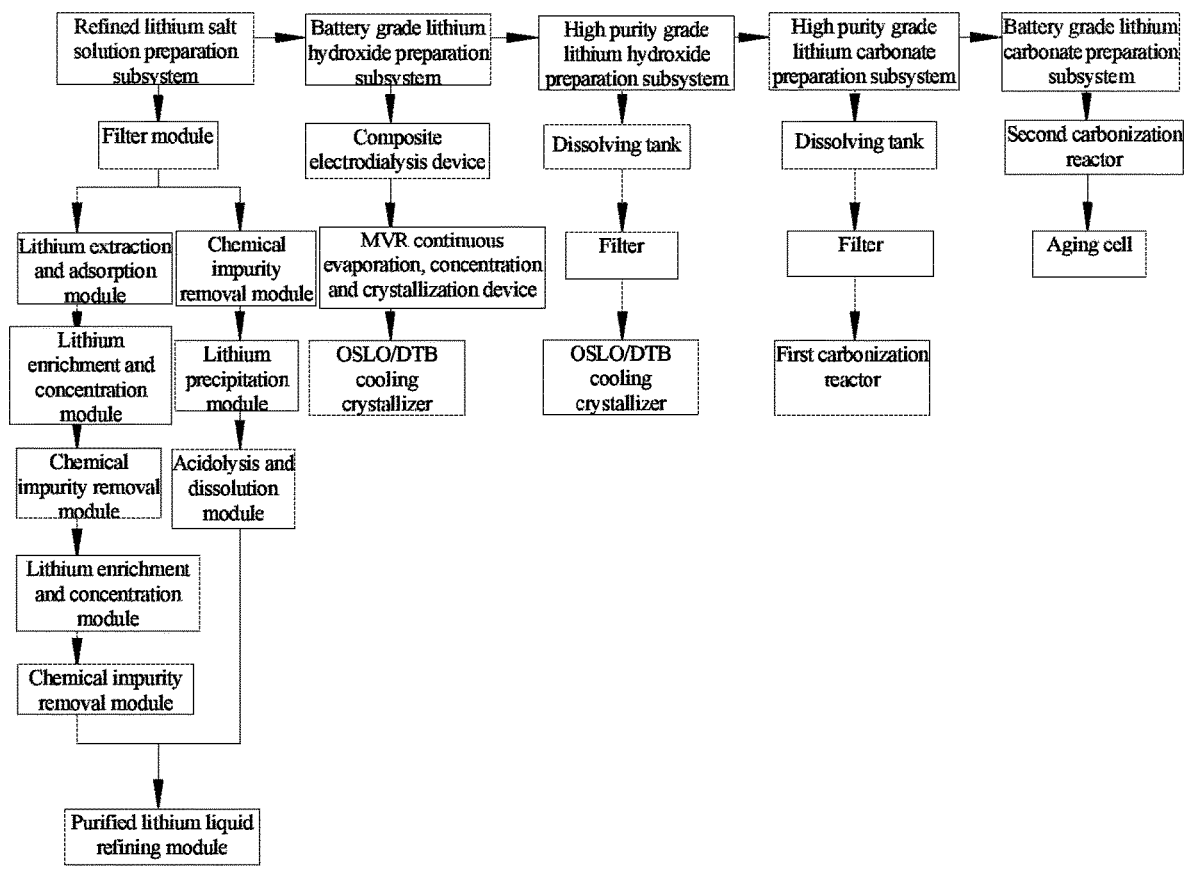
FIG. 4 shows a structural diagram of the system for preparing battery grade and high purity grade lithium hydroxide and lithium carbonate from high-impurity lithium sources according to an exemplary embodiment of the invention.

Meanwhile, the invention also provided a system for preparing battery grade and high purity grade lithium hydroxide and lithium carbonate from high-impurity lithium sources. FIG. 4 shows a structural diagram of a system for preparing battery grade and high purity grade lithium hydroxide and lithium carbonate from high-impurity lithium sources according to an exemplary embodiment of the invention. As shown in FIG. 4, the system comprises a refined lithium salt solution preparation subsystem, a battery grade lithium hydroxide preparation subsystem, a high purity grade lithium hydroxide preparation subsystem, a high purity grade lithium carbonate preparation subsystem and a battery grade lithium carbonate preparation subsystem arranged in turn according to production sequence.

The refined lithium salt solution preparation subsystem comprises a filter module, a lithium extraction and adsorption module, a lithium enrichment and concentration module, a chemical impurity removal module, a lithium precipitation reaction module, an acidolysis and dissolution module and a purified lithium salt solution refining module. These modules are combined in different manner for treatment of the high-impurity lithium sources according to the high-impurity lithium sources varying in lithium and impurity contents, and then the purified lithium salt solution refining module is used to obtain the refined lithium salt solution meeting the requirements for next step.

Specifically, the filter module consists of a first filter, a second filter and a third filter. The first filter is used for filtering the high-impurity lithium sources and can be one of a sand filter, a ceramic filter, a PA microporous tube filter and a PE microporous tube filter. The second filter is used for filtering a lithium-containing desorption solution or dissolved solution or rough filtration of a impurity-removed solution and can be one of a plate and frame filter, a candle filter, a ceramic filter, the PA microporous tube filter and the PE microporous tube filter; and the third filter is used for fine filtration of the impurity-removed solution and can be a microporous filter or the ceramic filter with a filtration accuracy of 0.1 to 0.2 μm.

The lithium extraction and adsorption module mainly comprises an adsorber and is used for selectively adsorbing lithium from the high-impurity lithium source solution; and the adsorber is packed with a lithium ion exchange adsorbent.

The lithium enrichment and concentration module is mainly used for concentrating and enriching the lithium-containing desorption solution obtained from the lithium extraction and adsorption module, in particular to a reverse osmosis and electrodialysis coupling device which comprises a three-stage disc tube reverse osmosis unit 1 coupled with a two-chamber electrodialysis unit 2 comprising a salt chamber and a concentrated salt chamber in coupling connection.

The chemical impurity removal module is used for removing impurities from the lithium-rich solution or the second high-impurity lithium source or the lithium salt solution, in particular to an impurity removal reactor.

The lithium precipitation reaction module is in particular a continuous crystallization reactor and used for preparing lithium carbonate slurry. The lithium precipitation reaction module comprises a reaction crystallizer with a draft tube and a thickener, and feeding inlets are arranged outside the draft tube; and the sodium carbonate solution and the lithium-containing impurity-removed solution/refined lithium salt solution are fed to the reaction crystallizer from the feeding inlets to mix with the solution in the reaction crystallizer of the system to obtain a mixture with a decreased concentration, and then the mixture is fed to the draft tube for reaction. In this way, reaction supersaturation degree and reactive crystallization rate of lithium carbonate are controlled.

The acidolysis and dissolution module is in particular a stirring vessel and is used for acidolysis of high-impurity lithium carbonate and wet fine lithium carbonate or dissolution of high-impurity lithium chloride, lithium sulfate, and lithium sulfate and lithium chloride compound salt.

The purified lithium salt solution refining module comprises a chelating resin ion exchange column and is used for refining a purified lithium salt solution. The chelating resin ion exchange column is packed with chelating resin. The chelating resin ion exchange column uses a triple-column (A/B/C) mode, the column A and column B operate in series, and the column C is for off-line regeneration, the column A serves as a primary column and the column B is a secondary column and serves as a secure column; when the column A is saturated by adsorption, the column B rises and serves as the primary column, and the column C is connected with the column B and serves as the secondary column; and the chelating resin ion exchange column always uses A→B, B→C and C→A serial operation mode to ensure an impurity-removed and refined lithium salt solution containing ≤1 ppm Ca, ≤1 ppm Mg, ≤1 ppm Fe, ≤1 ppm Mn, ≤1 ppm Zn and ≤1 ppm Al.

The battery grade lithium hydroxide preparation subsystem comprises a composite electrodialysis device, an MVR evaporation, concentration and crystallization device and a DTB cooling crystallizer or an OSLO cooling crystallizer connected in turn.

Specifically, the composite electrodialysis device is formed by coupling a three-chamber bipolar membrane electrodialysis unit 3, an alkali-resistant electrodialysis unit 4 and an acid-resistant electrodialysis unit 5, and can produce lithium hydroxide solution with a concentration of 1 to 4 mol/L.

The bipolar membrane electrodialysis unit 3 of the composite electrodialysis device comprises an anode chamber, a cathode chamber, and an alkali chamber 31, an acid chamber 32 and a salt chamber 33 separated by a membrane stack between the anode chamber and the cathode chamber; the anode chamber is connected with a positive electrode of a power supply, and the cathode chamber is connected with a negative electrode of the power supply; the membrane stack comprises bipolar membranes, cation exchange membranes and anion exchange membranes arranged alternately; the bipolar membrane is composed of a cation exchange membrane, an anion exchange membrane and a catalytic layer interposed therebetween; the alkali chamber is formed between the anion exchange membrane and the cation exchange membrane of the bipolar membrane, the acid chamber is formed between the cation exchange membrane and the anion exchange membrane of the bipolar membrane, and the salt chamber is formed between the anion exchange membrane and the cation exchange membrane; the bipolar membrane electrodialysis unit is externally connected with an electrode soaking solution tank, an alkali liquid tank, an acid liquid tank and a feed liquid tank by means of pipelines; and the electrode soaking solution tank is communicated with the anode chamber and the cathode chamber, the alkali liquid tank is communicated with the alkali chamber 31, the acid liquid tank is communicated with the acid chamber 32, and the feed liquid tank is communicated with the salt chamber 33.

During operation, the lithium hydroxide solution or pure water is introduced into the alkali chamber 31, the dilute acid or pure water is introduced into the acid chamber 32, the refined lithium salt solution obtained from the step C is introduced into the salt chamber 33, and an electrode soaking solution is introduced into the anode chamber and the cathode chamber concurrently. In the presence of the electric field, the lithium hydroxide solution is obtained from the alkali chamber 31, a dilute acid solution is obtained from the acid chamber 32, and a lithium salt solution is obtained from the salt chamber 33.

The alkali-resistant electrodialysis unit 4 of the composite electrodialysis device is a two-chamber electrodialyzer and comprises an anode chamber, a cathode chamber and an alkali chamber 41 and a concentrated alkali chamber 42 separated by a membrane stack between the anode chamber and the cathode chamber; the anode chamber is connected with a positive electrode of a power supply, and the cathode chamber is connected with a negative electrode of the power supply; the membrane stack comprises cation exchange membranes and anion exchange membranes arranged alternately; the alkali chamber 41 is formed between the anion exchange membrane and the cation exchange membrane, and the concentrated alkali chamber 42 is formed between the cation exchange membrane and the anion exchange membrane; and both the cation exchange membrane and the anion exchange membrane are alkali-resistant homogeneous membranes.

The lithium hydroxide solution obtained from the alkali chamber 31 of the bipolar membrane electrodialysis unit 3 is introduced into the alkali chamber 41 of the alkali-resistant electrodialysis unit 4; in the presence of the electric field, the lithium hydroxide solution with the LiOH concentration of 1 to 4 mol/L is obtained from the concentrated alkali chamber 42, and the lithium hydroxide solution with decreased concentration in the alkali chamber 41 is returned to the alkali chamber 31 of the bipolar membrane electrodialysis unit 3 for cyclic treatment.

The acid-resistant electrodialysis unit 5 of the composite electrodialysis device is a two-chamber electrodialyzer and comprises an anode chamber, a cathode chamber and an salt chamber 51 and a concentrated salt chamber 52 separated by a membrane stack between the anode chamber and the cathode chamber; the anode chamber is connected with a positive electrode of power supply, and the cathode chamber is connected with a negative electrode of the power supply; the membrane stack comprises cation exchange membranes and anion exchange membranes arranged alternately; the salt chamber 51 is formed between the anion exchange membrane and the cation exchange membrane, the concentrated salt chamber 52 is formed between the cation exchange membrane and the anion exchange membrane; and both the cation exchange membrane and the anion exchange membrane are acid-resistant homogeneous membranes.

The lithium salt solution obtained from the salt chamber 33 of the bipolar membrane electrodialysis unit 3 is introduced into the salt chamber 51; in the presence of a DC electric field, the concentrated lithium salt solution obtained from the concentrated salt chamber 52 is introduced into the salt chamber 33 of the bipolar membrane electrodialysis unit 3 with the refined lithium salt solution for cyclic treatment; and the lithium salt solution with decreased concentration in the salt chamber 51 is returned to the acid chamber 32 of the bipolar membrane electrodialysis unit 3 for cyclic treatment.

The MVR evaporation, concentration and crystallization device is used for evaporating, concentrating and separating out lithium hydroxide crystals from the lithium hydroxide solution to obtain magma containing lithium hydroxide crystalline particles; the DTB crystallizer or the OSLO crystallizer is used for continuous cooling crystallization of the lithium hydroxide magma and used in combination with the MVR evaporation, concentration and crystallization device to obtain lithium hydroxide having large particle size and uniform particle distribution and easy to be filtered, washed and dried to obtain high-purity products.

The high purity grade lithium hydroxide preparation subsystem comprises a dissolving tank, a filter and a DTB cooling crystallizer or an OLSO cooling crystallizer connected in turn. The filter can be one of a stainless steel microporous stick filter, a titanium microporous filter and a candle filter; the DTB crystallizer or the OSLO crystallizer is used for cooling crystallization of a filtrate from a saturated lithium hydroxide solution; the vacuum flash chamber is added to the backing stage of the DTB crystallizer or the OSLO crystallizer for pre-cooling crystallization to effectively reduce scaling of a heat exchanger of the crystallizer, and make the equipment run continuously and stably for a long time.

The high purity grade lithium carbonate preparation subsystem comprises a dissolving tank, a filter and a first carbonization reactor, and the lithium hydroxide solution obtained by dissolving and filtering reacts with carbon dioxide in the first carbonization reactor to obtain the high purity grade lithium carbonate.

The battery grade lithium carbonate preparation subsystem comprises a second carbonization reactor and an aging cell, and the second carbonization reactor is used for reaction and preparation of the battery grade lithium carbonate, and the aging cell is used for the aging reaction.

The first carbonization reactor and the second carbonization reactor of the invention are configured with a PLC control unit for controlling feeding rate respectively. The PLC control unit monitors conductivity of the reaction system in the reaction process, and the conductivity meter detects ion concentration of the solution in the reaction system. The conductivity and the lithium ion concentration of the solution have a linear correlation. The PLC controls the opening of the control valve according to the feedback of the conductivity meter to adjust the feeding rates of all raw materials, maintain the conductivity of the reaction system, realize automatic control and monitoring, ensure instantaneous concentration of the reaction, and further control the supersaturation degree and control reactive crystallization of lithium carbonate, so as to obtain the lithium carbonate particles with complete crystal morphology, and further ensure physiochemical properties of products.

In combination with the method of the invention and by means of the system formed by combination of the devices, the object of producing high purity grade and battery grade lithium hydroxide and lithium carbonate products from high-impurity lithium raw materials at low costs to meet the market demand can be realized.

In combination with the method, those skilled in the art can adjust and optimize the devices in the above system, as long as the composite preparation of high purity grade and battery grade lithium hydroxide and lithium carbonate can be achieved.

It should be understood that the embodiments detailed hereinbefore and the following examples are illustrative but not limit the scope of the present invention. Certain nonessential improvement and adjustment made by those skilled in the art according to the description of the present invention fall into the protection scope of the present invention. The specific parameters in the following examples are just one example within the applicable scope, that is, those skilled in the art can choose within proper range according to the description of the present invention, but not limit to the specific values and steps in the following examples.

The invention will be described in further detail in combination with specific examples for clear understanding of the object, technical solutions and effect of the invention.

Example 1

The high-impurity lithium source applied in this example is salt lake brine that belongs to the first high impurity lithium source. The raw brine has specifications shown in Table 1-1 below.

TABLE 1-1

Composition of the high-impurity lithium source applied in the example 1 (unit: g/L)

| $Li^+$ | $Ca^{2+}$ | $Mg^{2+}$ | B | $Na^+$ | $K^+$ | $SO_4^{-2}$ | $Cl^-$ | pH |
|---|---|---|---|---|---|---|---|---|
| 0.877 | 0.905 | 2.342 | 0.44 | 102.584 | 7.965 | 6.62 | 178.67 | 6.58 |

Step A: Preparation of a Refined Lithium Salt Solution
a. Treatment of the High-Impurity Lithium Source The raw brine shown in Table 1-1 was filtered by a ceramic filter to remove suspended solids and silt and obtain a filtrate. The filtrate was pumped into an adsorber containing an $H_2Mn_2O_4$ ion adsorbent for selective lithium adsorption. After the ion exchange adsorbent is saturated with lithium by adsorption, the brine was flushed with water 4 times volume of the adsorbent and the liquid therein was drained. Dilute sulfuric acid with a concentration of 0.3 mol/L and volume 2 times of the adsorbent was used for cyclic desorption for 0.5 h to obtain a desorbed lithium sulfate solution containing 1.2 g/L $Li^+$, 0.035 g/L $Na^+$, 0.0015 g/L $K^+$, 0.01 g/L $Ca^{2+}$, 0.0011 g/L $Mg^{2+}$ and 0.0013 g/L B and having a pH of 2.5.

The desorbed lithium sulfate solution with the pH adjusted to 8 by adding lithium hydroxide was filtered by a PA microporous tubular filter to obtain a filtrate. The filtrate was enriched and concentrated by a three-stage reverse osmosis and electrodialysis coupling enrichment and concentration device to obtain a lithium-rich solution and desalted production water; the lithium-rich solution contained 14 g/L $Li^+$, 0.02 g/L $Ca^{2+}$, 0.01 g/L $Mg^{2+}$, 0.001 g/L $Mn^{2+}$, 0.001 g/L $Fe^{2+}$ and 0.011 g/L B and had the pH of 8, and the desalted production water was reused for washing the adsorber. A sodium carbonate solution with a concentration of 250 g/L was added to the lithium-rich solution with sodium carbonate excess controlled at 0.3 g/L to remove impurities and react with the lithium-rich solution at 60° C. for 30 min and react at the temperature for 30 min after the pH of the lithium-rich solution was adjusted to 11 with lithium hydroxide, and the lithium-rich solution was filtered by a microporous filter with a filter precision of 0.2 μm to obtain a purified lithium salt solution containing 13.5 g/L $Li^+$, ≤10 ppm $Ca^{2+}$, ≤1 ppm $Mg^{2+}$, ≤5 ppm $Mn^{2+}$, ≤1 ppm $Fe^{3+}$, 91.58 g/L $SO_4^{2-}$, 1.1 g/L $Cl^-$, 0.01 g/L B and having the pH of 11.

b. Refining of the Purified Lithium Salt Solution

To the obtained purified lithium salt solution, sulfuric acid was added to adjust pH thereof to 8, and iminodiacetic acid chelating resin was added to further remove impurities to obtain a refined lithium salt solution containing 13.5 g/L $Li^+$, ≤1 ppm $Ca^{2+}$, ≤1 ppm $Mg^{2+}$, ≤1 ppm $Fe^{2+}$, ≤1 ppm $Mn^{2+}$, ≤1 ppm $Zn^{2+}$, ≤1 ppm $Al^{3+}$, 91.58 g/L $SO_4^{2-}$, 1.10 g/L $Cl^-$, ≤5 ppm B and having a pH of 8.

Step B: Preparation of Battery Grade Lithium Hydroxide
a. Composite Electrodialysis Treatment The refined lithium liquid was subject to composite electrodialysis treatment to obtain a lithium hydroxide solution with a LiOH concentration of 1.5 mol/L and a dilute acid solution with an $H^+$ concentration of 0.5 mol/L. The lithium hydroxide solution in an alkali chamber of a bipolar membrane electrodialysis unit and an alkali chamber of an alkali-resistant electrodialysis unit had a LiOH concentration of 0.5 mol/L, the lithium salt solution in a salt chamber of the bipolar membrane electrodialysis unit and a concentrated salt chamber of an acid-resistant electrodialysis unit had a $Li^+$ concentration of 10 g/L, the lithium salt solution discharged from a salt chamber of the acid-resistant electrodialysis unit with decreased concentration had a $Li^+$ concentration of 1.6 g/L, a dilute acid solution discharged from an acid chamber of the bipolar membrane electrodialysis unit had an $H^+$ concentration of 0.5 mol/L, and a lithium salt solution discharged from the salt chamber of the bipolar membrane electrodialysis unit had a $Li^+$ concentration of 4 g/L. A lithium hydroxide solution with a concentration of 1.0 mol/L was used as an electrode soaking solution in the bipolar membrane electrodialysis unit and the alkali-resistant electrodialysis unit, and a lithium sulfate solution with a $Li^+$ concentration of 0.8 mol/L was used as an electrode soaking solution of the acid-resistant electrodialysis unit.

b. Concentration and Crystallization

The lithium hydroxide solution with the concentration of 1.5 mol/L was evaporated, concentrated and crystallized by an MVR evaporation, concentration and crystallization device with an evaporation chamber controlled at 75° C. to separate out crystals with crystal growth and retention time lasting 4 h to obtain lithium hydroxide magma, the lithium hydroxide magma from the MVR evaporation, concentration and crystallization device was fed to an OLSO crystallizer for continuous cooling crystallization with crystallization temperature controlled at 35° C. and crystal growth and retention time lasting 3 h to obtain wet fine lithium hydroxide upon solid-liquid separation and washing. The wet fine lithium hydroxide was dried, crushed and demagnetized to obtain battery grade lithium hydroxide. The MVR evaporation, concentration and crystallization device discharged unacceptable high-impurity mother liquor for preparation of subsequent battery grade lithium carbonate. The obtained battery grade lithium hydroxide meets requirements for LiOH.H₂O-D1 in GB/T8766-2013. See Table 1-2 for the mass of the battery grade lithium hydroxide.

TABLE 1-2

Mass of the battery grade lithium hydroxide
obtained in the Example 1 (unit: %)

| Chemical composition (mass fraction) | | $LiOH \cdot H_2O$-D1 | Example 1 |
|---|---|---|---|
| | $LiOH \cdot H_2O$, ≥ | 98.00 | ≥98.5 |
| Impurity content, ≤ | Fe | 0.0008 | 0.0001 |
| | K | 0.0030 | 0.0005 |
| | Na | 0.0030 | 0.0010 |
| | Ca | 0.0050 | 0.0005 |
| | Cu | 0.0050 | 0.0001 |
| | Mg | 0.0050 | 0.0001 |
| | Mn | 0.0050 | 0.0001 |
| | Si | 0.0050 | 0.0005 |
| | $CO_3^{2-}$ | 0.7000 | 0.35 |
| | $Cl^-$ | 0.0020 | 0.0020 |
| | $SO_4^{2-}$ | 0.0100 | 0.0030 |
| | Acid insoluble substance | 0.0050 | ≤0.0050 |

Step C: Preparation of High Purity Grade Lithium Hydroxide

The obtained wet fine lithium hydroxide was heated and dissolved in pure water to obtain a 95° C. saturated lithium hydroxide solution. The saturated lithium hydroxide solution was filtered to obtain a filtrate, and the filtrate was fed to a vacuum flash chamber with vacuum degree controlled at −0.074 MPa to pre-cool to 65° C. and then fed to the OSLO crystallizer for cooling crystallization with cooling crystallization temperature controlled at 40° C. and crystal growth and retention time lasting 4 h to obtain a magma, and solid-to-liquid ratio of the magma was 12%. The magma was subject to solid-liquid separation and pure water washing to obtain wet high purity grade lithium hydroxide and a crystallized mother liquor. The wet high purity grade lithium hydroxide was dried and screened to obtain high purity grade lithium hydroxide with a purity higher than 99.99%.

Step D: Preparation of High Purity Grade Lithium Carbonate

The wet high purity grade lithium hydroxide obtained from the step 3 was dissolved in pure water to form a lithium hydroxide solution with a conductivity of 380 ms/cm. The lithium hydroxide solution was filtered by a candle filter to obtain a filtrate, the filtrate was fed to a first carbonization reactor for stirring at a controlled speed of 60 rmp. While stirring, carbon dioxide was introduced into the reactor for carbonization reaction, and flow rate of carbon dioxide was controlled so that the conductivity of the reaction system decreased at a rate of 4 ms/cm per minute. A corresponding control valve was turned off automatically when the conductivity decreased to 150 ms/cm to stop introduction of carbon dioxide. After continuous stirring for 30 min reaction to obtain a liquid, the liquid was subject to solid-liquid separation, pure water washing, drying, screening and packaging to obtain high purity grade lithium carbonate.

The acceptable carbonized mother liquor obtained by separation was returned for dissolving the wet fine lithium hydroxide, and the unacceptable carbonized mother liquor proceeded to the next preparation process of battery grade lithium carbonate.

Mass of the high purity grade lithium carbonate obtained in the example is shown in Table 1-3.

TABLE 1-3

Mass of the high purity grade lithium carbonate
obtained in the example 1 (unit: %)

| Item | Example 1 |
|---|---|
| $Li_2CO_3$ | ≥99.995 |
| K | <0.0002 |
| Na | <0.0005 |
| Ca | <0.0005 |
| Mg | <0.0001 |
| Mn | <0.0001 |
| Fe | <0.0001 |
| As | <0.0001 |
| Ag | <0.0001 |
| Al | <0.0001 |
| Ba | <0.0001 |
| Pb | <0.0001 |
| Cu | <0.0001 |
| Cr | <0.0001 |
| Cd | <0.0001 |
| Co | <0.0001 |
| Ni | <0.0001 |
| Zn | <0.0001 |
| Si | <0.0003 |
| $Cl^-$ | <0.001 |
| $SO_4^{2-}$ | <0.003 |

Step E: Preparation of Battery Grade Lithium Carbonate

Pure water was fed to a second carbonization reactor as a base solution and was heated to 60° C. Battery grade lithium carbonate seed crystals with a particle size range of 30 μm were added to the base solution at a volume concentration of 3.5‰. A PLC system was applied to control feeding rate of carbon dioxide and an unacceptable lithium hydroxide solution composed of the unacceptable high-impurity mother liquor obtained from the step B and the unacceptable carbonized mother liquor obtained by solid-liquid separation in the step D. The reaction system was maintained at a conductivity of 90 ms/cm and a reaction temperature of 60° C. Carbon dioxide and the lithium hydroxide solution were introduced continuously to separate out lithium carbonate slurry continuously. The lithium carbonate slurry was added to an aging cell for continuous reaction for 60 min. The reacted slurry was subject to solid-liquid separation to obtain a carbonized mother liquor and wet battery grade lithium carbonate. The wet battery grade lithium carbonate was washed, dried, crushed and deferrized to obtain battery grade lithium carbonate. The battery grade lithium carbonate obtained in the example meets requirements in GB/T8766-2013 and mass thereof is shown in Table 1-4.

TABLE 1-4

Mass of the battery grade lithium carbonate
obtained in the example 1 (unit: %)

| | Item | Industry standard | Example 1 |
|---|---|---|---|
| | $Li_2CO_3$ content | ☐99.5 | 99.6 |
| Impurity content | Na | 0.025 | 0.006 |
| | Mg | 0.008 | 0.0010 |
| | Ca | 0.005 | 0.0010 |
| | K | 0.001 | 0.0005 |
| | Fe | 0.001 | 0.0003 |
| | Zn | 0.0003 | 0.0001 |
| | Cu | 0.0003 | 0.0001 |
| | Pb | 0.0003 | 0.0002 |
| | Si | 0.003 | 0.0005 |
| | Al | 0.001 | 0.0005 |

TABLE 1-4-continued

Mass of the battery grade lithium carbonate
obtained in the example 1 (unit: %)

| Item | Industry standard | Example 1 |
| --- | --- | --- |
| Mn | 0.0003 | 0.0001 |
| Ni | 0.001 | 0.0002 |
| $SO_4^{2-}$ | 0.08 | 0.0700 |
| $Cl^-$ | 0.003 | 0.002 |
| Magnetic substance | 0.0003 | 0.0001 |

Example 2

A high-impurity lithium source used in the example has the specifications shown in Table 2-1 and belongs to a first high-impurity lithium source.

TABLE 2-1

Composition of the high-impurity lithium
source used in the example 2 (unit: g/L)

| $Li^+$ | $CO_3^{-2}$ | $Na^+$ | $SO_4^{-2}$ | $Cl^-$ | pH |
| --- | --- | --- | --- | --- | --- |
| 1.73 | 15.3 | 96.13 | 3.67 | 132.50 | 12.15 |

Step A: Preparation of a Refined Lithium Salt Solution
a Treatment of the High-Impurity Lithium Source Sodium hydroxide was used to adjust pH of the high-impurity lithium source shown in Table 2-1 to 8, then the high-impurity lithium source was filtered by a PE microporous tubular filter to obtain a filtrate. The filtrate was pumped into an adsorber containing an $H_2TiO_3$ ion adsorbent for selective lithium adsorption. After the ion exchange adsorbent was saturated with lithium by adsorption, brine therein was washed with pure water 3 times volume of the adsorbent and the liquid therein was drained. The high-impurity lithium source was cyclically desorbed with dilute sulfuric acid with a concentration of 0.5 mol/L and a volume equal that of the adsorbent for 1 h to obtain a desorbed lithium sulfate solution containing 1.5 g/L $Li^+$, 0.05 g/L $Na^+$, 0.001 g/L $K^+$, 0.001 g/L $Ca^{2+}$, 0.001 g/L $Mg^{2+}$ and 0.0001 g/L B and having a pH of 2. The desorbed lithium sulfate solution with pH value adjusted to 8.9 by adding lithium hydroxide was filtered by a PE microporous tubular filter to obtain a filtrate. The filtrate was enriched and concentrated by a three-stage reverse osmosis and electrodialysis coupling enrichment and concentration device to obtain a lithium-rich solution and desalted production water; and the lithium-rich solution contained 17 g/L $Li^+$, 0.012 g/L $Ca^{2+}$, 0.012 g/L $Mg^{2+}$, 0.001 g/L $Mn^{2+}$, 0.001 g/L $Fe^{3+}$ and 0.001 g/L B and had a pH of 8.9. A sodium carbonate solution with a concentration of 300 g/L was added to the lithium-rich solution with sodium carbonate excess controlled at 0.3 g/L to remove calcium and react with the lithium-rich solution at 70° C. for 30 min and react at the temperature for 30 min after the pH of the lithium-rich solution was adjusted to 11 with lithium hydroxide, and the lithium-rich solution was filtered by a microporous filter with a filter precision of 0.2 μm to obtain a purified lithium salt solution containing 17 g/L $Li^+$, 10 ppm $Ca^{2+}$, 1 ppm $Mg^{2+}$, 5 ppm $Mn^{2+}$, 1 ppm $Fe^{3+}$, 0 to 200 g/L $SO_4^{2-}$, 120 g/L $Cl^-$ and 0.001 g/L B and having a pH of 11.

b Refining of the Purified Lithium Salt Solution

The obtained purified lithium salt solution with pH value adjusted to 9 by adding dilute sulfuric acid was subject to deep impurity removal by iminodiacetic acid chelating resin to obtain a refined lithium salt solution containing 17 g/L $Li^+$, 1 ppm $Ca^{2+}$, 1 ppm $Mg^{2+}$, 1 ppm $Fe^{3+}$, 1 ppm $Mn^{2+}$, 1 ppm $Zn^{2+}$, 1 ppm $Al^{2+}$, 120 g/L $SO_4^{2-}$, 0.3 g/L $Cl^-$ and 5 ppm B and having a pH of 9.

Step B: Preparation of Battery Grade Lithium Hydroxide
a Composite Electrodialysis Treatment The obtained refined lithium salt solution was subject to composite electrodialysis treatment to obtain a lithium hydroxide solution with a LiOH concentration of 3.0 mol/L and a dilute acid solution with an $H^+$ concentration of 1.5 mol/L. The lithium hydroxide solution in an alkali chamber of a bipolar membrane electrodialysis unit and an alkali chamber of an alkali-resistant electrodialysis unit had a LiOH concentration of 1.5 mol/L, the lithium salt solution in a salt chamber of the bipolar membrane electrodialysis unit and a concentrated salt chamber of an acid-resistant electrodialysis unit had a $Li^+$ concentration of 15 g/L, the lithium salt solution discharged from a salt chamber of the acid-resistant electrodialysis unit with decreased concentration had a $Li^+$ concentration of 2 g/L, the dilute acid solution discharged from an acid chamber of the bipolar membrane electrodialysis unit had an $H^+$ concentration of 1.5 mol/L, and the lithium salt solution discharged from the salt chamber of the bipolar membrane electrodialysis unit had a $Li^+$ concentration of 5 g/L. A lithium hydroxide solution with a concentration of 1.2 mol/L was used as an electrode soaking solution of the bipolar membrane electrodialysis unit and the alkali-resistant electrodialysis unit, and a lithium sulfate solution with a $Li^+$ concentration of 1.0 mol/L was used as an electrode soaking solution of the acid-resistant electrodialysis unit.

b Concentration and Crystallization

The lithium hydroxide solution with the concentration of 3.0 mol/L was evaporated, concentrated and crystallized by an MVR evaporation, concentration and crystallization device with an evaporation chamber controlled at 80° C. to separate out crystals with crystal growth and retention time lasting 3.5 h to obtain lithium hydroxide magma. The lithium hydroxide magma discharged from the MVR evaporation, concentration and crystallization device was fed to an DTB crystallizer for continuous cooling crystallization with crystallization temperature controlled at 35° C. and crystal growth and retention time lasting 4 h to obtain wet fine lithium hydroxide upon solid-liquid separation and washing. The wet fine lithium hydroxide was dried, crushed and demagnetized to obtain battery grade lithium hydroxide. The MVR evaporation, concentration and crystallization device discharged unacceptable high-impurity mother liquor for preparation of subsequent battery grade lithium carbonate. The obtained battery grade lithium hydroxide meets requirements for $LiOH \cdot H_2O$-D1 in GB/T8766-2013. See Table 2-2 for the mass of the battery grade lithium hydroxide.

TABLE 2-2

Mass of the battery grade lithium hydroxide
obtained in the example 2 (unit: %)

| Chemical composition (mass fraction) | | $LiOH \cdot H_2O$-D1 | Example 2 |
| --- | --- | --- | --- |
| | $LiOH \cdot H_2O$, ≥ | 98.00 | ≥99.0 |
| Impurity | Fe | 0.0008 | 0.0001 |
| content, ≤ | K | 0.0030 | 0.0001 |
| | Na | 0.0030 | 0.0003 |
| | Ca | 0.0050 | 0.0003 |
| | Cu | 0.0050 | 0.0001 |
| | Mg | 0.0050 | 0.0001 |

TABLE 2-2-continued

Mass of the battery grade lithium hydroxide
obtained in the example 2 (unit: %)

| Chemical composition (mass fraction) | LiOH•H$_2$O-D1 | Example 2 |
|---|---|---|
| Mn | 0.0050 | 0.0001 |
| Si | 0.0050 | 0.0005 |
| CO$_3^{2-}$ | 0.7000 | 0.25 |
| Cl$^-$ | 0.0020 | 0.0020 |
| SO$_4^{2-}$ | 0.0100 | 0.0080 |
| Acid insoluble substance | 0.0050 | ≤0.0050 |

Step C: Preparation of High Purity Grade Lithium Hydroxide

The obtained wet fine lithium hydroxide was heated and dissolved in evaporating condensate water to obtain a 90° C. saturated solution. The saturated solution was filtered to obtain a filtrate, and the filtrate was fed to a vacuum flash chamber with vacuum degree controlled at −0.084 MPa for pre-cooling crystallization. The condensate water produced by flash evaporation was returned to the system. The lithium hydroxide solution was pre-cooled to 70° C. in the flash chamber and fed to the DTB crystallizer for cooling crystallization with cooling crystallization temperature controlled at 40° C. and crystal growth and retention time lasting 4 h to obtain magma, and solid-to-liquid ratio of the magma was 17%. The obtained lithium hydroxide magma was subject to solid-liquid separation and pure water washing to obtain wet high purity grade lithium hydroxide and a crystallized mother liquor. The wet high purity grade lithium hydroxide was dried and screened to obtain high purity grade lithium hydroxide with purity higher than 99.99%.

Step D: Preparation of High Purity Grade Lithium Carbonate

The wet high purity grade lithium hydroxide was dissolved in the acceptable carbonized mother liquor obtained from the step to form a lithium hydroxide solution with a conductivity of 300 ms/cm. The lithium hydroxide solution was filtered by a bag filter to obtain a filtrate, and the filtrate was fed to a first carbonization reactor for stirring at a controlled speed of 40 rmp. While stirring, carbon dioxide was introduced into the reactor for carbonization reaction and flow rate of carbon dioxide was controlled so that the conductivity of the reaction system decreased at a rate of 7 ms/cm per minute. A corresponding control valve was turned off automatically when the conductivity decreased to 150 ms/cm to stop introduction of carbon dioxide. After continuous stirring for 20 min reaction to obtain a liquid, the liquid was subject to solid-liquid separation, pure water washing, drying, screening and packaging to obtain high purity grade lithium carbonate.

The acceptable carbonized mother liquor obtained by separation was returned for dissolving the wet fine lithium hydroxide, and the unacceptable carbonized mother liquor proceeded to the next preparation process of battery grade lithium carbonate.

The mass of the high purity grade lithium carbonate obtained in the example is shown in Table 2-3.

TABLE 2-3

Mass of the high purity grade lithium carbonate
obtained in the example 2 (unit: %)

| Item | Example 2 |
|---|---|
| Li$_2$CO$_3$ | ≥99.995 |
| K | <0.0001 |
| Na | <0.0001 |
| Ca | <0.0003 |
| Mg | <0.0001 |
| Mn | <0.0001 |
| Fe | <0.0001 |
| As | <0.0001 |
| Ag | <0.0001 |
| Al | <0.0001 |
| Ba | <0.0001 |
| Pb | <0.0001 |
| Cu | <0.0001 |
| Cr | <0.0001 |
| Cd | <0.0001 |
| Co | <0.0001 |
| Ni | <0.0001 |
| Zn | <0.0001 |
| Si | <0.0003 |
| Cl$^-$ | <0.001 |
| SO$_4^{2-}$ | <0.003 |

Step E: Preparation of Battery Grade Lithium Carbonate

The unacceptable carbonized mother liquor obtained by solid-liquid separation in the last step was fed to a second carbonization reactor as a base solution and was heated to 80° C. Battery grade lithium carbonate seed crystals with a particle size range of 40 μm were added to the base solution at a volume concentration of 1.5‰. A PLC system was used to control feeding rate of carbon dioxide and an unacceptable lithium hydroxide solution composed of the unacceptable high-impurity mother liquor from the step B and the unacceptable carbonized mother liquor obtained by solid-liquid separation in the step D. The reaction system was maintained at a conductivity of 70 ms/cm and a reaction temperature of 80° C. Carbon dioxide and the lithium hydroxide solution were introduced continuously to separate out lithium carbonate slurry continuously. The lithium carbonate slurry was added to an aging cell for continuous reaction for 30 min. The reacted slurry was subject to solid-liquid separation to obtain a carbonized mother liquor and wet battery grade lithium carbonate. The wet battery grade lithium carbonate was washed, dried, crushed and deferrized to obtain battery grade lithium carbonate. The battery grade lithium carbonate obtained in the example meets requirements in GB/T8766-2013 and mass thereof is shown in Table 2-4.

TABLE 2-4

Mass of the battery grade lithium carbonate
obtained in the example 2 (unit: %)

| | Item | Industry standard | Example 2 |
|---|---|---|---|
| | Li$_2$CO$_3$ content | ☐99.5 | 99.6 |
| Impurity | Na | 0.025 | 0.0020 |
| content | Mg | 0.008 | 0.0005 |
| | Ca | 0.005 | 0.0010 |
| | K | 0.001 | 0.0005 |
| | Fe | 0.001 | 0.0003 |
| | Zn | 0.0003 | 0.0001 |
| | Cu | 0.0003 | 0.0001 |
| | Pb | 0.0003 | 0.0002 |
| | Si | 0.003 | 0.0005 |
| | Al | 0.001 | 0.0005 |
| | Mn | 0.0003 | 0.0001 |
| | Ni | 0.001 | 0.0002 |
| | SO$_4^{2-}$ | 0.08 | 0.0500 |
| | Cl$^-$ | 0.003 | 0.002 |
| | Magnetic substance | 0.0003 | 0.0001 |

Example 3

A high-impurity lithium source used in the example has the specifications shown in Table 3-1 and belongs to a first high-impurity lithium source.

TABLE 3-1

Composition of the high-impurity lithium source used in the example 3 (unit: g/L)

| $Li^+$ | $Ca^{2+}$ | $Mg^{2+}$ | B | $Na^+$ | $K^+$ | $SO_4^{-2}$ | $Cl^-$ | pH |
|---|---|---|---|---|---|---|---|---|
| 0.585 | 5.01 | 19.23 | 19.27 | 35.1 | 5.68 | 173.894 | 2.11 | 8.26 |

Step A: Preparation of a Relined Lithium Salt Solution
a Treatment of the High-Impurity Lithium Source The high-impurity solid lithium salt shown in Table 2-1 with pH value adjusted to 6.5 by adding hydrochloric acid was filtered by a PE microporous tubular filter to obtain a filtrate. The filtrate was pumped into an adsorber containing an $H_2Mn_2O_4$ ion adsorbent for selective lithium adsorption. After the ion exchange adsorbent was saturated with lithium by adsorption, brine therein was washed with water 4 times volume of the adsorbent and the liquid therein was drained. The high-impurity lithium source was cyclically desorbed with dilute hydrochloric acid with a concentration of 0.4 mol/L and a volume 1.5 times that of the adsorbent for 0.5 h to obtain a desorbed lithium chloride solution containing 2.5 g/L $Li^+$, 0.05 g/L $Na^+$, 0.005 g/L $K^+$, 0.008 g/L $Ca^{2+}$, 0.005 g/L $Mg^{2+}$: and 0.005 g/L B and having a pH of 2. The desorbed lithium chloride solution with pH value adjusted to 9 by adding sodium hydroxide was filtered by a ceramic filter to obtain a filtrate. The filtrate was enriched and concentrated by a three-stage reverse osmosis and electrodialysis coupling enrichment and concentration device to obtain a lithium-rich solution and desalted production water; and the lithium-rich solution contained 20 g/L $Li^+$, 0.016 g/L $Ca^{2+}$, 0.01 g/L $Mg^{2+}$, 0.002 g/L $Mn^{2+}$, 0.001 g/L $Fe^{2+}$ and 0.01 g/L B and had a pH of 9. The desalted production water was recycled for rinsing the adsorber. A sodium carbonate solution with a concentration of 280 g/L was added to the lithium-rich solution with sodium carbonate excess controlled at 0.35 g/L to remove calcium and react with the lithium-rich solution at 50° C. for 30 min and react at the temperature for 30 min after the pH of the lithium-rich solution was adjusted to 10.5 with lithium hydroxide, and the lithium-rich solution was filtered by a microporous filter with a filter precision of 0.1 μm to obtain a purified lithium salt solution containing 20 g/L $Li^+$, 10 ppm $Ca^{2+}$, 1 ppm $Mg^{2+}$, 5 ppm $Mn^{2+}$, 1 ppm $Fe^{3+}$, 0.9 g/L $SO_4^{2-}$, 103 g/L $Cl^-$ and 0.001 g/L B and having a pH of 10.5.

b Refining of the Purified Lithium Salt Solution

The obtained purified lithium salt solution with pH value adjusted to 8 by adding hydrochloric acid was subject to deep impurity removal by iminodiacetic acid chelating resin to obtain a refined lithium salt solution containing 20 g/L $Li^+$, 1 ppm $Ca^{2+}$, 1 ppm $Mg^{2+}$, 1 ppm $Fe^{3+}$, 1 ppm $Mn^{2+}$, 1 ppm $Zn^{2+}$, 1 ppm $Al^{3+}$, 0.85 g/L $SO_4^{2-}$, 103 g/L $Cl^-$ and 5 ppm B and having a pH of 8.

Step B: Preparation of Battery Grade Lithium Hydroxide
a Composite Electrodialysis Treatment The obtained refined lithium salt solution was subject to composite electrodialysis treatment to obtain a lithium hydroxide solution with a LiOH concentration of 3.5 mol/L and a dilute acid solution with an $H^+$ concentration of 2 mol/L. The lithium hydroxide solution in an alkali chamber of a bipolar membrane electrodialysis unit and an alkali chamber of an alkali-resistant electrodialysis unit had a LiOH concentration of 2 mol/L, the lithium salt solution in a salt chamber of the bipolar membrane electrodialysis unit and a concentrated salt chamber of an acid-resistant electrodialysis unit had a $Li^+$ concentration of 17 g/L, the lithium salt solution discharged from a salt chamber of the acid-resistant electrodialysis unit with decreased concentration had a $Li^+$ concentration of 3 g/L, the dilute acid solution discharged from an acid chamber of the bipolar membrane electrodialysis unit had an $H^+$ concentration of 2 mol/L, and the lithium salt solution discharged from the salt chamber of the bipolar membrane electrodialysis unit had a $Li^+$ concentration of 5 g/L. A lithium hydroxide solution with a concentration of 1.0 mol/L was used as an electrode soaking solution of the bipolar membrane electrodialysis unit and the alkali-resistant electrodialysis unit, and a corresponding lithium salt solution with a $Li^+$ concentration of 1.0 mol/L was used as an electrode soaking solution of the acid-resistant electrodialysis unit.

b Concentration and Crystallization

The lithium hydroxide solution with the concentration of 3.5 mol/L was evaporated, concentrated and crystallized by an MVR evaporation, concentration and crystallization device with an evaporation chamber controlled at 80° C. to separate out crystals with crystal growth and retention time lasting 3 h to obtain lithium hydroxide magma. The lithium hydroxide magma discharged from the MVR evaporation, concentration and crystallization device was fed to an OLSO crystallizer for continuous cooling crystallization with crystallization temperature controlled at 40° C. and crystal growth and retention time lasting 4 h to obtain wet fine lithium hydroxide upon solid-liquid separation and washing. The wet fine lithium hydroxide was dried, crushed and demagnetized to obtain battery grade lithium hydroxide. The MVR evaporation, concentration and crystallization device discharged unacceptable high-impurity mother liquor for preparation of subsequent battery grade lithium carbonate. The obtained battery grade lithium hydroxide meets requirements for $LiOH.H_2O$-D1 in GB/T8766-2013. See Table 3-2 for the mass of the battery grade lithium hydroxide.

TABLE 3-2

Mass of the battery grade lithium hydroxide obtained in the example 3 (unit: %)

| Chemical composition (mass fraction) | | $LiOH•H_2O$-D1 | Example 3 |
|---|---|---|---|
| | $LiOH•H_2O$, ≥ | 98.00 | ≥98.5 |
| Impurity content, ≤ | Fe | 0.0008 | 0.0001 |
| | K | 0.0030 | 0.0002 |
| | Na | 0.0030 | 0.0005 |
| | Ca | 0.0050 | 0.0005 |
| | Cu | 0.0050 | 0.0001 |
| | Mg | 0.0050 | 0.0001 |
| | Mn | 0.0050 | 0.0001 |
| | Si | 0.0050 | 0.0005 |
| | $CO_3^{2-}$ | 0.7000 | 0.12 |
| | $Cl^-$ | 0.0020 | 0.0020 |
| | $SO_4^{2-}$ | 0.0100 | 0.0050 |
| | Acid insoluble substance | 0.0050 | ≤0.0050 |

Step C: Preparation of High Purity Grade Lithium Hydroxide

The wet fine lithium hydroxide obtained in the step 2 was heated and dissolved in the crystallized mother liquor obtained in the step to form a 95° C. saturated solution. The saturated solution was filtered to obtain a filtrate, and the filtrate was fed to a vacuum flash chamber with vacuum degree controlled at −0.08 MPa for crystallization. The condensate water produced by flash evaporation was returned to the system. The lithium hydroxide solution was pre-cooled to 70° C. in the flash chamber and fed to the OSLO crystallizer for cooling crystallization with cooling crystallization temperature controlled at 33° C. and crystal growth and retention time lasting 5 h to obtain lithium hydroxide magma, and solid-to-liquid ratio of the magma was 12%. The obtained lithium hydroxide magma was subject to solid-liquid separation and pure water washing to obtain wet high purity grade lithium hydroxide and a crystallized mother liquor. The wet high purity grade lithium hydroxide was dried and screened to obtain high purity grade lithium hydroxide with purity higher than 99.99%.

Step D: Preparation of High Purity Grade Lithium Carbonate

The obtained wet high purity grade lithium hydroxide was dissolved in pure water to form a lithium hydroxide solution with a conductivity of 330 ms/cm. The lithium hydroxide solution was filtered by a bag filter to obtain a filtrate, and the filtrate was fed to a first carbonization reactor for stirring at a controlled speed of 60 rmp. While stirring, carbon dioxide was introduced into the reactor for carbonization reaction and flow rate of carbon dioxide was controlled so that the conductivity of the reaction system decrease at a rate of 3 ms/cm per minute. A corresponding control valve was turned off automatically when the conductivity decreased to 120 ms/cm to stop introduction of carbon dioxide. After continuous stirring for 20 min reaction to obtain a liquid, the liquid was subject to solid-liquid separation, pure water washing, drying, screening and packaging to obtain high purity grade lithium carbonate.

The acceptable carbonized mother liquor obtained by separation was returned for dissolving the wet fine lithium hydroxide, and the unacceptable carbonized mother liquor proceeded to the next preparation process of battery grade lithium carbonate.

The mass of the high purity grade lithium carbonate obtained in the example is shown in Table 3-3.

TABLE 3-3

Mass of the high purity grade lithium carbonate obtained in the example 3 (unit: %)

| Item | Example 3 |
| --- | --- |
| $Li_2CO_3$ | ≥99.995 |
| K | <0.0001 |
| Na | <0.0001 |
| Ca | <0.0002 |
| Mg | <0.0001 |
| Mn | <0.0001 |
| Fe | <0.0001 |
| As | <0.0001 |
| Ag | <0.0001 |
| Al | <0.0001 |
| Ba | <0.0001 |
| Pb | <0.0001 |
| Cu | <0.0001 |
| Cr | <0.0001 |
| Cd | <0.0001 |
| Co | <0.0001 |
| Ni | <0.0001 |
| Zn | <0.0001 |
| Si | <0.0003 |
| $Cl^-$ | <0.001 |
| $SO_4^{2-}$ | <0.003 |

Step E: Preparation of Battery Grade Lithium Carbonate

The carbonized mother liquor obtained by solid-liquid separation in the step was fed to a second carbonization reactor as a base solution and was heated to 60° C. Battery grade lithium carbonate seed crystals with a particle size range of 30 μm were added to the base solution at a volume concentration of 2.5‰. A PLC system was used to control feeding rate of carbon dioxide and an unacceptable lithium hydroxide solution composed of the unacceptable high-impurity mother liquor from the step B and the unacceptable carbonized mother liquor obtained by solid-liquid separation in the step D. The reaction system was maintained at a conductivity of 90 ms/cm and a reaction temperature of 60° C. Carbon dioxide and the lithium hydroxide solution were introduced continuously to separate out lithium carbonate slurry continuously. The lithium carbonate slurry was added to an aging cell for continuous reaction for 60 min. The reacted slurry was subject to solid-liquid separation to obtain a carbonized mother liquor and wet battery grade lithium carbonate. The wet battery grade lithium carbonate was washed, dried, crushed and deferrized to obtain battery grade lithium carbonate. The battery grade lithium carbonate obtained in the example meets requirements in GB/T8766-2013 and mass thereof is shown in Table 3-4.

TABLE 3-4

Mass of the battery grade lithium carbonate obtained in the example 3 (unit: %)

| | Item | Industry standard | Example 3 |
| --- | --- | --- | --- |
| | $Li_2CO_3$ content | ☐99.5 | 99.6 |
| Impurity content | Na | 0.025 | 0.003 |
| | Mg | 0.008 | 0.0005 |
| | Ca | 0.005 | 0.0005 |
| | K | 0.001 | 0.0004 |
| | Fe | 0.001 | 0.0001 |
| | Zn | 0.0003 | 0.0001 |
| | Cu | 0.0003 | 0.0001 |
| | Pb | 0.0003 | 0.0001 |
| | Si | 0.003 | 0.0003 |
| | Al | 0.001 | 0.0005 |
| | Mn | 0.0003 | 0.0001 |
| | Ni | 0.001 | 0.0002 |
| | $SO_4^{2-}$ | 0.08 | 0.0680 |
| | $Cl^-$ | 0.003 | 0.002 |
| | Magnetic substance | 0.0003 | 0.0001 |

Example 4

A high-impurity lithium source used in the example has the specifications shown in Table 4-1 and belongs to a first high-impurity lithium source.

TABLE 4-1

Composition of the high-impurity lithium source used in the Example 4 (unit: g/L)

| $Li^+$ | $Ca^{2+}$ | $Mg^{2+}$ | B | $Na^+$ | $K^+$ | $SO_4^{-2}$ | $Cl^-$ | pH |
| --- | --- | --- | --- | --- | --- | --- | --- | --- |
| 3.51 | 2.12 | 20.78 | 11.26 | 40.22 | 16.13 | 6.57 | 155.0391145 | 7.14 |

Step A: Preparation of a Refined Lithium Salt Solution a. Treatment of the High-Impurity Lithium Source The high-impurity lithium source shown in Table 4-1 was filtered by a ceramic filter to remove suspended solids and silts to obtain a filtrate. The filtrate was pumped into an adsorber containing an $H_2TiO_3$ ion adsorbent for selective lithium adsorption. After the ion exchange adsorbent was saturated with lithium by adsorption, the high-impurity lithium source therein was replaced by introducing water 5 times volume of the adsorbent and the liquid therein was drained; and the high-impurity lithium source was cyclically desorbed with a mixture of sulfuric acid and hydrochloric acid having a concentration of 0.5 mol/L and a volume 2 times that of the adsorbent for 0.8 h to obtain a lithium-containing desorption solution containing 1.0 g/L $Li^+$, 0.005 g/L $Na^+$, 0.001 g/L $K^+$, 0.001 g/L $Ca^{2+}$, 0.003 g/L $Mg^{2+}$ and 0.005 g/L B and having a pH of 2.3.

The lithium-containing desorption solution with pH value adjusted to 9 by adding a lithium hydroxide solution was filtered by a PE microporous tubular filter to obtain a filtrate. The filtrate was enriched and concentrated by a three-stage reverse osmosis and electrodialysis coupling enrichment and concentration device to obtain a lithium-rich solution and desalted production water; and the lithium-rich solution contained 10 g/L $Li^+$, 0.01 g/L $Ca^{2+}$, 0.01 g/L $Mg^{2+}$, 0.001 g/L $Mn^{2+}$, 0.001 g/L $Fe^{3+}$ and 0.05 g/L B and had a pH of 9, and the desalted production water was recycled for washing the adsorber. A sodium carbonate solution with a concentration of 300 g/L was added to the lithium-rich solution with sodium carbonate excess controlled at 0.3 g/L to remove impurities and react with the lithium-rich solution at 60° C. for 30 min and react at the temperature for 30 min after the pH of the lithium-rich solution was adjusted to 11 with lithium hydroxide, and the lithium-rich solution was filtered by a microporous filter with a filter precision of 0.1 μm to obtain a purified lithium salt solution containing 10 g/L $Li^+$, 10 ppm $Ca^{2+}$, 1 ppm $Mg^{2+}$, 5 ppm $Mn^{2+}$, 1 ppm $Fe^{3+}$, 30 g/L $SO_4^{2-}$, 29 g/L $Cl^-$ and 0.005 g/L B and having a pH of 11.

b. Refining of the Purified Lithium Salt Solution

The obtained purified lithium salt solution with pH value adjusted to 8.5 by adding hydrochloric acid was subject to deep impurity removal by iminodiacetic acid chelating resin to obtain a refined lithium salt solution containing 10 g/L $Li^+$, 1 ppm $Ca^{2+}$, 1 ppm $Mg^{2+}$, 1 ppm $Fe^{3+}$, 1 ppm $Mn^{2+}$, 1 ppm $Zn^{2+}$, 1 ppm $Al^{2+}$, 30 g/L $SO_4^{2-}$, 29.5 g/L $Cl^-$ and 5 ppm B and having a pH of 8.5.

Step B: Preparation of Battery Grade Lithium Hydroxide a. Composite Electrodialysis Treatment The refined lithium liquid was subject to composite electrodialysis treatment to obtain a lithium hydroxide solution with a LiOH concentration of 1.8 mol/L and a dilute acid solution with an $H^+$ concentration of 1 mol/L. The lithium hydroxide solution in an alkali chamber of a bipolar membrane electrodialysis unit and an alkali chamber of an alkali-resistant electrodialysis unit had a LiOH concentration of 1 mol/L, the lithium salt solution in a salt chamber of the bipolar membrane electrodialysis unit and a concentrated salt chamber of an acid-resistant electrodialysis unit had a $Li^+$ concentration of 10 g/L, the lithium salt solution discharged from a salt chamber of the acid-resistant electrodialysis unit with decreased concentration had a $Li^+$ concentration of 1.5 g/L, the dilute acid solution discharged from an acid chamber of the bipolar membrane electrodialysis unit had an $H^+$ concentration of 1 mol/L, and the lithium salt solution discharged from a salt chamber of the bipolar membrane electrodialysis unit had a $Li^+$ concentration of 3 g/L. A lithium hydroxide solution with a concentration of 1.0 mol/L was used as an electrode soaking solution of the bipolar membrane electrodialysis unit and the alkali-resistant electrodialysis unit, and a corresponding lithium salt solution with a $Li^+$ concentration of 1.0 mol/L was used as an electrode soaking solution of the acid-resistant electrodialysis unit.

b. Concentration and Crystallization

The lithium hydroxide solution with the concentration of 1.8 mol/L was evaporated, concentrated and crystallized by an MVR evaporation, concentration and crystallization device with an evaporation chamber controlled at 80° C. to separate out crystals with crystal growth and retention time lasting 3.5 h to obtain lithium hydroxide magma. The lithium hydroxide magma discharged from the MVR evaporation, concentration and crystallization device was fed to an OLSO crystallizer for continuous cooling crystallization with crystallization temperature controlled at 40° C. and crystal growth and retention time lasting 4 h to obtain wet fine lithium hydroxide upon solid-liquid separation and washing. The wet fine lithium hydroxide was dried, crushed and demagnetized to obtain battery grade lithium hydroxide. The MVR evaporation, concentration and crystallization device discharged unacceptable high-impurity mother liquor for preparation of subsequent battery grade lithium carbonate. The obtained battery grade lithium hydroxide meets requirements for $LiOH.H_2O$-D1 in GB/T8766-2013. See Table 4-2 for the mass of the battery grade lithium hydroxide.

TABLE 4-2

Mass of the battery grade lithium hydroxide obtained in the example 4 (unit: %)

| Chemical composition (mass fraction) | | $LiOH \cdot H_2O$-D1 | Example 4 |
| --- | --- | --- | --- |
| $LiOH \cdot H_2O$, ≥ | | 98.00 | ≥99 |
| Impurity content, ≤ | Fe | 0.0008 | 0.0001 |
| | K | 0.0030 | 0.0005 |
| | Na | 0.0030 | 0.0020 |
| | Ca | 0.0050 | 0.0005 |
| | Cu | 0.0050 | 0.0001 |
| | Mg | 0.0050 | 0.0001 |
| | Mn | 0.0050 | 0.0001 |
| | Si | 0.0050 | 0.0005 |
| | $CO_3^{2-}$ | 0.7000 | 0.10 |
| | $Cl^-$ | 0.0020 | 0.0020 |
| | $SO_4^{2-}$ | 0.0100 | 0.0030 |
| | Acid insoluble substance | 0.0050 | ≤0.0050 |

Step C: Preparation of High Purity Grade Lithium Hydroxide

The obtained wet fine lithium hydroxide was heated and dissolved in the crystallized mother liquor obtained in the step to form a 95° C. saturated solution. The saturated solution was filtered to obtain a filtrate, and the filtrate was fed to a vacuum flash chamber with vacuum degree controlled at −74 MPa for pre-cooling. The flash condensate water was returned to the system for dissolution. The lithium hydroxide was pre-cooled to 75° C. in the flash chamber and fed to the OSLO crystallizer for cooling crystallization with cooling crystallization temperatures controlled at 0° C. and crystal growth and retention time lasting 3 h to obtain magma, and solid-to-liquid ratio of the magma was 10%. The obtained lithium hydroxide magma was subject to solid-liquid separation and pure water washing to obtain wet high purity grade lithium hydroxide and a crystallized mother liquor. The wet high purity grade lithium hydroxide was dried and screened to obtain high purity grade lithium hydroxide with purity higher than 99.99%.

Step D: Preparation of High Purity Grade Lithium Carbonate

The wet high purity grade lithium hydroxide was dissolved in the acceptable carbonized mother liquor obtained in the step by separation to form a lithium hydroxide solution with a conductivity of 350 ms/cm. The lithium hydroxide solution was filtered by a stainless steel microporous filter to obtain a filtrate, and the filtrate was added to a first carbonization reactor for stirring at a controlled speed of 60 rmp. While stirring, carbon dioxide was introduced into the reactor for carbonization reaction and flow rate of carbon dioxide was controlled so that the conductivity of the reaction system decreased at a rate of 7 ms/cm per minute. A corresponding control valve was turned off automatically when the conductivity decreased to 100 ms/cm to stop introduction of carbon dioxide. After continuous stirring for 20 min reaction to obtain a liquid, the liquid was subject to solid-liquid separation, pure water washing, drying, screening and packaging to obtain high purity grade lithium carbonate.

The acceptable carbonized mother liquor obtained by separation was returned for dissolving the wet fine lithium hydroxide, and the unacceptable carbonized mother liquor proceeded to the next preparation process of battery grade lithium carbonate.

The mass of the high purity grade lithium carbonate obtained in the example is shown in Table 4-3.

TABLE 4-3

Mass of the high purity grade lithium carbonate obtained in the example 4 (unit: %)

| Item | Example 4 |
|---|---|
| $Li_2CO_3$ | ≥99.995 |
| K | <0.0001 |
| Na | <0.0001 |
| Ca | <0.0002 |
| Mg | <0.0001 |
| Mn | <0.0001 |
| Fe | <0.0001 |
| As | <0.0001 |
| Ag | <0.0001 |
| Al | <0.0001 |
| Ba | <0.0001 |
| Pb | <0.0001 |
| Cu | <0.0001 |
| Cr | <0.0001 |
| Cd | <0.0001 |
| Co | <0.0001 |
| Ni | <0.0001 |
| Zn | <0.0001 |
| Si | <0.0003 |
| $Cl^-$ | <0.001 |
| $SO_4^{2-}$ | <0.003 |

Step E: Preparation of Battery Grade Lithium Carbonate

The unacceptable carbonized mother liquor prepared in the step D was fed to a second carbonization reactor as a base solution and was heated to 60° C. Battery grade lithium carbonate seed crystals with a particle size of 20 μm were added to the base solution at a volume concentration of 1‰. A PLC system was used to control feeding rate of carbon dioxide and an unacceptable lithium hydroxide solution composed of the unacceptable high-impurity mother liquor from the step B and the unacceptable carbonized mother liquor obtained by solid-liquid separation in the step D. The reaction system was maintained at a conductivity of 60 ms/cm and a reaction temperature of 60° C. Carbon dioxide and the lithium hydroxide solution were introduced continuously to separate out lithium carbonate slurry continuously. The lithium carbonate slurry was added to an aging cell for continuous reaction for 30 min. The reacted slurry was subject to solid-liquid separation to obtain a carbonized mother liquor and wet battery grade lithium carbonate. The wet battery grade lithium carbonate was washed, dried, crushed and deferrized to obtain battery grade lithium carbonate. The battery grade lithium carbonate obtained in the example meets requirements in GB/T8766-2013 and mass thereof is shown in Table 4-4.

TABLE 4-4

Mass of the battery grade lithium carbonate obtained in the example 4 (unit: %)

| | Item | Industry standard | Example 4 |
|---|---|---|---|
| | $Li_2CO_3$ content | ≥99.5 | 99.6 |
| Impurity content | Na | 0.025 | 0.005 |
| | Mg | 0.008 | 0.0010 |
| | Ca | 0.005 | 0.0010 |
| | K | 0.001 | 0.0005 |
| | Fe | 0.001 | 0.0003 |
| | Zn | 0.0003 | 0.0001 |
| | Cu | 0.0003 | 0.0001 |
| | Pb | 0.0003 | 0.0002 |
| | Si | 0.003 | 0.0005 |
| | Al | 0.001 | 0.0005 |
| | Mn | 0.0003 | 0.0001 |
| | Ni | 0.001 | 0.0002 |
| | $SO_4^{2-}$ | 0.08 | 0.0500 |
| | $Cl^-$ | 0.003 | 0.002 |
| | Magnetic substance | 0.0003 | 0.0001 |

Example 5

A high-impurity lithium source used in the example has the specifications shown in Table 5-1 and belongs to a second high-impurity lithium source.

TABLE 5-1

Composition of the high-impurity lithium source used in the example (unit: g/L)

| $Li^+$ | $Na^+$ | $K^+$ | $Mg^{2+}$ | $Ca^{2+}$ | B |
|---|---|---|---|---|---|
| 17.8 | 80.14 | 15.73 | 2.14 | 0.06 | 1.51 |

Step A: Preparation of a Refined Lithium Salt Solution

A. Treatment of the High-Impurity Lithium Source

The high-impurity lithium source shown in Table 5-1 was pumped into a reactor and heated to 85° C., then to which a sodium carbonate solution with a concentration of 300 g/L was added with sodium carbonate excess controlled at 0.3 g/L to remove calcium and react with the high-impurity lithium source at the temperature for 10 min and react at the temperature for 30 min after the pH of the high-impurity lithium source was adjusted to 11 with sodium hydroxide, and the high-impurity lithium source was pumped into a plate and frame filter for rough filtration and a microporous filter for fine filtration to obtain an lithium-containing impurity-removed solution containing 16 g/L $Li^+$, 78 g/L $Na^+$, 13.8 g/L $K^+$, ≤1 ppm $Mg^{2+}$, ≤10 ppm $Ca^{2+}$ and 1.3 g/L B and having a pH of 11.

The lithium-containing impurity-removed solution and a sodium carbonate solution with a concentration of 300 g/L were concurrently added to a continuous crystallization reactor for precipitation reaction, the temperature of the reaction system was controlled at 95° C., and the feeding rate of the sodium carbonate solution and the lithium-containing impurity-removed solution was controlled to keep an instantaneous Li concentration of 5 g/L and a sodium carbonate concentration of 41 g/L when entering the reaction system. Upon continuous feeding, lithium carbonate slurry was separated out continuously and introduced into a thickener to obtain lithium carbonate slurry with a solid content of 20%, the lithium carbonate slurry was separated by a centrifuge and washed to obtain wet fine lithium carbonate and a lithium precipitation mother liquor containing 1.5 g/L $Li^+$, 65 g/L $Na^+$, 3.6 g/L $SO_4^{2-}$, 90 g/L $Cl^-$ and 13 g/L $CO_3^{2-}$ and having a pH of 12.

Hydrochloric acid with an $H^+$ concentration of 3 mol/L was added to react with the wet fine lithium carbonate to obtain a liquid with pH at reaction endpoint controlled at 4. The liquid was filtered to obtain a purified lithium salt solution containing 20 g/L $Li^+$, ≤10 ppm $Ca^{2+}$, ≤1 ppm $Mg^{2+}$, ≤5 ppm $Mn^{2+}$, ≤1 ppm $Fe^{4+}$, 3.6 g/L $SO_4^{2-}$, 95 g/L $Cl^-$ and 0.002 g/L B and having a pH of 4.

b. Refining of the Purified Lithium Salt Solution

The obtained purified lithium salt solution with pH value adjusted to 8 by adding lithium hydroxide was subject to deep impurity removal by iminodiacetic acid chelating resin to obtain a refined lithium salt solution containing 16 g/L $Li^+$, ≤1 ppm $Ca^{2+}$, ≤1 ppm $Mg^{2+}$, ≤1 ppm $Fe^{3+}$, ≤1 ppm $Mn^{2+}$, 3.5/L $SO_4^{2-}$, 92 g/L $Cl^-$ and ≤5 ppm B and having a pH of 8.

Step B: Preparation of Battery Grade Lithium Hydroxide a. Composite Electrodialysis Treatment The obtained refined lithium salt solution was subject to composite electrodialysis treatment to obtain a lithium hydroxide solution with a LiOH concentration of 3.0 mol/L and a dilute acid solution with an $H^+$ concentration of 1.8 mol/L. The lithium hydroxide solution in an alkali chamber of a bipolar membrane electrodialysis unit and an alkali chamber of an alkali-resistant electrodialysis unit had a LiOH concentration of 1.8 mol/L, the lithium salt solution in a salt chamber of the bipolar membrane electrodialysis unit and a concentrated salt chamber of an acid-resistant electrodialysis unit had a $Li^+$ concentration of 17 g/L, the lithium salt solution discharged from a salt chamber of the acid-resistant electrodialysis unit with decreased concentration had a $Li^+$ concentration of 3 g/L, the dilute acid solution discharged from an acid chamber of the bipolar membrane electrodialysis unit had an $H^+$ concentration of 1.8 mol/L, and the lithium salt solution discharged from the salt chamber of the bipolar membrane electrodialysis unit had a $Li^+$ concentration of 5 g/L. A lithium hydroxide solution with a concentration of 1.0 mol/L was used as an electrode soaking solution of the bipolar membrane electrodialysis unit and the alkali-resistant electrodialysis unit, and a corresponding lithium salt solution with a $Li^+$ concentration of 1.0 mol/L was used as an electrode soaking solution of the acid-resistant electrodialysis unit.

b. Concentration and Crystallization

A lithium hydroxide solution with a concentration of 3.0 mol/L was evaporated, concentrated and crystallized by an MVR evaporation, concentration and crystallization device with an evaporation chamber controlled at 80° C. to separate out crystals with crystal growth and retention time lasting 4 h to obtain lithium hydroxide magma. The lithium hydroxide magma discharged from the MVR evaporation, concentration and crystallization device was fed to an OLSO crystallizer for continuous cooling crystallization with crystallization temperature controlled at 35° C. and crystal growth and retention time lasting 4 h to obtain wet fine lithium hydroxide upon solid-liquid separation and washing. The wet fine lithium hydroxide was dried, crushed and demagnetized to obtain battery grade lithium hydroxide. The MVR evaporation, concentration and crystallization device discharged unacceptable high-impurity mother liquor for preparation of subsequent battery grade lithium carbonate. The obtained battery grade lithium hydroxide meets requirements for $LiOH \cdot H_2O$-D1 in GB/T8766-2013. See Table 5-2 for the mass of the battery grade lithium hydroxide.

TABLE 5-2

Mass of the battery grade lithium hydroxide obtained in the example 5 (unit: %)

| Chemical composition (mass fraction) | | $LiOH \cdot H_2O$-D1 | Example 5 |
|---|---|---|---|
| | $LiOH \cdot H_2O$, ≥ | 98.00 | ≥99.5 |
| Impurity content, ≤ | Fe | 0.0008 | 0.0001 |
| | K | 0.0030 | 0.0005 |
| | Na | 0.0030 | 0.007 |
| | Ca | 0.0050 | 0.0003 |
| | Cu | 0.0050 | 0.0001 |
| | Mg | 0.0050 | 0.0001 |
| | Mn | 0.0050 | 0.0001 |
| | Si | 0.0050 | 0.0005 |
| | $CO_3^{2-}$ | 0.7000 | 0.15 |
| | $Cl^-$ | 0.0020 | 0.0020 |
| | $SO_4^{2-}$ | 0.0100 | 0.0050 |
| | Acid insoluble substance | 0.0050 | ≤0.0050 |

Step C: Preparation of High Purity Grade Lithium Hydroxide

The obtained wet fine lithium hydroxide was heated and dissolved in evaporating condensate water to form a 95° C. saturated solution. The saturated solution was filtered to obtain a filtrate, and the filtrate was fed to a vacuum flash chamber with vacuum degree controlled at −0.06 MPa for pre-cooling crystallization. The flash condensate water was returned to the flash system. The lithium hydroxide solution was pre-cooled to 75° C. in the flash chamber and fed to the OSLO crystallizer for cooling crystallization with cooling crystallization temperature controlled at 40° C. and crystal growth and retention time lasting 4 h to obtain magma, and solid-to-liquid ratio of the magma was 15%. The obtained lithium hydroxide magma was subject to solid-liquid separation and pure water washing to obtain wet high purity grade lithium hydroxide and a crystallized mother liquor. The wet high purity grade lithium hydroxide was dried and screened to obtain high purity grade lithium hydroxide with purity higher than 99.99%.

Step D: Preparation of High Purity Grade Lithium Carbonate

The wet high purity grade lithium hydroxide was dissolved in the acceptable carbonized mother liquor obtained in the step to form a lithium hydroxide solution with a conductivity of 300 ms/cm. The lithium hydroxide solution was filtered by a bag filter to obtain a filtrate, and the filtrate was fed to a first carbonization reactor for stirring at a controlled speed of 50 rmp. While stirring, carbon dioxide was introduced into the reactor for carbonization reaction and flow rate of carbon dioxide was controlled so that the conductivity of the reaction system decreased at a rate of 5 ms/cm per minute. A corresponding control valve was turned off automatically when the conductivity decreased to 100 ms/cm to stop introduction of carbon dioxide. After continuous stirring for 30 min reaction to obtain a liquid, the liquid was subject to solid-liquid separation, pure water washing, drying, screening and packaging to obtain high purity grade lithium carbonate. The acceptable carbonized mother liquor obtained by separation was returned for dissolving the wet fine lithium hydroxide, and the unacceptable carbonized mother liquor proceeded to the next preparation process of battery grade lithium carbonate.

The mass of the high purity grade lithium carbonate obtained in the example is shown in Table 5-3.

TABLE 5-3

Mass of the high purity grade lithium carbonate obtained in the example 5 (unit: %)

| Item | Example 5 |
|---|---|
| $Li_2CO_3$ | ≥99.995 |
| K | <0.0001 |
| Na | <0.0001 |
| Ca | <0.0003 |
| Mg | <0.0001 |
| Mn | <0.0001 |
| Fe | <0.0001 |
| As | <0.0001 |
| Ag | <0.0001 |
| Al | <0.0001 |
| Ba | <0.0001 |
| Pb | <0.0001 |
| Cu | <0.0001 |
| Cr | <0.0001 |
| Cd | <0.0001 |
| Co | <0.0001 |
| Ni | <0.0001 |
| Zn | <0.0001 |
| Si | <0.0002 |
| $Cl^-$ | <0.001 |
| $SO_4^{2-}$ | <0.003 |

Step E: Preparation of Battery Grade Lithium Carbonate

The unacceptable carbonized mother liquor obtained by solid-liquid separation in the step was fed to a second carbonization reactor as a base solution and was heated to 80° C. Battery grade lithium carbonate seed crystals with a particle size of 20 μm were added to the base solution at a volume concentration of 3.5‰. A PLC system was used to control feeding rate of carbon dioxide and an unacceptable lithium hydroxide solution composed of the unacceptable high-impurity mother liquor from the step B and the unacceptable carbonized mother liquor obtained by solid-liquid separation in the step D. The reaction system was maintained at a conductivity of 90 ms/cm and a reaction temperature of 80° C. Carbon dioxide and the lithium hydroxide solution were introduced continuously to separate out lithium carbonate slurry continuously. The lithium carbonate slurry was added to an aging cell for continuous reaction for 60 min. The reacted slurry was subject to solid-liquid separation to obtain a carbonized mother liquor and wet battery grade lithium carbonate. The wet battery grade lithium carbonate was washed, dried, crushed and deferrized to obtain battery grade lithium carbonate. The battery grade lithium carbonate obtained in the example meets requirements in GB/T8766-2013 and mass thereof is shown in Table 5-4.

TABLE 5-4

Mass of the battery grade lithium carbonate obtained in the example 5 (unit: %)

| | Item | Industry standard | Example 5 |
|---|---|---|---|
| | $Li_2CO_3$ content | ☐99.5 | 99.6 |
| Impurity content | Na | 0.025 | 0.0030 |
| | Mg | 0.008 | 0.0005 |
| | Ca | 0.005 | 0.0005 |
| | K | 0.001 | 0.0005 |
| | Fe | 0.001 | 0.0003 |
| | Zn | 0.0003 | 0.0001 |
| | Cu | 0.0003 | 0.0001 |
| | Pb | 0.0003 | 0.0002 |

TABLE 5-4-continued

Mass of the battery grade lithium carbonate obtained in the example 5 (unit: %)

| Item | Industry standard | Example 5 |
|---|---|---|
| Si | 0.003 | 0.0005 |
| Al | 0.001 | 0.0005 |
| Mn | 0.0003 | 0.0001 |
| Ni | 0.001 | 0.0002 |
| $SO_4^{2-}$ | 0.08 | 0.0400 |
| $Cl^-$ | 0.003 | 0.002 |
| Magnetic substance | 0.0003 | 0.0001 |

Example 6

A high-impurity lithium source used in the example has the specifications shown in Table 6-1 and belongs to a second high-impurity lithium source.

TABLE 6-1

Composition of the high-impurity lithium source used in the example (unit: g/L)

| $Li^+$ | $Na^+$ | $K^+$ | $Mg^{2+}$ | $Ca^{2+}$ | B |
|---|---|---|---|---|---|
| 39.17 | 26.51 | 5.25 | 7.81 | 2.32 | 4.56 |

Step A: Preparation of a Refined Lithium Salt Solution a. Treatment of the High-Impurity Lithium Source The high-impurity lithium source shown in Table 6-1 was pumped into a reactor and was heated to 85° C., then to which a sodium carbonate solution with a concentration of 300 g/L was added with sodium carbonate excess controlled at 0.35 g/L to remove calcium and react with the high-impurity lithium source at the temperature for 30 min and react at the temperature for 30 min after the pH of the high-impurity lithium source was adjusted to 11 with a lithium hydroxide solution with a concentration of 3 mol/L, and the high-impurity lithium source was pumped into a plate and frame filter for rough filtration and a ceramic microporous filter for fine filtration to obtain an lithium-containing impurity-removed solution containing 38 g/L $Li^+$, 27 g/L $Na^+$, 4.9 g/L $K^+$, ≤1 ppm $Mg^{2+}$, ≤10 ppm $Ca^{2+}$ and 4.1 g/L B and having a pH of 11.

The lithium-containing impurity-removed solution and a sodium carbonate solution with a concentration of 200 g/L were concurrently added to a continuous crystallization reactor for precipitation reaction. The temperature of the reaction system was controlled at 95° C., and the feeding rate of the sodium carbonate solution and the lithium-containing impurity-removed solution was controlled to keep an instantaneous Li concentration of 3 g/L and a sodium carbonate concentration of 30 g/L when entering the reaction system. Upon continuous feeding, lithium carbonate slurry was separated out continuously and was introduced into a thickener to obtain lithium carbonate slurry with a solid content of 30%, the lithium carbonate slurry was separated by a centrifuge and washed to obtain wet fine lithium carbonate and lithium precipitation mother liquor containing 1.5 g/L Li+, 50 g/L $Na^+$, 1.2 g/L $SO_4^{2-}$, 69 g/L $Cl^-$ and 15 g/L $CO_3^{2-}$ and having a pH of 12.

Sulfuric acid with an $H^+$ concentration of 2.3 mol/L was added to react with the wet fine lithium carbonate to obtain a liquid with pH at reaction endpoint controlled at 5. The liquid was filtered to obtain a purified lithium sulfate solution containing 14 g/L $Li^+$, ≤10 ppm $Ca^{2+}$, ≤1 ppm $Mg^{2+}$, ≤5 ppm $Mn^{2+}$, ≤1 ppm $Fe^{3+}$, 95 g/L $SO_4^{2-}$, 0.3 g/L $Cl^-$ and 0.002 g/L B and having a pH of 5.

b. Refining of the Purified Lithium Salt Solution

The obtained purified lithium salt solution with pH value adjusted to 8 by adding lithium hydroxide was subject to deep impurity removal by iminodiacetic acid chelating resin to obtain a refined lithium sulfate solution containing 14 g/L $Li^+$, ≤1 ppm $Ca^{2+}$, ≤1 ppm $Mg^{2+}$, ≤1 ppm $Fe^{3+}$, ≤1 ppm $Mn^{2+}$, 92 g/L $SO_4^{2-}$, 0.2 g/L $Cl^-$ and ≤5 ppm B and having a pH of 5.

Step B: Preparation of Battery Grade Lithium Hydroxide a. Composite Electrodialysis Treatment The obtained refined lithium salt solution was subject to composite electrodialysis treatment to obtain a lithium hydroxide solution with a LiOH concentration of 3.3 mol/L and a dilute acid solution with an $H^+$ concentration of 1.8 mol/L. The lithium hydroxide solution in an alkali chamber of a bipolar membrane electrodialysis unit and an alkali chamber of an alkali-resistant electrodialysis unit had a LiOH concentration of 1.8 mol/L, the lithium salt solution in a salt chamber of the bipolar membrane electrodialysis unit and a concentrated salt chamber of an acid-resistant electrodialysis unit had a $Li^+$ concentration of 12 g/L, the lithium salt solution discharged from a salt chamber of the acid-resistant electrodialysis unit with decreased concentration had a $Li^+$ concentration of 3 g/L, the dilute acid solution discharged from an acid chamber of the bipolar membrane electrodialysis unit had an $H^+$ concentration of 1.8 mol/L, and the lithium salt solution discharged from the salt chamber of the bipolar membrane electrodialysis unit had a $Li^+$ concentration of 4 g/L. A lithium hydroxide solution with a concentration of 1.2 mol/L was used as an electrode soaking solution of the bipolar membrane electrodialysis unit and the alkali-resistant electrodialysis unit, and a corresponding lithium salt solution with a $Li^+$ concentration of 1.2 mol/L was used as an electrode soaking solution of the acid-resistant electrodialysis unit.

b. Concentration and Crystallization

The lithium hydroxide solution with the concentration of 3.3 mol/L was evaporated, concentrated and crystallized by an MVR evaporation, concentration and crystallization device with an evaporation chamber controlled at 75° C. to separate out crystals with crystal growth and retention time lasting 3 h to obtain lithium hydroxide magma. The lithium hydroxide magma discharged from the MVR evaporation, concentration and crystallization device was fed to an OLSO crystallizer for continuous cooling crystallization with crystallization temperature controlled at 40° C. and crystal growth and retention time lasting 4 h to obtain wet fine lithium hydroxide upon solid-liquid separation and washing. The wet fine lithium hydroxide was dried, crushed and demagnetized to obtain battery grade lithium hydroxide. The MVR evaporation, concentration and crystallization device discharged unacceptable high-impurity mother liquor for preparation of subsequent battery grade lithium carbonate. The obtained battery grade lithium hydroxide meets requirements for LiOH.$H_2$O-D1 in GB/T8766-2013. See Table 6-2 for the mass of the battery grade lithium hydroxide.

TABLE 6-2

Mass of the battery grade lithium hydroxide obtained in the example 6 (unit: %)

| | Chemical composition (mass fraction) | LiOH•$H_2$O-D1 | Example 6 |
|---|---|---|---|
| | LiOH•$H_2$O, ≥ | 98.00 | ≥99.5 |
| Impurity content, ≤ | Fe | 0.0008 | 0.0001 |
| | K | 0.0030 | 0.0005 |
| | Na | 0.0030 | 0.0010 |
| | Ca | 0.0050 | 0.0005 |

TABLE 6-2-continued

Mass of the battery grade lithium hydroxide obtained in the example 6 (unit: %)

| Chemical composition (mass fraction) | LiOH•$H_2$O-D1 | Example 6 |
|---|---|---|
| Cu | 0.0050 | 0.0001 |
| Mg | 0.0050 | 0.0001 |
| Mn | 0.0050 | 0.0001 |
| Si | 0.0050 | 0.0005 |
| $CO_3^{2-}$ | 0.7000 | 0.13 |
| $Cl^-$ | 0.0020 | 0.0020 |
| $SO_4^{2-}$ | 0.0100 | 0.0060 |
| Acid insoluble substance | 0.0050 | ≤0.0050 |

Step C: Preparation of High Purity Grade Lithium Hydroxide

The obtained wet fine lithium hydroxide was heated and dissolved in the crystallized mother liquor obtained in the step to form a 95° C. saturated solution. The saturated solution was filtered to obtain a filtrate, and the filtrate was fed to a vacuum flash chamber with vacuum degree controlled at −0.068 MPa for pre-cooling crystallization. The condensate water produced by flash evaporation was returned to the system. The lithium hydroxide was pre-cooled to 80° C. in the flash chamber and fed to the OSLO crystallizer for cooling crystallization with cooling crystallization temperature controlled at 40° C. and crystal growth and retention time lasting 4 h to obtain magma, and solid-to-liquid ratio of the magma was 20%. The obtained lithium hydroxide magma was subject to solid-liquid separation and pure water washing to obtain wet high purity grade lithium hydroxide and a crystallized mother liquor. The wet high purity grade lithium hydroxide was dried and screened to obtain high purity grade lithium hydroxide with purity higher than 99.99%.

Step D: Preparation of High Purity Grade Lithium Carbonate

The wet high purity grade lithium hydroxide was dissolved in the acceptable carbonized mother liquor obtained in the step to form a lithium hydroxide solution with a conductivity of 380 ms/cm. The lithium hydroxide solution was filtered by a bag filter to obtain a filtrate, and the filtrate was fed to a first carbonization reactor for stirring at a controlled speed of 50 rmp. While stirring, carbon dioxide was introduced into the reactor for carbonization reaction and flow rate of carbon dioxide was controlled so that the conductivity of the reaction system decreased at a rate of 4 ms/cm per minute. A corresponding control valve was turned off automatically when the conductivity decreased to 100 ms/cm to stop introduction of carbon dioxide. After continuous stirring for 20 to 30 min reaction to obtain a liquid, the liquid was subject to solid-liquid separation, pure water washing, drying, screening and packaging to obtain high purity grade lithium carbonate.

The acceptable carbonized mother liquor obtained by separation was returned for dissolving the wet fine lithium hydroxide, and the unacceptable carbonized mother liquor proceeded to the next preparation process of battery grade lithium carbonate.

The mass of the high purity grade lithium carbonate obtained in the example is shown in Table 6-3.

TABLE 6-3

Mass of the high purity grade lithium carbonate obtained in the example 6 (unit: %)

| Item | Example 6 |
|---|---|
| $Li_2CO_3$ | ≥99.995 |
| K | <0.0001 |
| Na | <0.0001 |
| Ca | <0.0003 |
| Mg | <0.0001 |
| Mn | <0.0001 |
| Fe | <0.0001 |
| As | <0.0001 |
| Ag | <0.0001 |
| Al | <0.0001 |
| Ba | <0.0001 |
| Pb | <0.0001 |
| Cu | <0.0001 |
| Cr | <0.0001 |
| Cd | <0.0001 |
| Co | <0.0001 |
| Ni | <0.0001 |
| Zn | <0.0001 |
| Si | <0.0003 |
| $Cl^-$ | <0.001 |
| $SO_4^{2-}$ | <0.003 |

Step E: Preparation of Battery Grade Lithium Carbonate

The carbonized mother liquor obtained by solid-liquid separation in the step was fed to a second carbonization reactor as a base solution and was heated to 60° C. Battery grade lithium carbonate seed crystals with a particle size of 30 μm were added to the base solution at a volume concentration of 3‰. A PLC system was used to control feeding rate of carbon dioxide and an unacceptable lithium hydroxide solution composed of the unacceptable high-impurity mother liquor from the step B and the unacceptable carbonized mother liquor obtained by solid-liquid separation in the step D. The reaction system was maintained at a conductivity of 60 ms/cm and a reaction temperature of 60° C. Carbon dioxide and the lithium hydroxide solution were introduced continuously to separate out lithium carbonate slurry continuously. The lithium carbonate slurry was added to an aging cell for continuous reaction for 30 min. The reacted slurry was subject to solid-liquid separation to obtain a carbonized mother liquor and wet battery grade lithium carbonate. The wet battery grade lithium carbonate was washed, dried, crushed and deferrized to obtain battery grade lithium carbonate. The battery grade lithium carbonate obtained in the example meets requirements in GB/T8766-2013 and mass thereof is shown in Table 6-4.

TABLE 6-4

Mass of the battery grade lithium carbonate obtained in the example 6 (unit: %)

| | Item | Industry standard | Example 6 |
|---|---|---|---|
| | $Li_2CO_3$ content | ☐99.5 | 99.6 |
| Impurity | Na | 0.025 | 0.0020 |
| content | Mg | 0.008 | 0.0008 |
| | Ca | 0.005 | 0.0005 |
| | K | 0.001 | 0.0005 |
| | Fe | 0.001 | 0.0003 |
| | Zn | 0.0003 | 0.0001 |
| | Cu | 0.0003 | 0.0001 |
| | Pb | 0.0003 | 0.0002 |
| | Si | 0.003 | 0.0005 |
| | Al | 0.001 | 0.0005 |
| | Mn | 0.0003 | 0.0001 |
| | Ni | 0.001 | 0.0002 |
| $SO_4^{2-}$ | | 0.08 | 0.0500 |
| $Cl^-$ | | 0.003 | 0.002 |
| Magnetic substance | | 0.0003 | 0.0001 |

Example 7

A high-impurity lithium source used in the example has the specifications shown in Table 7-1 and belongs to a high-impurity solid lithium source.

TABLE 7-1

Composition of the high-impurity lithium source used in the example 7 (unit: wt %)

| LiCl | Na | K | Mg | Ca | $H_2O$ |
|---|---|---|---|---|---|
| 90 | 0.53 | 0.21 | 0.57 | 1.43 | 6.11 |

Step A: Preparation of a Refined Lithium Salt Solution a. Treatment of the High-Impurity Lithium Source Pure water was added to dissolve the high-impurity lithium shown in Table 7-1 to prepare a lithium salt solution containing 24 g/L $Li^+$. The lithium salt solution was fed to an impurity removal reactor and heated to 90° C. by stirring, then to which a sodium carbonate solution with a concentration of 300 g/L was added with sodium carbonate excess controlled at 0.3 g/L to remove impurities and react with the lithium salt solution at the temperature for 30 min and react at the temperature for 30 min after the pH of the lithium salt solution was adjusted to 11 with lithium hydroxide, and the lithium salt solution was pumped into a plate and frame filter for rough filtration to obtain a filtrate, and the filtrate wash subject to fine filtration by a microporous filter with a filter precision of 0.1 μm to obtain a purified lithium salt solution containing 23 g/L $Li^+$, ≤10 ppm $Ca^{2+}$, ≤1 ppm $Mg^{2+}$, M≤5 ppmn, ≤1 ppm Fe, 0.8 g/L $SO_4^{2-}$, 120 g/L $Cl^-$ and 0.001 g/L B and having a pH of 11.

b. Refining of the Purified Lithium Salt Solution

The obtained purified lithium salt solution with pH value adjusted to 8 by adding hydrochloric acid was subject to deep impurity removal by iminodiacetic acid chelating resin to obtain a refined lithium salt solution containing 23 g/L $Li^+$, ≤1 ppm $Ca^{2+}$, ≤1 ppm $Mg^{2+}$, ≤1 ppm $Fe^{3+}$, ≤1 ppm $Mn^{2+}$, 0.7 g/L $SO_4^{2-}$, 120 g/L $Cl^-$ and ≤5 ppm B and having a pH of 8.

Step B: Preparation of Battery Grade Lithium Hydroxide a. Composite Electrodialysis Treatment The obtained refined lithium salt solution was subject to composite electrodialysis treatment to obtain a lithium hydroxide solution with a LiOH concentration of 3.0 mol/L and a dilute acid solution with an $H^+$ concentration of 1.5 mol/L. The lithium hydroxide solution in an alkali chamber of a bipolar membrane electrodialysis unit and an alkali chamber of an alkali-resistant electrodialysis unit had a LiOH concentration of 1.5 mol/L, the lithium salt solution in a salt chamber of the bipolar membrane electrodialysis unit and a concentrated salt chamber of an acid-resistant electrodialysis unit had a $Li^+$ concentration of 17 g/L, the lithium salt solution discharged from a salt chamber of the acid-resistant electrodialysis unit with decreased concentration had a $Li^+$ concentration of 2.5 g/L, the dilute acid solution discharged from an acid chamber of the bipolar membrane electrodialysis unit had an $H^+$ concentration of 1.5 mol/L, and the lithium salt solution discharged from the salt chamber of the bipolar membrane electrodialysis unit had a $Li^+$ concentration of 4.5 g/L. A lithium hydroxide solution with a concentration of 1.0 mol/L was used as an electrode soaking solution of the bipolar membrane electrodialysis unit and the alkali-resistant electrodialysis unit, and a corresponding lithium salt solution with a $Li^+$ concentration of 1.0 mol/L was used as an electrode soaking solution of the acid-resistant electrodialysis unit.

b. Concentration and Crystallization

The lithium hydroxide solution with the concentration of 3.0 mol/L was evaporated, concentrated and crystallized by an MVR evaporation, concentration and crystallization device with an evaporation chamber controlled at 80° C. to separate out crystals with crystal growth and retention time lasting 3 h to obtain lithium hydroxide magma. The lithium hydroxide magma discharged from the MVR evaporation, concentration and crystallization device was fed to an OLSO crystallizer for continuous cooling crystallization with crystallization temperature controlled at 40° C. and crystal growth and retention time lasting 4 h to obtain wet fine lithium hydroxide upon solid-liquid separation and washing. The wet fine lithium hydroxide was dried, crushed and demagnetized to obtain battery grade lithium hydroxide. The MVR evaporation, concentration and crystallization device discharged unacceptable high-impurity mother liquor for preparation of subsequent battery grade lithium carbonate. The obtained battery grade lithium hydroxide meets requirements for $LiOH.H_2O$-D1 in GB/T8766-2013. See Table 7-2 for the mass of the battery grade lithium hydroxide.

TABLE 7-2

Mass of the battery grade lithium hydroxide obtained in the example 7 (unit: %)

| Chemical composition (mass fraction) | | $LiOH·H_2O$-D1 | Example 7 |
|---|---|---|---|
| | $LiOH·H_2O$, ≥ | 98.00 | ≥99.5 |
| Impurity content, ≤ | Fe | 0.0008 | 0.0001 |
| | K | 0.0030 | 0.0005 |
| | Na | 0.0030 | 0.0010 |
| | Ca | 0.0050 | 0.0005 |
| | Cu | 0.0050 | 0.0001 |
| | Mg | 0.0050 | 0.0001 |
| | Mn | 0.0050 | 0.0001 |
| | Si | 0.0050 | 0.0005 |
| | $CO_3^{2-}$ | 0.7000 | 0.110 |
| | $Cl^-$ | 0.0020 | 0.0020 |
| | $SO_4^{2-}$ | 0.0100 | 0.0030 |
| | Acid insoluble substance | 0.0050 | ≤0.0050 |

Step C: Preparation of High Purity Grade Lithium Hydroxide

The obtained wet fine lithium hydroxide was heated and dissolved in the crystallized mother liquor obtained in the step to form a 95° C. saturated solution. The saturated solution was filtered to obtain a filtrate, and the filtrate was fed to a vacuum flash chamber with vacuum degree controlled at −0.064 MPa for pre-cooling crystallization. The flash condensate water was returned to the flash system. The lithium hydroxide solution was pre-cooled to 75° C. in the flash chamber and fed to the OSLO crystallizer for cooling crystallization with cooling crystallization temperature controlled at 34° C. and crystal growth and retention time lasting 3.5 h to obtain magma, and solid-to-liquid ratio of the magma was 10%. The obtained lithium hydroxide magma was subject to solid-liquid separation and pure water washing to obtain wet high purity grade lithium hydroxide and a crystallized mother liquor. The wet high purity grade lithium hydroxide was dried and screened to obtain high purity grade lithium hydroxide with purity higher than 99.99%.

Step D: Preparation of High Purity Grade Lithium Carbonate

The wet high purity grade lithium hydroxide was dissolved in the acceptable carbonized mother liquor obtained in the step to form a lithium hydroxide solution with a conductivity of 330 ms/cm. The lithium hydroxide solution was filtered by a stainless steel microporous filter to obtain a filtrate, and the filtrate was added to a first carbonization reactor for stirring at a controlled speed of 80 rmp. While stirring, carbon dioxide was introduced into the reactor for carbonization reaction and flow rate of carbon dioxide was controlled so that the conductivity of the reaction system decreased at a rate of 7 ms/cm per minute. A corresponding control valve was turned off automatically when the conductivity decreased to 120 ms/cm to stop introduction of carbon dioxide. After continuous stirring for 30 min reaction to obtain a liquid, the liquid was subject to solid-liquid separation, pure water washing, drying, screening and packaging to obtain high purity grade lithium carbonate.

The acceptable carbonized mother liquor obtained by separation was returned for dissolving the wet fine lithium hydroxide, and the unacceptable carbonized mother liquor proceeded to the next preparation process of battery grade lithium carbonate.

The mass of the high purity grade lithium carbonate obtained in the example is shown in Table 7-3.

TABLE 7-3

Mass of the high purity grade lithium carbonate obtained in the example 7 (unit: %)

| Item | Example 7 |
|---|---|
| $Li_2CO_3$ | ≥99.995 |
| K | <0.0001 |
| Na | <0.0001 |
| Ca | <0.0003 |
| Mg | <0.0001 |
| Mn | <0.0001 |
| Fe | <0.0001 |
| As | <0.0001 |
| Ag | <0.0001 |
| Al | <0.0001 |
| Ba | <0.0001 |
| Pb | <0.0001 |
| Cu | <0.0001 |
| Cr | <0.0001 |
| Cd | <0.0001 |
| Co | <0.0001 |
| Ni | <0.0001 |
| Zn | <0.0001 |
| Si | <0.0003 |
| $Cl^-$ | <0.001 |
| $SO_4^{2-}$ | <0.003 |

Step E: Preparation of Battery Grade Lithium Carbonate

The unacceptable carbonized mother liquor obtained in the step D was fed to a second carbonization reactor as a base solution and was heated to 70° C. Battery grade lithium carbonate seed crystals with a particle size of 40 μm were added to the base solution at a volume concentration of 2.5‰. A PLC system was used to control feeding rate of carbon dioxide and an unacceptable lithium hydroxide solution composed of the unacceptable high-impurity mother liquor from the step B and the unacceptable carbonized mother liquor obtained by solid-liquid separation in the step D. The reaction system was maintained at a conductivity of 70 ms/cm and a reaction temperature of 70° C. Carbon dioxide and the lithium hydroxide solution were introduced continuously to separate out lithium carbonate slurry continuously. The lithium carbonate slurry was added to an aging cell for continuous reaction for 30 min. The reacted slurry was subject to solid-liquid separation to obtain a carbonized mother liquor and wet battery grade lithium carbonate. The wet battery grade lithium carbonate was washed, dried, crushed and deferrized to obtain battery grade lithium carbonate. The battery grade lithium carbonate obtained in the example meets requirements in GB/T8766-2013 and mass thereof is shown in Table 7-4.

TABLE 7-4

Mass of the battery grade lithium carbonate obtained in the example 7 (unit: %)

| | Item | Industry standard | Example 7 |
|---|---|---|---|
| | $Li_2CO_3$ content | □99.5 | 99.6 |
| Impurity content | Na | 0.025 | 0.0020 |
| | Mg | 0.008 | 0.0010 |
| | Ca | 0.005 | 0.0010 |
| | K | 0.001 | 0.0005 |
| | Fe | 0.001 | 0.0003 |
| | Zn | 0.0003 | 0.0001 |
| | Cu | 0.0003 | 0.0001 |
| | Pb | 0.0003 | 0.0002 |
| | Si | 0.003 | 0.0005 |
| | Al | 0.001 | 0.0005 |
| | Mn | 0.0003 | 0.0001 |
| | Ni | 0.001 | 0.0002 |
| | $SO_4^{2-}$ | 0.08 | 0.0500 |
| | $Cl^-$ | 0.003 | 0.002 |
| | Magnetic substance | 0.0003 | 0.0001 |

Example 8

A high-impurity lithium source used in the example has the specifications shown in Table 8-1 and belongs to a high-impurity solid lithium salt source.

TABLE 8-1

Composition of the high-impurity lithium source used in the example 8 (unit: %)

| $Li_2CO_3$ | Na | K | Mg | Ca |
|---|---|---|---|---|
| 96.13 | 0.87 | 0.47 | 0.35 | 0.56 |

Step A: Preparation of a Refined Lithium Salt Solution
a. Treatment of the High-Impurity Lithium Source Sulfuric acid with an $H^+$ concentration of 3 mol/L was added to react with the high-impurity lithium carbonate shown in Table 8-1 with pH at reaction end controlled at 4 to 6 to obtain a liquid. The liquid was filtered to obtain a lithium salt solution. The lithium salt solution was fed to an impurity removal reactor and heated to 80° C. by stirring, then to which a sodium carbonate solution with a concentration of 300 g/L was added with sodium carbonate excess controlled at 0.3 g/L to remove impurities and react with the lithium salt solution at the temperature for 30 min and react at the temperature for 60 min after the pH of the lithium salt solution was adjusted to 11 with lithium hydroxide, and the lithium salt solution was pumped into a plate and frame filter for rough filtration to obtain a filtrate, and the filtrate was subject to fine filtration by a microporous filter with a filter precision of 0.2 μm to obtain a purified lithium salt solution containing 22 g/L $Li^+$, ≤10 ppm $Ca^{2+}$, ≤1 ppm $Mg^{2+}$, ≤5 ppm $Mn^{2+}$, ≤1 ppm $Fe^{3+}$, 153 g/L $SO_4^{2-}$, 0.3 g/L $Cl^-$ and 0.0001 g/L B and having a pH of 11.

b. Refining of the Purified Lithium Salt Solution

The obtained purified lithium salt solution with pH value adjusted to 8.5 by adding sulfuric acid was subject to deep impurity removal by iminodiacetic acid chelating resin to obtain a refined lithium salt solution containing 21.2 g/L $Li^+$, ≤1 ppm $Ca^{2+}$, ≤1 ppm $Mg^{2+}$, ≤1 ppm $Fe^{3+}$, ≤1 ppm $Mn^{2+}$, 150 g/L $SO_4^{2-}$, 0.3 g/L $Cl^-$ and ≤5 ppm B and having a pH of 8.5.

Step B: Preparation of Battery Grade Lithium Hydroxide
a. Composite Electrodialysis Treatment The obtained refined lithium salt solution was subject to composite electrodialysis treatment to obtain a lithium hydroxide solution with a LiOH concentration of 2 mol/L and a dilute acid solution with an $H^+$ concentration of 1 mol/L. Wherein, the lithium hydroxide solution in an alkali chamber of a bipolar membrane electrodialysis unit and an alkali chamber of an alkali-resistant electrodialysis unit had a LiOH concentration of 1 mol/L, the lithium salt solution in a salt chamber of the bipolar membrane electrodialysis unit and a concentrated salt chamber of an acid-resistant electrodialysis unit had a $Li^+$ concentration of 14 g/L, the lithium salt solution discharged from a salt chamber of the acid-resistant electrodialysis unit with decreased concentration had a $Li^+$ concentration of 2 g/L, the dilute acid solution discharged from an acid chamber of the bipolar membrane electrodialysis unit had an $H^+$ concentration of 1 mol/L, and the lithium salt solution discharged from the salt chamber of the bipolar membrane electrodialysis unit had a $Li^+$ concentration of 3 g/L. A lithium hydroxide solution with a concentration of 1.0 mol/L was used as an electrode soaking solution of the bipolar membrane electrodialysis unit and the alkali-resistant electrodialysis unit, and a corresponding lithium salt solution with a $Li^+$ concentration of 1.0 mol/L was used as an electrode soaking solution of the acid-resistant electrodialysis unit.

b. Concentration and Crystallization

The lithium hydroxide solution with the concentration of 2 mol/L was evaporated, concentrated and crystallized by an MVR evaporation, concentration and crystallization device with an evaporation chamber controlled at 75° C. to separate out crystals with crystal growth and retention time lasting 3 h to obtain lithium hydroxide magma. The lithium hydroxide magma discharged from the MVR evaporation, concentration and crystallization device was fed to an OLSO crystallizer for continuous cooling crystallization with crystallization temperature controlled at 35° C. and crystal growth and retention time lasting 4 h to obtain wet fine lithium hydroxide upon solid-liquid separation and washing. The wet fine lithium hydroxide was dried, crushed and demagnetized to obtain battery grade lithium hydroxide. The MVR evaporation, concentration and crystallization device discharged unacceptable high-impurity mother liquor for preparation of subsequent battery grade lithium carbonate. The obtained battery grade lithium hydroxide meets requirements for $LiOH.H_2O$-D1 in GB/T8766-2013. See Table 8-2 for the mass of the battery grade lithium hydroxide.

TABLE 8-2

Mass of the battery grade lithium hydroxide
obtained in the example 8 (unit: %)

| | Chemical composition (mass fraction) | LiOH•H$_2$O-D1 | Example 8 |
|---|---|---|---|
| | LiOH•H$_2$O, ≥ | 98.00 | ≥99 |
| Impurity content, ≤ | Fe | 0.0008 | 0.0001 |
| | K | 0.0030 | 0.0003 |
| | Na | 0.0030 | 0.0020 |
| | Ca | 0.0050 | 0.0005 |
| | Cu | 0.0050 | 0.0001 |
| | Mg | 0.0050 | 0.0001 |
| | Mn | 0.0050 | 0.0001 |
| | Si | 0.0050 | 0.0005 |
| | CO$_3^{2-}$ | 0.7000 | 0.12 |
| | Cl$^-$ | 0.0020 | 0.0020 |
| | SO$_4^{2-}$ | 0.0100 | 0.0030 |
| | Acid insoluble substance | 0.0050 | ≤0.0050 |

Step C: Preparation of High Purity Grade Lithium Hydroxide

The obtained wet fine lithium hydroxide was heated and dissolved in the crystallized mother liquor obtained in the step to form a 93° C. saturated solution. The saturated solution was filtered to obtain a filtrate, and the filtrate was fed to a vacuum flash chamber with vacuum degree controlled at −0.074 MPa for pre-crystallization. The flash condensate water was returned to the flash system. The lithium hydroxide solution was pre-cooled to 70° C. in the flash chamber and fed to the OSLO crystallizer for cooling crystallization with cooling crystallization temperature controlled at 38° C. and crystal growth and retention time lasting 4 h to obtain magma, and solid-to-liquid ratio of the magma was 12%. The obtained lithium hydroxide magma was subject to solid-liquid separation and pure water washing to obtain wet high purity grade lithium hydroxide and a crystallized mother liquor. The wet high purity grade lithium hydroxide was dried and screened to obtain high purity grade lithium hydroxide with purity higher than 99.99%.

Step D: Preparation of High Purity Grade Lithium Carbonate

The wet high purity grade lithium hydroxide was dissolved in evaporating condensate water to form a lithium hydroxide solution with a conductivity of 380 ms/cm. The lithium hydroxide solution was filtered by a candle filter to obtain a filtrate, and the filtrate was fed to a first carbonization reactor for stirring at a controlled speed of 80 rmp. While stirring, carbon dioxide was introduced into the reactor for carbonization reaction and flow rate of carbon dioxide was controlled so that the conductivity of the reaction system decreased at a rate of 3 ms/cm per minute. A corresponding control valve was turned off automatically when the conductivity decreased to 150 ms/cm to stop introduction of carbon dioxide. After continuous stirring for 30 min reaction to obtain a liquid, the liquid was subject to solid-liquid separation, pure water washing, drying, screening and packaging to obtain high purity grade lithium carbonate.

The acceptable carbonized mother liquor obtained by separation was returned for dissolving the wet fine lithium hydroxide, and the unacceptable carbonized mother liquor proceeded to the next preparation process of battery grade lithium carbonate.

The mass of the high purity grade lithium carbonate obtained in the example is shown in Table 8-3.

TABLE 8-3

Mass of the high purity grade lithium carbonate
obtained in the example 8 (unit: %)

| Item | Example 8 |
|---|---|
| Li$_2$CO$_3$ | ≥99.99 |
| K | <0.0001 |
| Na | <0.0001 |
| Ca | <0.0003 |
| Mg | <0.0001 |
| Mn | <0.0001 |
| Fe | <0.0001 |
| As | <0.0001 |
| Ag | <0.0001 |
| Al | <0.0001 |
| Ba | <0.0001 |
| Pb | <0.0001 |
| Cu | <0.0001 |
| Cr | <0.0001 |
| Cd | <0.0001 |
| Co | <0.0001 |
| Ni | <0.0001 |
| Zn | <0.0001 |
| Si | <0.0003 |
| Cl$^-$ | <0.001 |
| SO$_4^{2-}$ | <0.003 |

Step E: Preparation of Battery Grade Lithium Carbonate

The carbonized mother liquor obtained by solid-liquid separation in the step was fed to a second carbonization reactor as a base solution and was heated to 65° C. Battery grade lithium carbonate seed crystals with a particle size of 20 μm were added to the base solution at a volume concentration of 2.5‰. A PLC system was used to control feeding rate of carbon dioxide and the unacceptable lithium hydroxide solution. The reaction system was maintained at a conductivity of 80 ms/cm and a reaction temperature of 65° C. Carbon dioxide and the lithium hydroxide solution were introduced continuously to separate out lithium carbonate slurry continuously. The lithium carbonate slurry was added to an aging cell for continuous reaction for 30 min. The reacted slurry was subject to solid-liquid separation to obtain a carbonized mother liquor and wet battery grade lithium carbonate. The wet battery grade lithium carbonate was washed, dried, crushed and deferrized to obtain battery grade lithium carbonate. The battery grade lithium carbonate obtained in the example meets requirements in GB/T8766-2013 and mass thereof is shown in Table 8-4.

TABLE 8-4

Mass of the battery grade lithium carbonate
obtained in the example 8 (unit: %)

| | Item | Industry standard | Example 8 |
|---|---|---|---|
| | Li$_2$CO$_3$ content | ☐99.5 | 99.6 |
| Impurity content | Na | 0.025 | 0.006 |
| | Mg | 0.008 | 0.0005 |
| | Ca | 0.005 | 0.0005 |
| | K | 0.001 | 0.0005 |
| | Fe | 0.001 | 0.0003 |
| | Zn | 0.0003 | 0.0001 |
| | Cu | 0.0003 | 0.0001 |
| | Pb | 0.0003 | 0.0002 |
| | Si | 0.003 | 0.0005 |
| | Al | 0.001 | 0.0005 |
| | Mn | 0.0003 | 0.0001 |
| | Ni | 0.001 | 0.0002 |
| | SO$_4^{2-}$ | 0.08 | 0.0450 |
| | Cl$^-$ | 0.003 | 0.002 |
| | Magnetic substance | 0.0003 | 0.0001 |

Example 9

The same steps were carried out as those in the example 1 to obtain a refined lithium salt solution containing 20 g/L Li$^t$, ≤1 ppm Ca, ≤1 ppm Mg, ≤1 ppm Fe, ≤1 ppm Mn, 0.85 g/L SO$_4^{2-}$, 103 g/L Cl$^-$ and ≤5 ppm B and having a pH of 8. The refined lithium salt solution was used directly to prepare battery grade lithium carbonate.

The refined lithium salt solution containing 20 g/L Li$^t$, ≤1 ppm Ca$^{2+}$, ≤1 ppm Mg$^{2+}$, ≤1 ppm Fe$^{3+}$, ≤1 ppm Mn$^{2+}$, 0.85 g/L SO$_4^{2-}$, 103 g/L Cl$^-$ and ≤5 ppm B and having the pH of 8 and a sodium carbonate solution with a concentration of 300 g/L were concurrently added to a continuous crystallization reactor for precipitation reaction. The temperature of the reaction system was controlled at 95° C. The feeding rate of the sodium carbonate solution and the refined lithium salt solution was controlled to keep an instantaneous Li concentration of 7 g/L and a sodium carbonate concentration of 65 g/L when entering the reaction system. Upon continuous feeding, lithium carbonate slurry was separated out continuously and was introduced into a thickener to obtain lithium carbonate slurry with a solid content of 20%. The lithium carbonate slurry was separated by a centrifuge and washed to obtain wet fine lithium carbonate and a lithium precipitation mother liquor. The obtained wet fine lithium carbonate was added to 60° C. pure water at a solid-liquid ratio of 1:3 for conditioning, stirring and washing for 30 min, and was subject to solid-liquid separation, washing, drying, crushing and demagnetization to obtain battery grade lithium carbonate; and the water for stirring and washing was recycled for dissolving sodium carbonate. The battery grade lithium hydroxide obtained in the example meets requirements in GB/T8766-2013 and mass thereof is shown in Table 9-1.

TABLE 9-1

Mass of the battery grade lithium carbonate obtained in the example 9 (unit: %)

| | Item | Industry standard | Example 9 |
|---|---|---|---|
| | Li$_2$CO$_3$ content | ☐99.5 | 99.6 |
| Impurity content | Na | 0.025 | 0.020 |
| | Mg | 0.008 | 0.0010 |
| | Ca | 0.005 | 0.0010 |
| | K | 0.001 | 0.0005 |
| | Fe | 0.001 | 0.0003 |
| | Zn | 0.0003 | 0.0001 |
| | Cu | 0.0003 | 0.0001 |
| | Pb | 0.0003 | 0.0002 |
| | Si | 0.003 | 0.0005 |
| | Al | 0.001 | 0.0005 |
| | Mn | 0.0003 | 0.0001 |
| | Ni | 0.001 | 0.0002 |
| | SO$_4^{2-}$ | 0.08 | 0.0200 |
| | Cl$^-$ | 0.003 | 0.002 |
| | Magnetic substance | 0.0003 | 0.0001 |

To process the high-impurity lithium sources varying in lithium contents, impurity categories and impurity contents, the invention proposes differentiated combinations of physical and chemical treatment methods to adapt to quality variation of the high-impurity lithium sources, meet quality requirements for the battery grade and high purity grade lithium hydroxide and lithium carbonate products and provide higher adaptability for lithium raw materials.

The invention is not limited to the embodiments mentioned above. The invention is expanded to any new features or any new combinations disclosed in the specification, and steps or any new combinations in any new method or procedure disclosed.

The invention claimed is:

1. A method for preparing lithium carbonate, comprising:
(A) preparing a refined lithium salt solution, wherein step (A) comprises:
pre-treating a lithium source to obtain a purified lithium salt solution comprising 7 to 24 g/L Li$^+$, 0.01 to 0.05 g/L K$^+$, 0.05 to 0.1 g/L Na$^-$, 0.01 to 0.02 g/L Ca$^{2+}$, 0.000 to 0.005 g/L Mg$^{2+}$, 0 to 200 g/L SO$_4^{2-}$, 0 to 200 g/L Cl$^-$, and 0.01 to 0.06 g/L B, and having a pH of 9 to 11,
wherein the lithium source is a first high-impurity lithium source, a second high-impurity lithium source, or a high-impurity solid lithium salt,
wherein the first high-impurity lithium source is a solution comprising 0.1 to 4 g/L Li$^+$, 2 to 110 g/L Na$^+$, 0.5 to 50 g/L K$^+$, 0 to 100 g/L Mg$^{2+}$, 0 to 20 g/L Ca$^{2+}$, 0 to 5 g/L B, 0 to 250 g/L SO$_4^{2-}$, and 0 to 200 g/L Cl$^-$, and having a pH of 6 to 12,
the second high-impurity lithium source is a solution comprising 14 to 40 g/L Li$^+$, 20 to 80 g/L Na$^+$, 0 to 30 g/L K$^+$, 0 to 20 g/L Mg$^{2+}$, 0 to 10 g/L Ca$^{2+}$, and 0 to 15 g/L B, and
the high-impurity solid lithium salt is lithium carbonate, lithium sulfate, lithium chloride, or lithium sulfate comprising 0.5 to 1% Na$^+$, 0.1 to 0.5% K$^+$, 0.5 to 3% Ca$^{2+}$, and 0.3 to 5% Mg$^{2+}$ by mass; and
adjusting the pH of the purified lithium salt solution to 8 to 9 and conducting ion exchange between the purified lithium salt solution with an ion exchange chelating resin to obtain a refined lithium salt solution comprising 7 to 24 g/L Li$^+$, ≤1 ppm Ca$^{2+}$, ≤1 ppm Mg$^{2+}$, ≤1 ppm Fe$^{2+}$, ≤1 ppm Mn$^{2+}$, ≤1 ppm Zn$^{2+}$, ≤1 ppm Al$^{3+}$, 0 to 200 g/L SO$_4^{2-}$, 0 to 200 g/L Cl$^-$ and ≤5 ppm B, and having a pH of 8 to 9;
(B) preparing a battery grade lithium hydroxide, wherein step (B) comprises:
treating the refined lithium salt solution by composite electrodialysis to obtain a first lithium hydroxide solution having a LiOH concentration of 1 to 4 mol/L and a dilute acid solution having a H$^+$ concentration of 0.5 to 2 mol/L; and
evaporating, concentrating, and crystallizing the first lithium hydroxide solution to obtain a lithium hydroxide slurry, further cooling and crystallizing the lithium hydroxide slurry and separating a first solid from the lithium hydroxide slurry to obtain a wet fine lithium hydroxide and a first mother liquor;
(C) preparing high purity grade lithium hydroxide, wherein step (C) comprises:
dissolving the wet fine lithium hydroxide to form a second lithium hydroxide solution, filtering the second lithium hydroxide solution to obtain a second filtrate, cooling and crystallizing the second filtrate, separating a second solid from the second filtrate, and washing the second solid to obtain a wet high purity grade lithium hydroxide and a second mother liquor;
(D) preparing a high purity grade lithium carbonate, wherein step (D) comprises:
dissolving the wet high purity grade lithium hydroxide to form a third lithium hydroxide solution, filtering the third lithium hydroxide solution to obtain a third filtrate, adding carbon dioxide into the third filtrate to carry out a carbonization reaction, and separating a third solid from the third filtrate to obtain a wet high purity grade lithium carbonate and a third mother liquor; and (E) preparing a battery grade lithium carbonate, wherein step (E) comprises:
adding battery grade lithium carbonate seed crystals, carbon dioxide, the first mother liquor from step (B), and the third mother liquor from step (D) to a base solution to form a mixture, aging the mixture to form a lithium carbonate slurry; separating a fourth solid from the lithium carbonate slurry to obtain a fourth mother liquor and a wet battery grade lithium carbonate.

2. The method according to claim 1, wherein, in step (A), the lithium source is the first high-impurity lithium source, wherein step (A) comprises: adjusting the pH of the first high-impurity lithium source to 6 to 8, filtering the first high-impurity lithium source to obtain a filtrate I, and selectively adsorbing lithium from the filtrate I with a lithium ion exchange adsorbent, washing the lithium ion exchange adsorbent with water and with an acid to obtain a lithium-containing desorption solution; and
adjusting a pH of the lithium-containing desorption solution to 7 to 9; filtered the lithium-containing desorption solution to obtain a filtrate II, enriching the filtrate II to obtain a lithium-rich solution, and chemically removing impurities from the lithium-rich solution to obtain the purified lithium salt solution.

3. The method according to claim 2, wherein the first high-impurity lithium source is filtered by a sand filter, a ceramic filter, a PA microporous tube filter, or a PE microporous tube filter to obtain the filtrate I, and the filtrate I is pumped into an adsorber packed with the lithium ion exchange adsorbent to selectively adsorb lithium; and the pH of the lithium-containing desorption solution is adjusted with alkali, and then is filtered to obtain the filtrate II.

4. The method according to claim 2, wherein the lithium ion exchange adsorbent is washed with water 3 to 5 times volume of the lithium ion exchange adsorbent, and is further desorbed with the acid with a H+ concentration of 0.2 to 0.5 mol/L for 0.5 to 1 h, the desorbed lithium ion exchange adsorbent is further washed with water with volume of 1 to 2 times that of the lithium ion exchange adsorbent to obtain the lithium-containing desorption solution; the acid is sulfuric acid, hydrochloric acid, or a mixture thereof, and
wherein the lithium-containing desorption solution comprises 1 to 3_g/L $Li^+$, 0.005_to 0.05_g/L $Na^+$, 0.000 to 0.005 g/L $K^+$, 0.0010 to 0.01_g/L $Ca^{2+}$, 0.000 to 0.005_g/L $Mg^{2+}$, and 0.000 to 0.005_g/L B, and has a pH of 1 to 4.

5. The method according to claim 2, wherein enriching the filtrate II is carried out using a reverse osmosis and electrodialysis coupling device, wherein the reverse osmosis and electrodialysis coupling device comprises a three-stage disc tube reverse osmosis unit coupled with a two-chamber electrodialysis unit comprising a salt chamber and a concentrated salt chamber in coupling connection.

6. The method according to claim 2, wherein chemically removing impurities from the lithium-rich solution comprises:
adding a sodium carbonate solution with a concentration of 200 to 300_g/L to the lithium-rich solution until the lithium-rich solution has sodium carbonate excess of 0.3 to 0.5_g/L; reacting the lithium-rich solution for 10 to 30 min; adjusting the pH of the lithium-rich solution to 9 to 11 and reacting at 80 to 90° C. for 30 to 60 min; and filtering the lithium-rich solution to obtain the purified lithium salt solution.

7. The method according to claim 2, wherein, in step (A), the high-impurity lithium source is the second high-impurity lithium source, the second high-impurity lithium sources is subject to chemical impurity removal to obtain an lithium-containing impurity-removed solution;
the lithium-containing impurity-removed solution is precipitated with a sodium carbonate solution to form a lithium carbonate slurry have a 20 to 40% solid content, and then the lithium carbonate slurry is subject to solid-liquid separation to obtain wet fine lithium carbonate and a lithium precipitation mother liquor; and
the wet fine lithium carbonate reacts with sulfuric acid or hydrochloric acid or a mixture thereof having a H+ concentration of 2 to 3 mol/L to obtain a solution with pH at reaction endpoint controlled at 4 to 6, the pH of the solution is adjusted to 9 to 11 with alkali, and the solution is filtered to obtain the purified lithium salt solution.

8. The method according to claim 7,
adding a sodium carbonate solution with a concentration of 200 to 300 g/L to the Lithium-rich solution until the Lithium-rich solution has sodium carbonate excess of 0.3 to 0.5 g/L; reacting the Lithium-rich solution for 10 to 30 min; adjusting the pH of the Lithium-rich solution to 9 to 11 and reacting at 80 to 90° C. for 30 to 60 min; and filtering the Lithium-rich solution to obtain the purified lithium salt solution.

9. The method according to claim 7, wherein the lithium-containing impurity-removed solution and a sodium carbonate solution with a concentration of 200 to 300_g/L are concurrently added to a continuous crystallization reactor for precipitation reaction 85 to 95° C., and wherein a feeding rate of the sodium carbonate solution and a feeding rate the lithium-containing impurity-removed solution are controlled so that instantaneous Li concentration at the time of entering the continuous crystallization reactor is maintained at 3 to 7_g/L and a concentration of sodium carbonate is maintained at 30 to 65_g/L, wherein the lithium carbonate slurry from the continuous crystallization reactor is sent to a thickener to reach a solid content of 20 to 40%.

10. The method according to claim 9, wherein the continuous crystallization reactor comprises a reaction crystallizer with a draft tube and a thickener, wherein an inlet of the lithium-containing impurity-removed solution and an inlet of the sodium carbonate solution are aligned and disposed outside the draft tube, wherein a supernatant obtained from the thickener is returned to the reaction crystallizer, and the lithium-containing impurity-removed solution is fed to the draft tube of the reaction crystallizer separately from or together with the supernatant returned from the thickener to precipitate with the sodium carbonate solution, and a base solution of the continuous crystallization reactor at startup is pure water or the lithium precipitation mother liquor.

11. The method according to claim 9, wherein the lithium precipitation mother liquor comprises 1.5 to 2 g/L $Li^+$, 60 to 100 g/L $Na^+$, 0 to 220 g/L $SO_4^{2-}$, 0 to 200 g/L $Cl^-$ and 13 to 17 g/L $CO_3^{2-}$, and has a pH of 11 to 12, and the lithium precipitation mother liquor is recycled as the first high-impurity lithium source to obtain the purified lithium salt solution.

12. The method according to claim 1, wherein, in step (A), the high-impurity lithium source is the high-impurity solid lithium salt, the high-impurity solid lithium salt is dissolved in acid or water to form a lithium salt solution, the lithium salt solution is filtered to remove insoluble impurities, and a filtrate obtained is subject to chemical impurity removal to obtain the purified lithium salt liquid.

13. The method according to claim 12, wherein the high-impurity lithium carbonate reacts with sulfuric acid, or hydrochloric acid, or a mixture thereof containing 2 to 3 mol/L $H_+$ to obtain a solution with pH at reaction endpoint controlled at 4 to 6, the solution is filtered to obtain a lithium salt solution; and the high-impurity lithium sulfate, lithium chloride or lithium sulfate and lithium chloride compound salt is dissolved in water to obtain the lithium salt solution containing 7 to 24 g/L $Li^+$.

14. The method according to claim 12, wherein a sodium carbonate solution with a concentration of 200 to 300 g/L is added to the lithium salt solution with sodium carbonate excess controlled at 0.3 to 0.5 g/L to react with the lithium salt solution at 80 to 90° C. for 10 to 30 min and then for 30 to 60 min after the pH of the lithium salt solution is adjusted to 9 to 11 with alkali, and lithium salt solution is filtered by a plate and frame filter, a candle filter, or a microporous filter to obtain a filtrate, and the filtrate is filtered by a microporous filter or ceramic filter with filter precision of 0.1 to 0.2 μm to obtain the purified lithium salt solution.

15. The method according to claim 12, wherein the sodium carbonate solution is a filtrate obtained by mixing sodium carbonate with water to obtain a solution with a concentration of 200 to 300 g/L, adding 1 to 3 kg sodium hydroxide per cubic meter of the solution to remove impurities for 10 to 30 min, and then filtering the solution; and the alkali is a sodium hydroxide solution or lithium hydroxide solution.

16. The method according to claim 1, wherein, in step (A), the purified lithium salt solution with a temperature of 50 to 60° C. and pH of 8 to 9 is controlled to enter a chelating resin ion exchange column packed with chelating resin for deep purification; the chelating resin is cation chelating resin, and after saturation by adsorption, the chelating resin is regenerated with hydrochloric acid or sulfuric acid, and then regenerated with a lithium hydroxide solution.

17. The method according to claim 16, wherein the chelating resin ion exchange column comprises columns A, B, and C, wherein the purified lithium salt solution passes through columns A and B connected in series, and column C is being regenerated.

18. The method according to claim 1, wherein, in step (B), the refined lithium salt solution is pumped into a composite electrodialysis device for composite electrodialysis treatment, and the composite electrodialysis device is formed by coupling a three-chamber bipolar membrane electrodialysis unit, an alkali-resistant electrodialysis unit and an acid-resistant electrodialysis unit.

19. The method according to 18, wherein the three-chamber bipolar membrane electrodialysis unit comprises an anode chamber, a cathode chamber and an alkali chamber, an acid chamber and a salt chamber separated by a membrane stack between the anode chamber and the cathode chamber, the anode chamber is connected with a positive electrode of a power supply, and the cathode chamber is connected with a negative electrode of the power supply; the membrane stack comprises a plurality of bipolar membranes, a plurality of anion exchange membranes, and a plurality of cation exchange membranes arranged alternately, and each bipolar membrane consists of an anion exchange membrane, a cation exchange membrane and a catalytic layer interposed therebetween, and, during operation, the lithium hydroxide solution or water is introduced into the alkali chamber, the dilute acid or water is introduced into the acid chamber, the refined lithium salt solution is introduced into the salt chamber, and an electrode soaking solution is introduced into the anode chamber and the cathode chamber concurrently; the lithium hydroxide solution is obtained from the alkali chamber, the dilute acid solution is obtained from the acid chamber, and the low-concentration lithium salt solution is obtained from the salt chamber.

20. The method according to claim 19, wherein the alkali-resistant electrodialysis unit is a two-chamber electrodialyzer and comprises an anode chamber, a cathode chamber, and an alkali chamber and a concentrated alkali chamber separated by a membrane stack between the anode chamber and the cathode chamber, the anode chamber is connected with a positive electrode of a power supply, and the cathode chamber is connected with a negative electrode of the power supply; the membrane stack comprises cation exchange membranes and anion exchange membranes arranged alternately; the alkali chamber is formed between the anion exchange membrane and the cation exchange membrane, the concentrated alkali chamber is formed between the cation exchange membrane and the anion exchange membrane, and both the cation exchange membrane and the anion exchange membrane are alkali-resistant homogeneous membranes; and, during operation, the lithium hydroxide solution obtained from the alkali chamber of the bipolar membrane electrodialysis unit is introduced into the alkali chamber of the alkali-resistant electrodialysis unit, the lithium hydroxide solution with a LiOH concentration of 1 to 4 mol/L is obtained from the concentrated alkali chamber, and the lithium hydroxide solution with decreased concentration in the alkali chamber is returned to the alkali chamber of the bipolar membrane electrodialysis unit.

21. The method according to claim 20, wherein the acid-resistant electrodialysis unit is a two-chamber electrodialyzer and comprises an anode chamber, a cathode chamber, and a salt chamber and a concentrated salt chamber separated by a membrane stack between the anode chamber and the cathode chamber, the anode chamber is connected with a positive electrode of a power supply, and the cathode chamber is connected with a negative electrode of the power supply; the membrane stack comprises cation exchange membranes and anion exchange membranes arranged alternately; the salt chamber is formed between the anion exchange membrane and the cation exchange membrane, and the concentrated salt chamber is formed between the cation exchange membrane and the anion exchange membrane, and both the cation exchange membrane and the anion exchange membrane are acid-resistant homogeneous membranes; and, during operation, the lithium salt solution obtained from the salt chamber of the bipolar membrane electrodialysis unit is introduced into the salt chamber; the concentrated lithium salt solution obtained from the concentrated salt chamber is introduced along with the refined lithium salt solution into the salt chamber of the bipolar membrane electrodialysis unit, and the lithium salt solution with decreased concentration in the salt chamber is returned to the acid chamber of the bipolar membrane electrodialysis unit.

22. The method according to claim 21, wherein the bipolar membrane electrodialysis unit and the alkali-resistant electrodialysis unit use a lithium hydroxide solution with a concentration of 0.8 to 1.5 mol/L as the electrode soaking solution, and the acid-resistant electrodialysis unit uses the corresponding lithium salt solution with a $Li^+$ concentration of 0.8 to 1.5 mol/L as the electrode soaking solution; and the lithium hydroxide solution in the alkali chamber of the bipolar membrane electrodialysis unit and the alkali chamber of the alkali-resistant electrodialysis unit have a LiOH concentration of 0.5 to 2 mol/L, the lithium salt solution in the salt chamber of the bipolar membrane electrodialysis unit and the concentrated salt chamber of the alkali-resistant electrodialysis unit have a $Li^+$ concentration of 7 to 17 g/L, the lithium salt solution discharged from the salt chamber of the acid-resistant electrodialysis unit with a decreased concentration has a $Li^+$ concentration of 0.5 to 3 g/L, the dilute acid solution discharged from an acid chamber of the bipolar membrane electrodialysis unit has an $H^+$ concentration of 0.5 to 2 mol/L, and the lithium salt solution discharged from the salt chamber of the bipolar membrane electrodialysis unit has a $Li^+$ concentration of 3 to 5 g/L.

23. The method according to claim 1, wherein, in step (B), the lithium hydroxide solution with the LiOH concentration of 1 to 4 mol/L is evaporated and concentrated by an MVR evaporation, concentration and crystallization device with an evaporation chamber controlled at 75 to 80° C. to obtain lithium hydroxide crystals with crystal growth and retention time lasting 3 to 5 h and then to obtain lithium hydroxide magma; the lithium hydroxide slurry is treated with an DTB crystallizer or OSLO crystallizer under continuous cooling crystallization mode for cooling crystallization at a temperature of 30 to 40° C. and with a crystal growth retention time of 2 to 4 h;

and the first mother liquor contains≥10 g/L $K^+$ or ≥20 g/L $Na^+$ or ≥40 g/L $SO_4^{2-}$.

24. The method according to claim 23, wherein, in step (C), the second filtrate is cooled and crystallized by the DTB crystallizer or OSLO crystallizer for continuous cooling crystallization with crystallization temperature controlled at 30 to 40° C. and crystal growth retention time lasting 3 to 5 h.

25. The method according to claim 24, wherein a vacuum flash chamber is added at the backing stage of the DTB crystallizer or OSLO crystallizer for pre-cooling crystallization, the second filtrate is fed to the flash chamber with vacuum degree of −0.07 to −0.084 MPa for vacuum flashing and then fed to the DTB crystallizer or the OSLO crystallizer for cooling crystallization; and the filter is one of a stainless steel microporous rod filter, a titanium microporous filter and a candle filter.

26. The method according to claim 24, wherein, in step (D), the third filtrate is pumped into a first carbonization reactor with stirring rate controlled to be 30 to 80 rmp, and carbon dioxide is introduced while stirring for carbonization reaction; conductivity meter data are received by a PLC control unit and fed back to a carbon dioxide control valve of the first carbonization reactor to control introduction rate of carbon dioxide, decrease rate of conductivity is controlled to be 2 to 7 ms/cm per minute, when the conductivity decreases to 100 to 150 ms/cm, the control valve is turned off and introduction of carbon dioxide is stopped; and stirring continues for 20 to 30 min and then solid is separated from liquid to obtain the wet high purity grade lithium carbonate and carbonization mother liquor.

27. The method according to claim 26, wherein, the wet high purity grade lithium carbonate is dissolved in water or the acceptable carbonization mother liquor obtained from the step D, and the third mother liquor contains ≤20 ppm Na, or ≤20 ppm K, or ≤2 ppm Mg, or ≤5 ppm Ca.

28. The method according to claim 26, wherein, in step (E), the base solution is added to a second carbonization reactor, the battery grade lithium carbonate seed crystals are added to the base solution at a mass concentration of 1 to 5%₀, and a particle size of the battery grade lithium carbonate seed crystals is 20 to 40 μm, opening of the control valve on the second carbonization reactor and feeding rate of carbon dioxide and the first mother liquor are controlled by the PLC control unit, the conductivity of the reaction system is maintained at 60 to 90 ms/cm and the reaction temperature is maintained at 40 to 80° C., the lithium carbonate slurry is continuously obtained by continuous feeding, the lithium carbonate slurry is sent to an aging cell for 30 to 60 min reaction and is subject to solid-liquid separation to obtain the wet battery grade lithium carbonate and the carbonization mother liquor, and the base solution is pure water or the third mother liquor obtained from the step D or the fourth mother liquor obtained from step (E).

29. The method according to claim 2, further comprising:
the refined lithium salt solution is precipitated with the sodium carbonate solution, lithium carbonate slurry obtained by continuous feeding and continuous separation is thickened and subject to solid-liquid separation to obtain the wet fine lithium carbonate and the lithium precipitation mother liquor; the obtained lithium precipitation mother liquor belongs to the a high-impurity lithium sources and is returned and treated as the first high-impurity solid lithium salt to obtain the purified lithium salt solution; and the wet fine lithium carbonate is washed, stirred & washed and subject to solid-liquid separation to obtain the battery grade lithium carbonate.

30. The method according to claim 29, wherein the refined lithium salt solution and the sodium carbonate solution with a concentration of 250 to 300 g/L are concurrently added to the continuous crystallization reactor for precipitation reaction at a reaction temperature of 85 to 95° C., a feeding rate of the sodium carbonate solution and a feeding rate the refined lithium salt solution are controlled so that the instantaneous Li concentration at the time of entering the reaction system is maintained at 3 to 7 g/L; the concentration of sodium carbonate maintained at 30 to 65 g/L; the lithium carbonate slurry obtained by continuous feeding and continuous separation is sent to a thickener to reach 20 to 40% solid content, and then subject to solid-liquid separation to obtain wet fine lithium carbonate and a lithium precipitation mother liquor; the wet fine lithium carbonate is washed and then stirred and washed for 10 to 30 min by adding 60 to 80° C. pure water or evaporating condensate water at solid-liquid ratio of 1:3 to 5 for 10 to 30 min, and then an obtained solution is subject to solid-liquid separation and post-treatment to obtain the battery grade lithium carbonate.

* * * * *